United States Patent
Donegan et al.

(10) Patent No.: US 11,051,494 B2
(45) Date of Patent: Jul. 6, 2021

(54) SYSTEMS AND METHODS FOR FACILITATING SEED FEEDER FILLING

(71) Applicant: Classic Brands, LLC, Denver, CO (US)

(72) Inventors: Robert W. Donegan, Denver, CO (US); Bryan Krueger, Denver, CO (US); John Bruno, Parker, CO (US); Lindsey Nifong, Denver, CO (US); John Putz, Fountain City, WI (US); Stephen Combs, Denver, CO (US); Lynn Hunter, Parker, CO (US)

(73) Assignee: CLASSIC BRANDS, LLC, Denver, CO (US)

( * ) Notice: Subject to any disclaimer, the term of this patent is extended or adjusted under 35 U.S.C. 154(b) by 367 days.

(21) Appl. No.: 15/705,022

(22) Filed: Sep. 14, 2017

(65) Prior Publication Data
US 2018/0000052 A1    Jan. 4, 2018

Related U.S. Application Data

(63) Continuation-in-part of application No. PCT/US2016/023471, filed on Mar. 21, 2016, which
(Continued)

(51) Int. Cl.
*A01K 39/01*     (2006.01)
*A01K 39/012*    (2006.01)
(Continued)

(52) U.S. Cl.
CPC ............ *A01K 39/012* (2013.01); *A01K 39/01* (2013.01); *B65B 7/2842* (2013.01);
(Continued)

(58) Field of Classification Search
CPC ............................ A01K 39/01; A01K 39/012
(Continued)

(56) References Cited

U.S. PATENT DOCUMENTS

| 4,892,060 A * | 1/1990 | Lundquist ............ A01K 39/012 119/52.2 |
| 5,642,689 A * | 7/1997 | Harvey ................ A01K 39/012 119/57.8 |

(Continued)

OTHER PUBLICATIONS

"Roll-n-fill Easy To Fill Steps for RollerFeeder Bird Feeder" uploaded by RollerFeeder, Sep. 2, 2013 [retrieved Jul. 8, 2016], Retrieved from the Internet <URL: https://www.youtube.com/watch?v=qvjbSJ5LEaQ>.*

*Primary Examiner* — David J Parsley
(74) *Attorney, Agent, or Firm* — Polsinelli PC

(57) ABSTRACT

A bird feeding system that can be filled after pressing a release button on a cap assembly connected to a body that includes a reservoir. The cap assembly may be opened to provide access to the reservoir. A lid of the cap assembly is released by depressing a first side of the release button. The lid is moved from a closed position to an open position using a bias of a spring assembly upon the release of the lid. The lid moves from the closed position to the open position along a rotation path created by a hinge at a second side. The lid is held in the open position by the spring bias, and the open position provides access to the reservoir through the cap opening. Birdseed is received through the cap opening into the reservoir.

20 Claims, 73 Drawing Sheets

Related U.S. Application Data is a continuation-in-part of application No. 29/550,881, filed on Jan. 7, 2016, now Pat. No. Des. 802,851.

(60) Provisional application No. 62/534,006, filed on Jul. 18, 2017, provisional application No. 62/135,618, filed on Mar. 19, 2015.

(51) Int. Cl.
  *B65D 51/24* (2006.01)
  *B65D 43/16* (2006.01)
  *B65D 43/24* (2006.01)
  *B65B 7/28* (2006.01)

(52) U.S. Cl.
  CPC ........... *B65D 43/163* (2013.01); *B65D 43/24* (2013.01); *B65D 51/242* (2013.01)

(58) Field of Classification Search
  USPC ..................................... 119/51.01, 52.2, 57.8
  See application file for complete search history.

(56) References Cited

U.S. PATENT DOCUMENTS

| | | | |
|---|---|---|---|
| 7,516,715 B2 * | 4/2009 | Conlon | A01K 39/012 119/52.2 |
| 2010/0006572 A1 * | 1/2010 | Chiou | B65F 1/1607 220/263 |
| 2010/0012041 A1 * | 1/2010 | Wechsler | A01K 39/012 119/52.4 |
| 2011/0083609 A1 * | 4/2011 | Cote | A01K 39/012 119/52.2 |
| 2012/0111867 A1 * | 5/2012 | Banus | B65D 25/16 220/495.08 |

\* cited by examiner

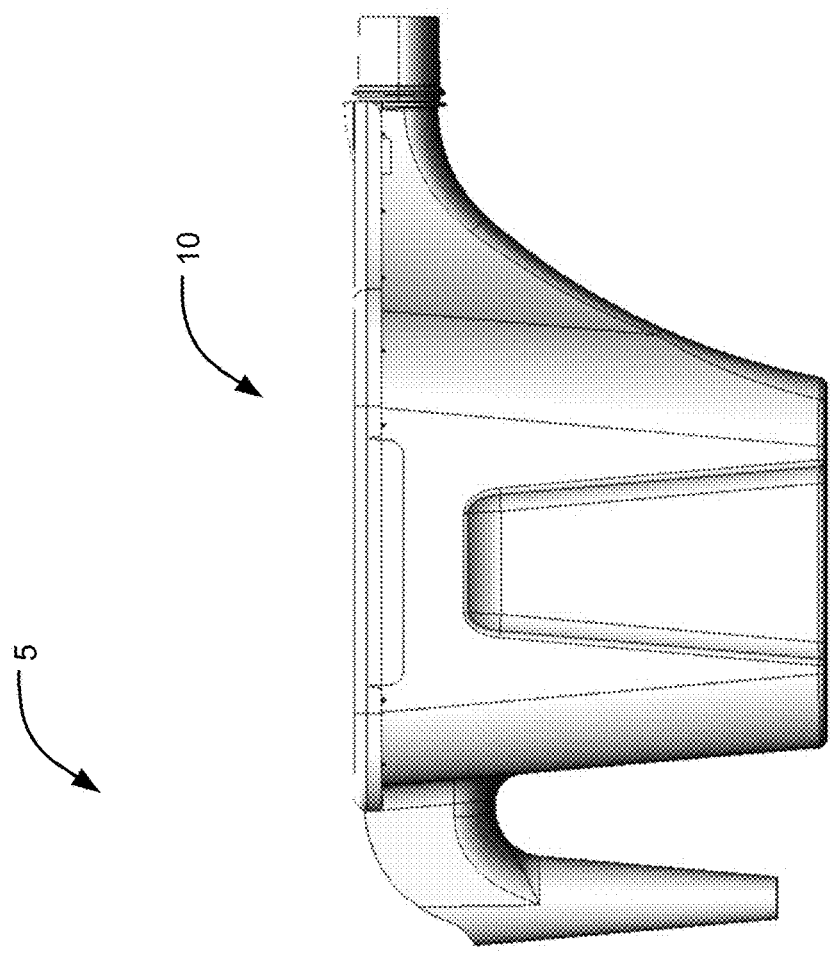
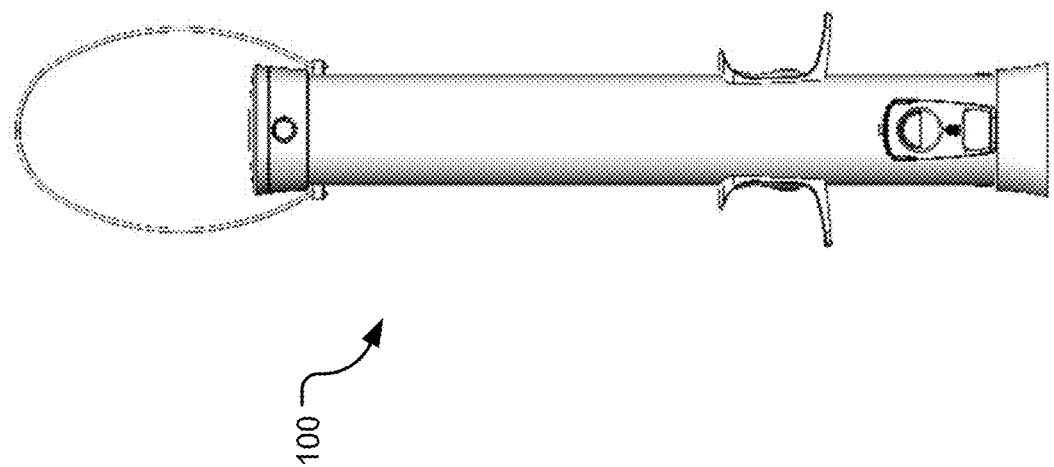
FIG. 1

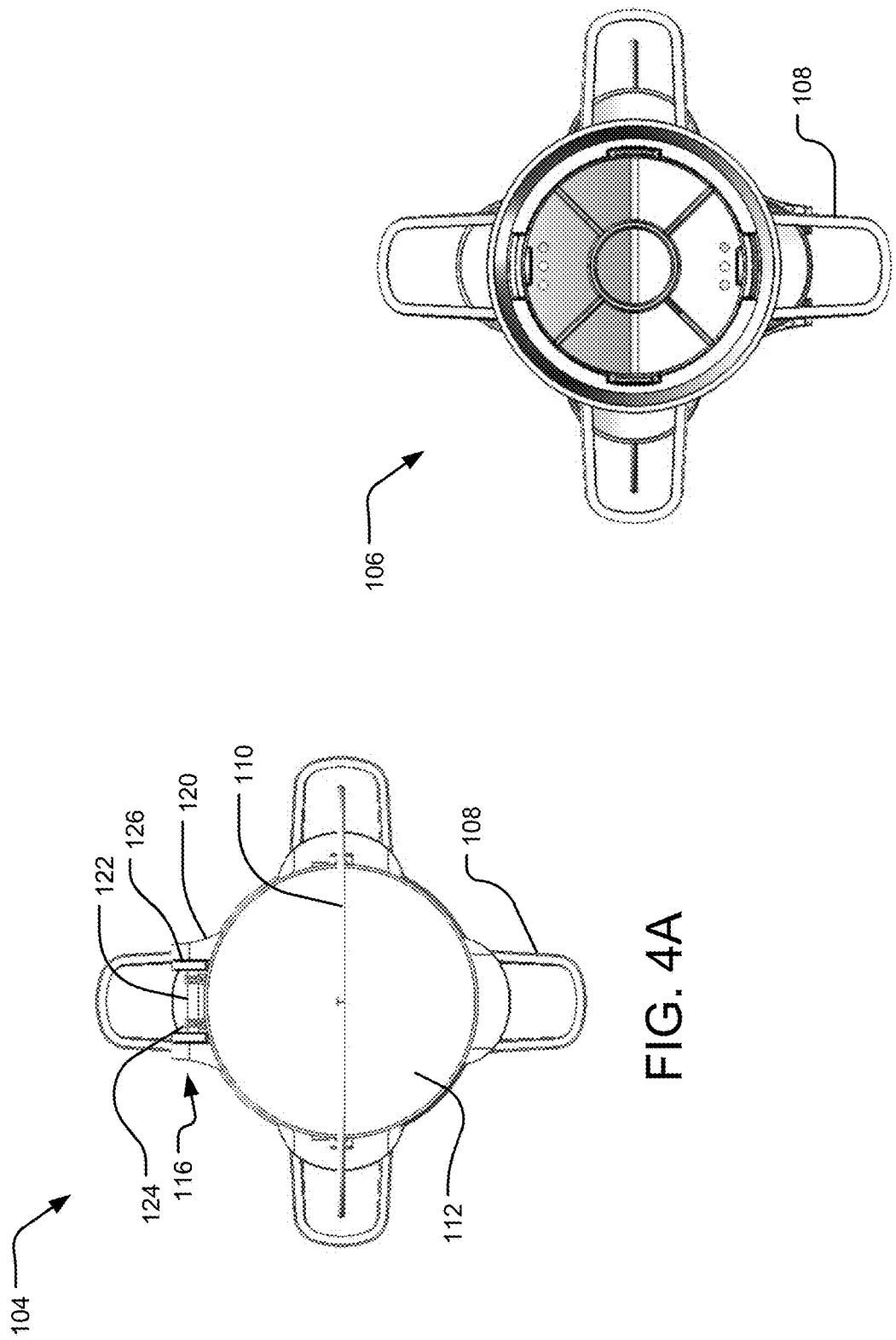

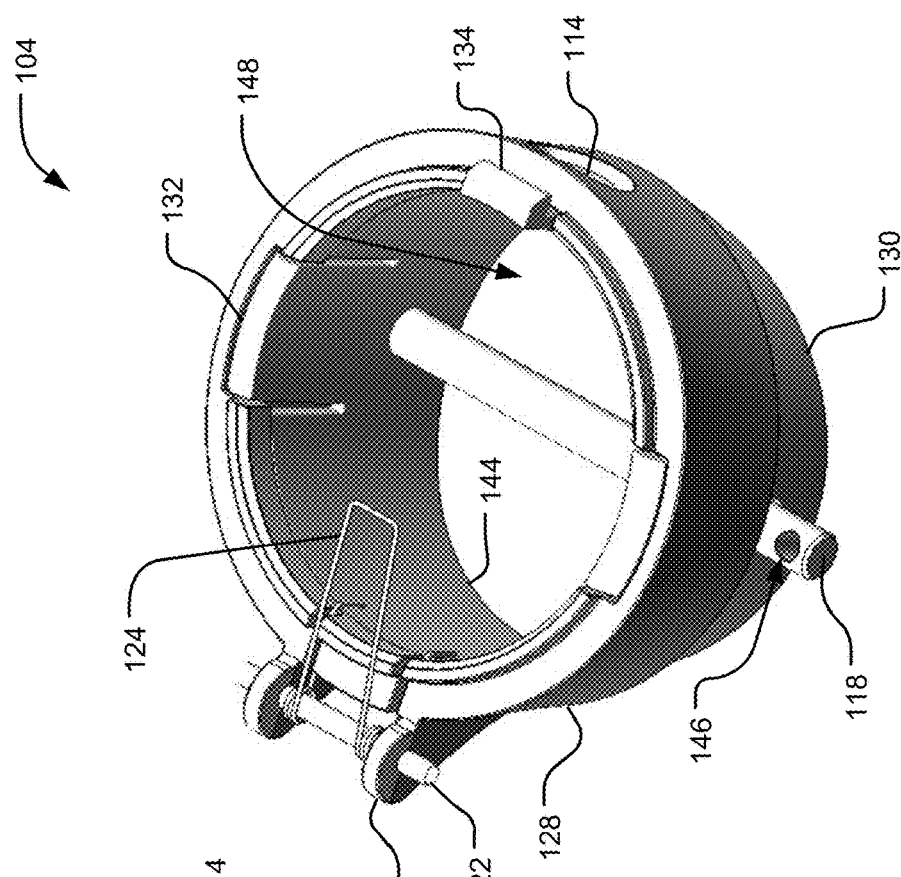
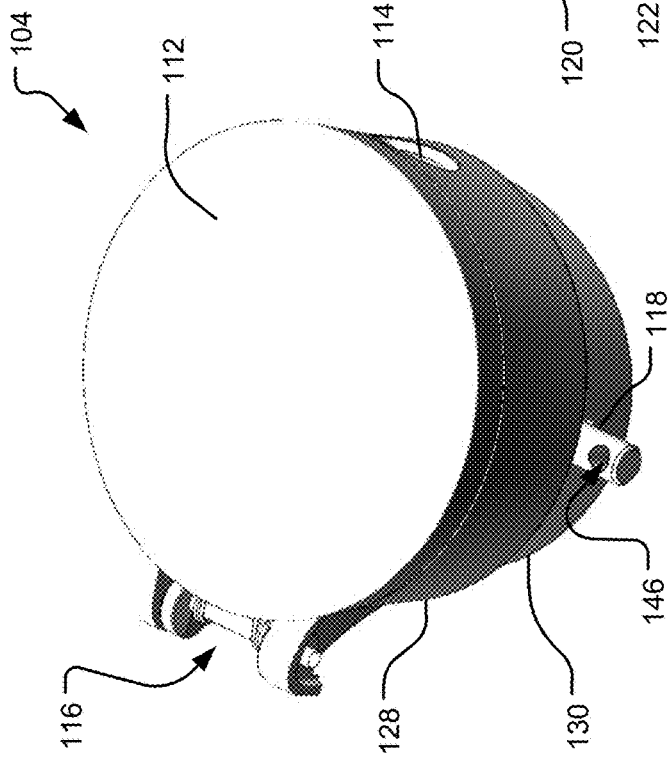

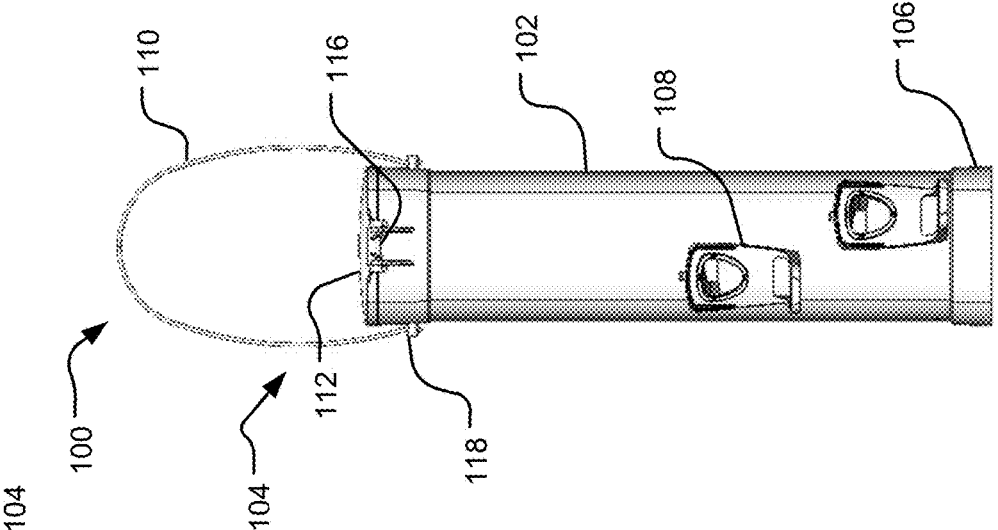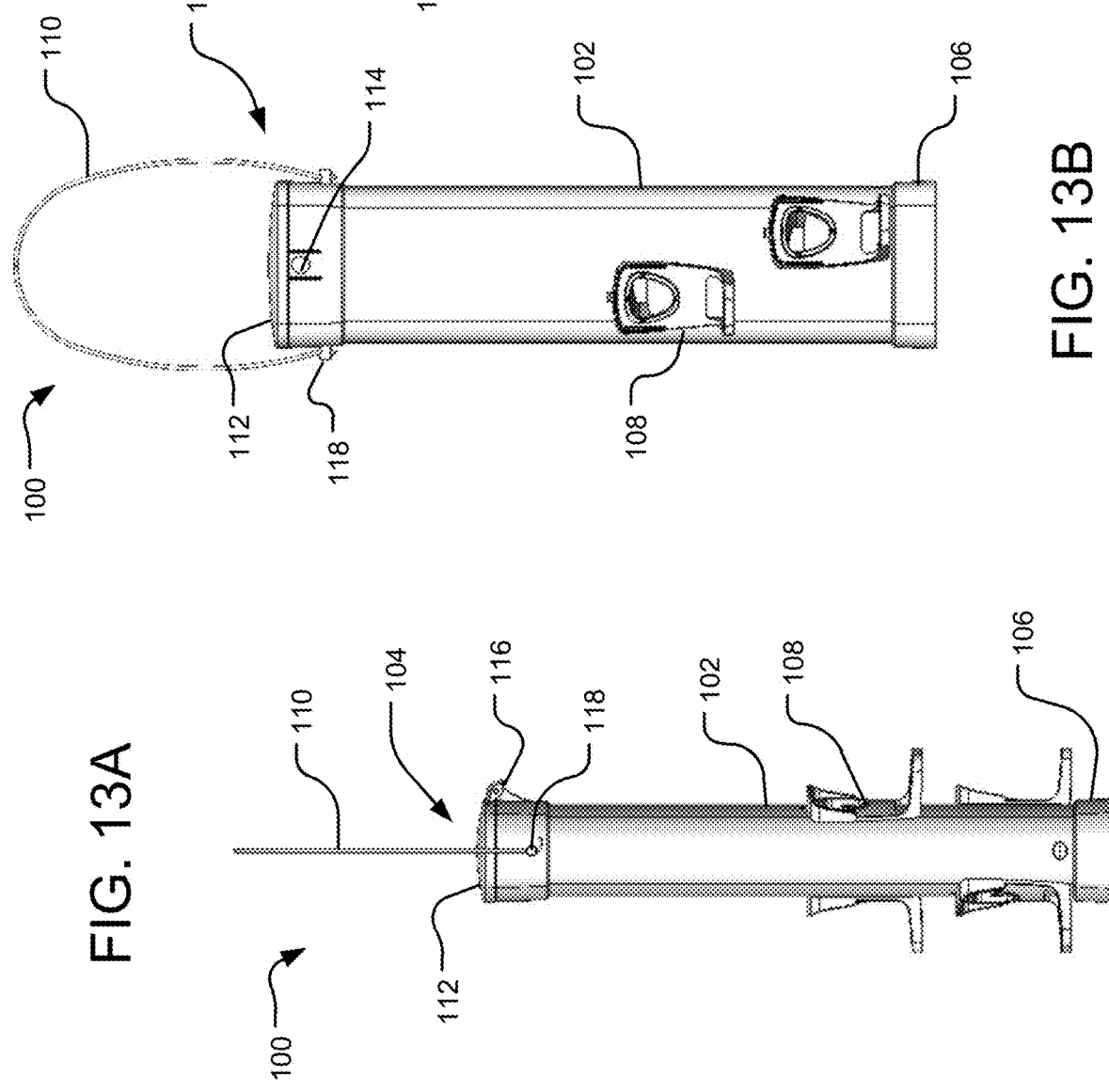

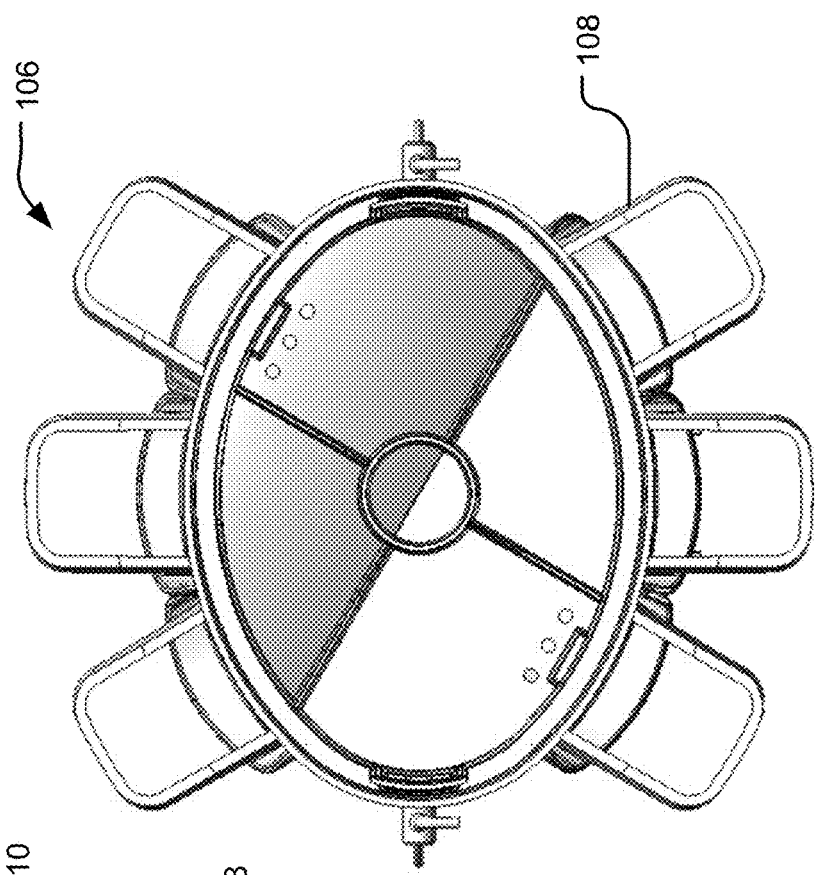
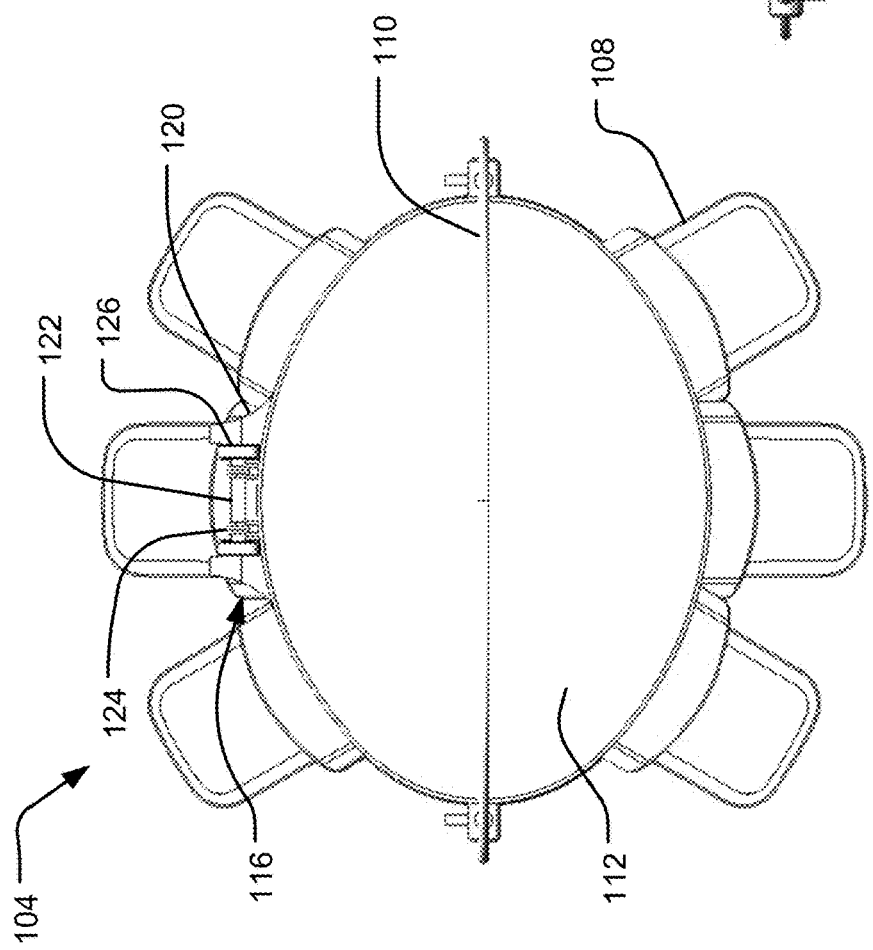
FIG. 17A
FIG. 17B

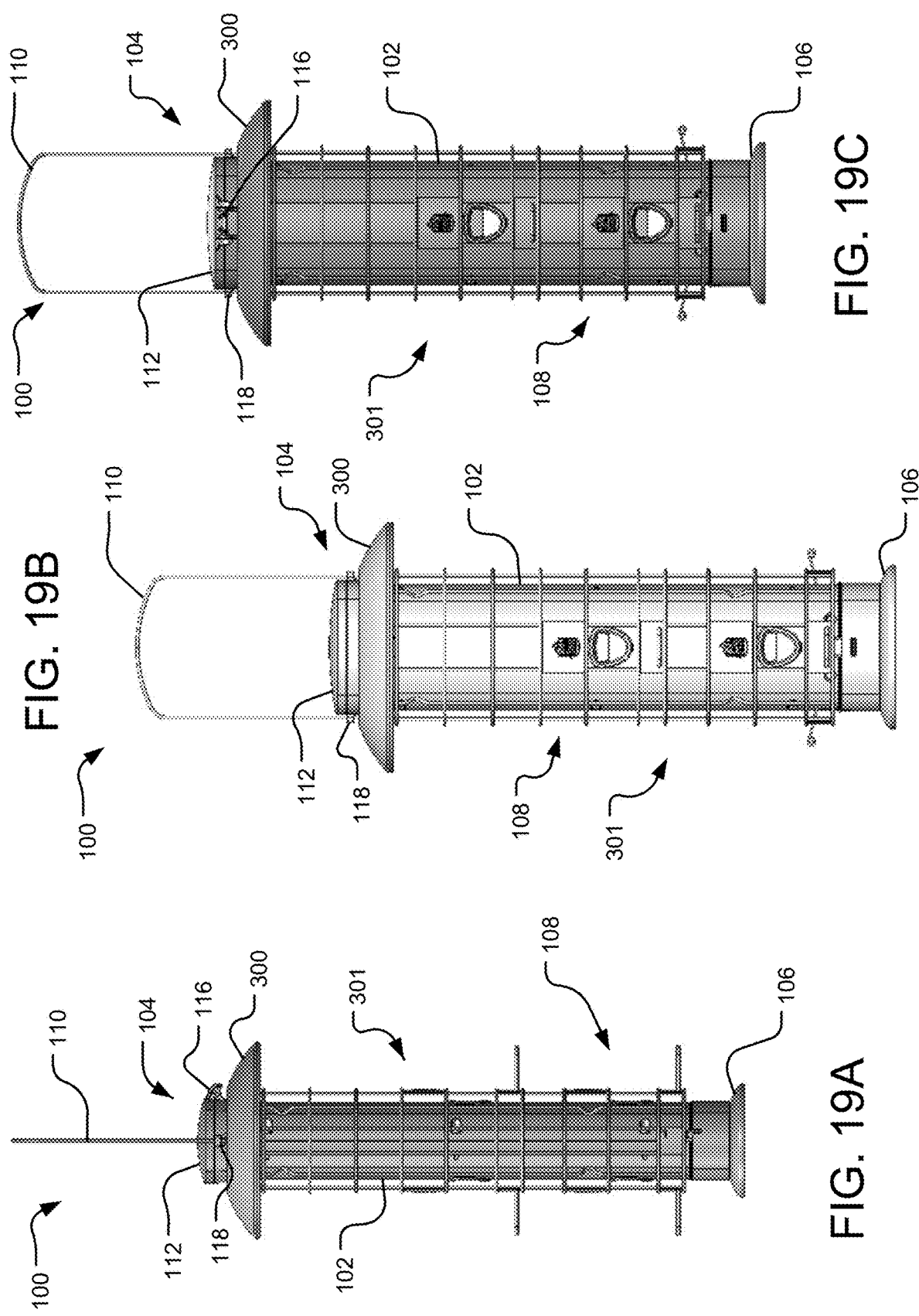

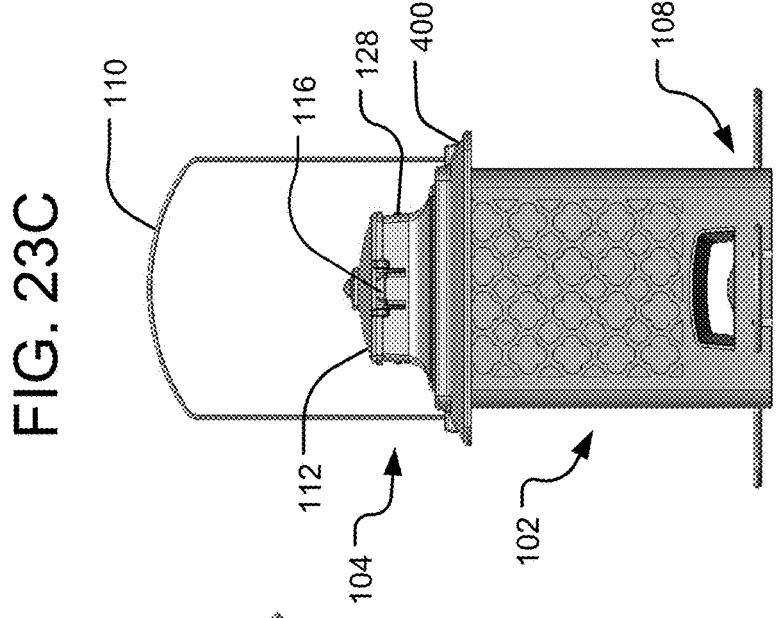
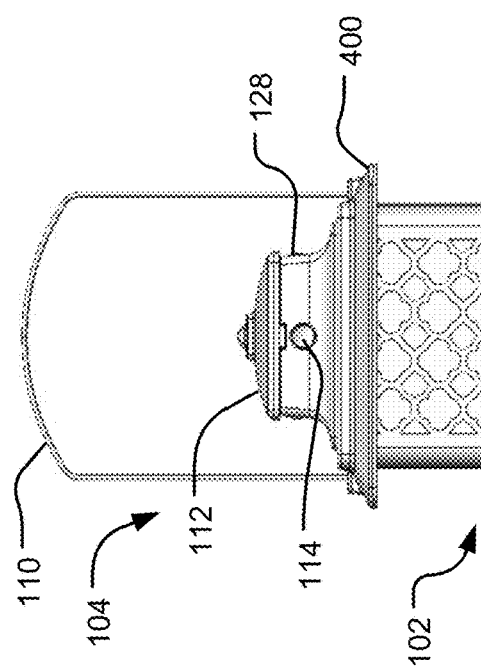
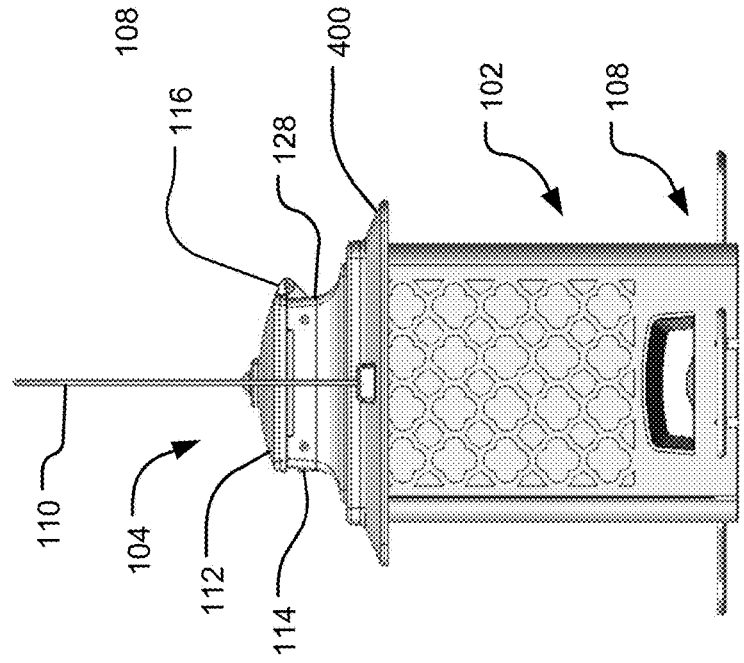

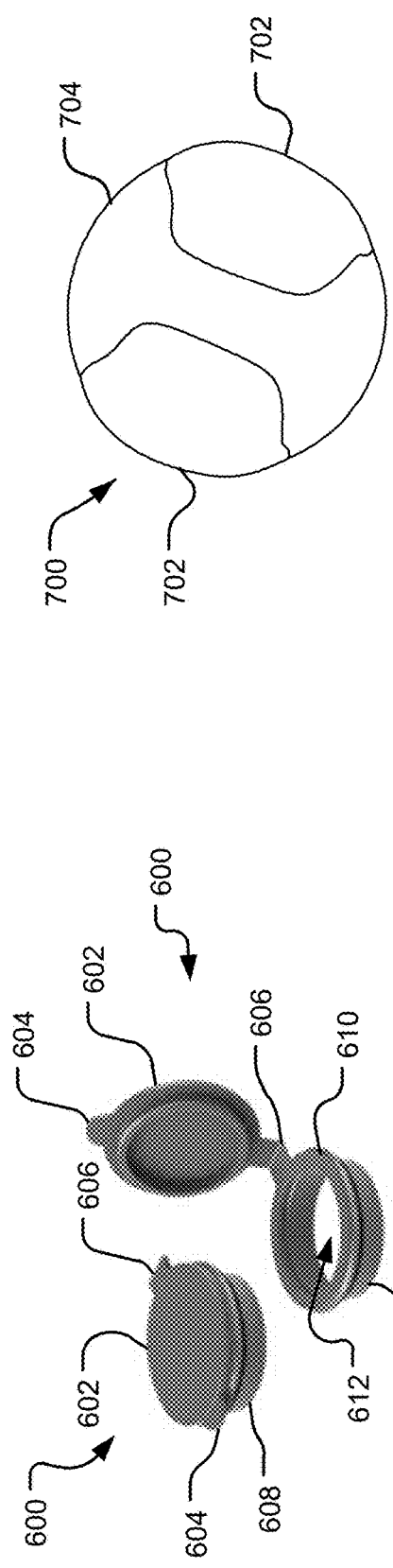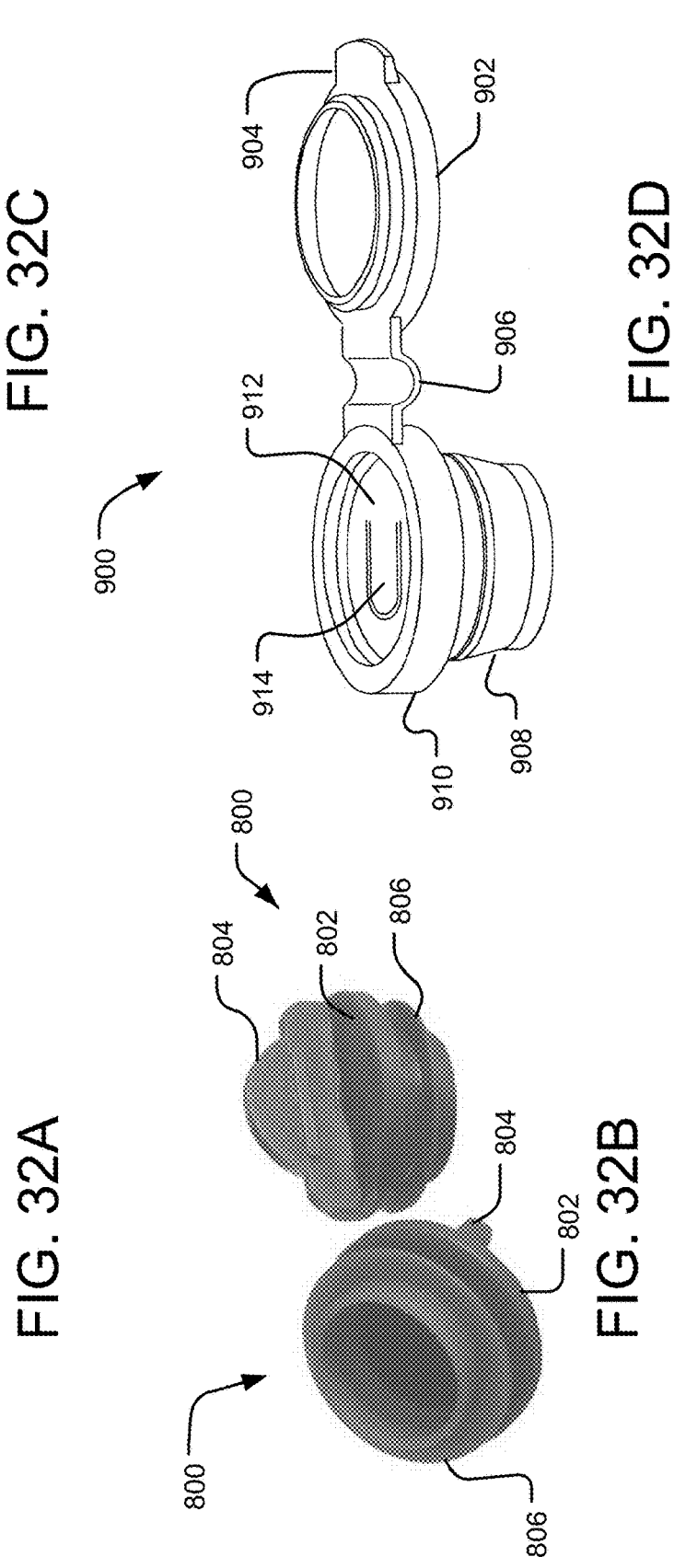

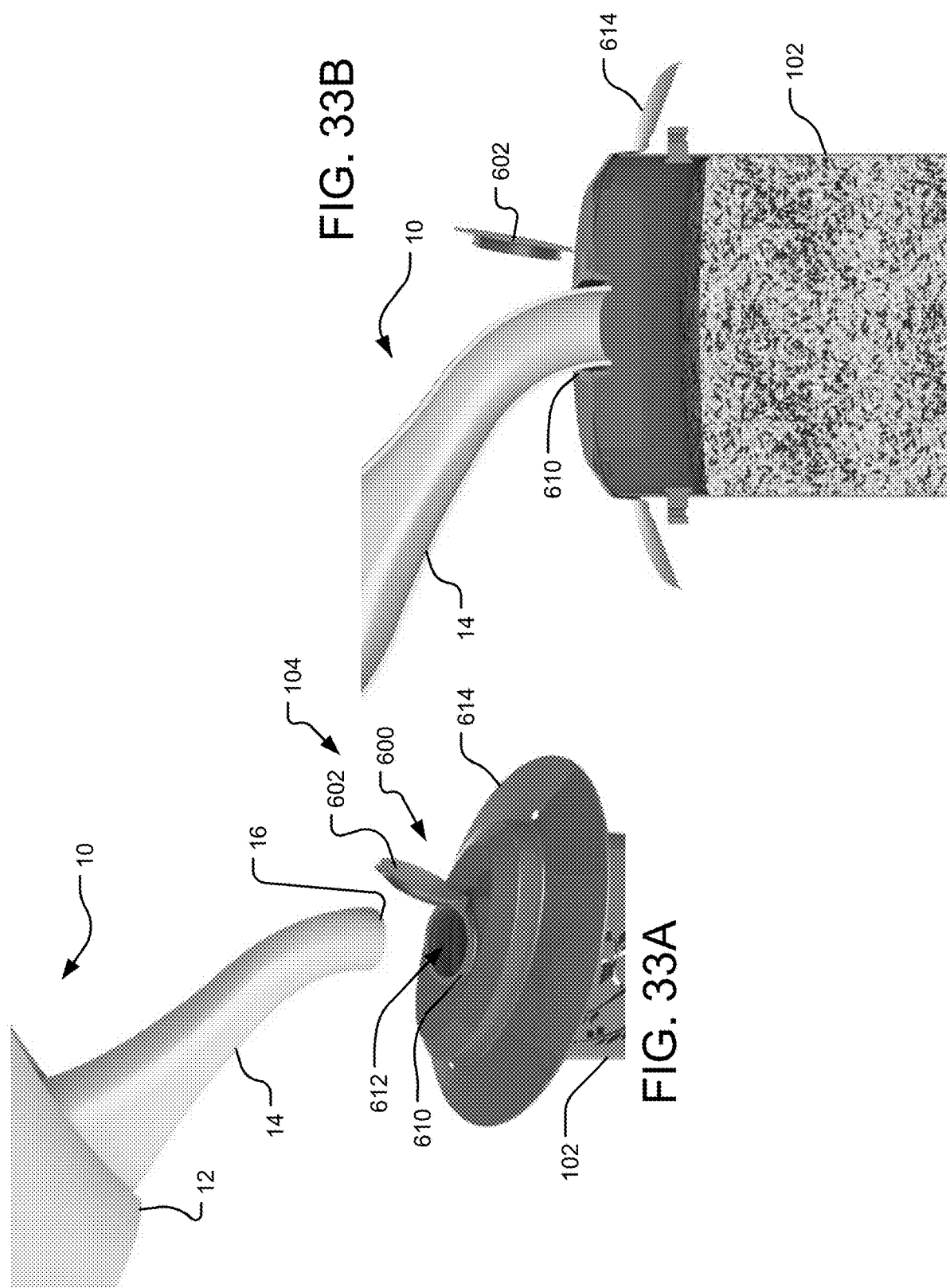

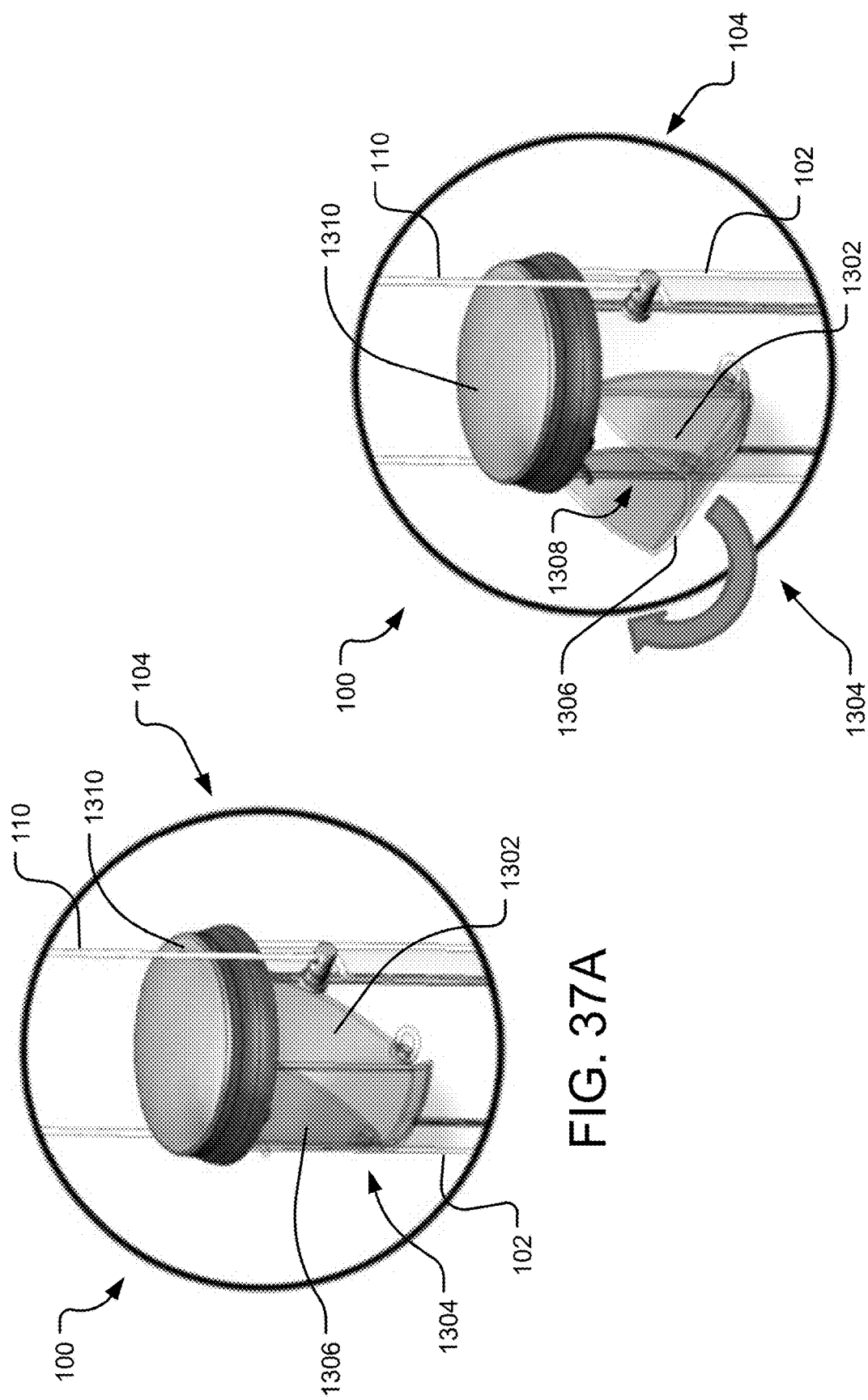

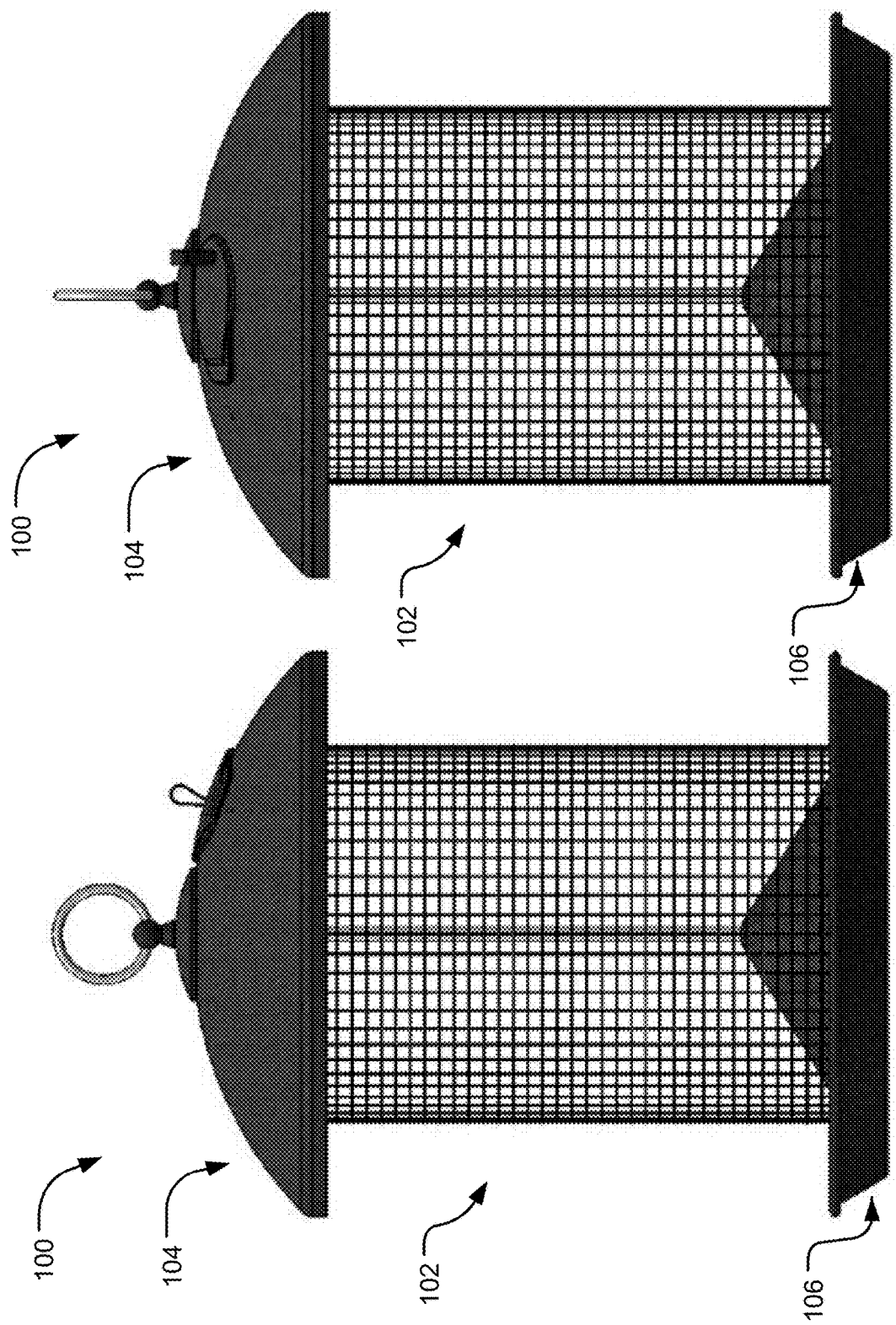

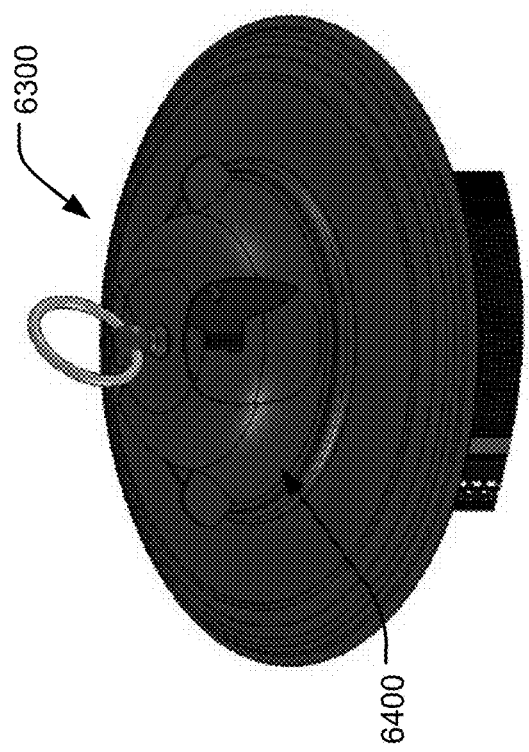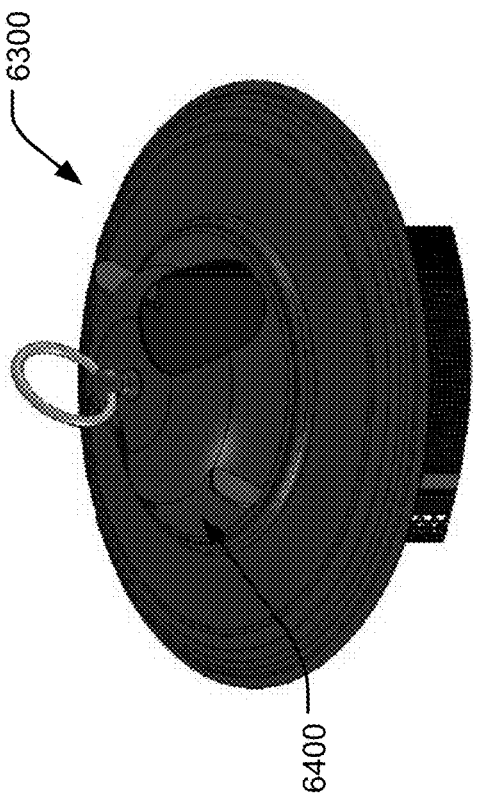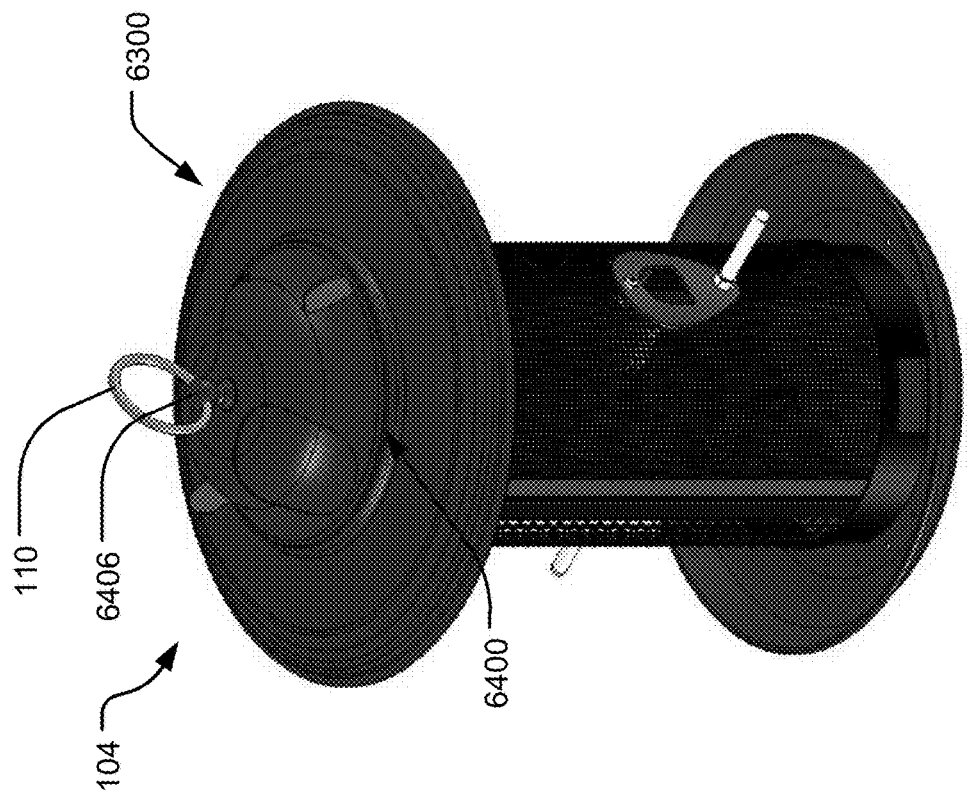

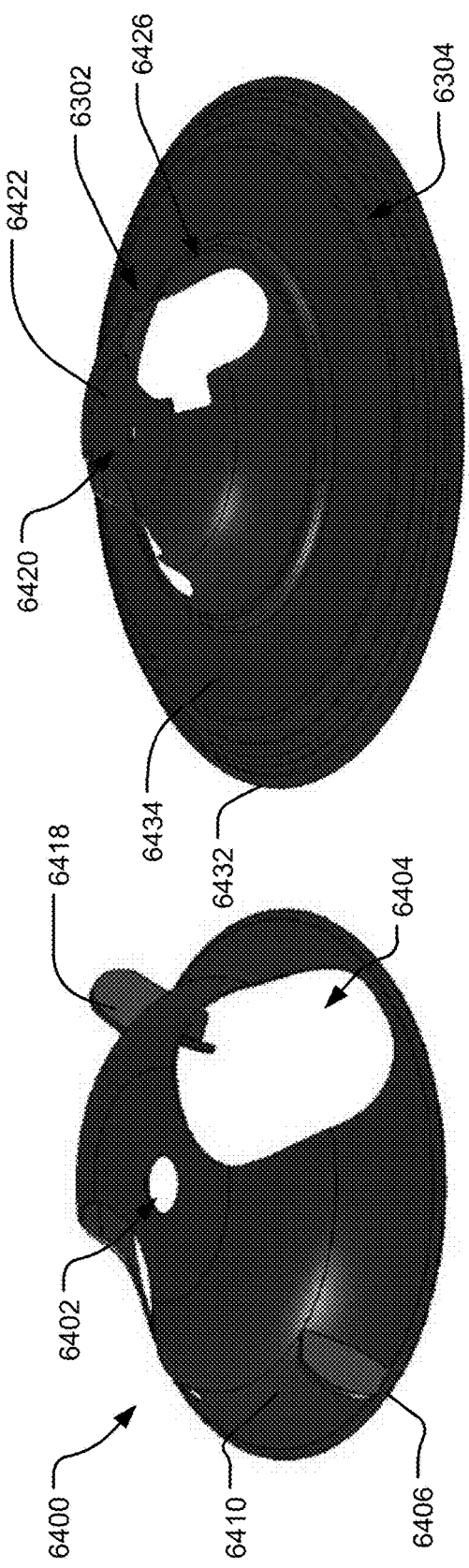
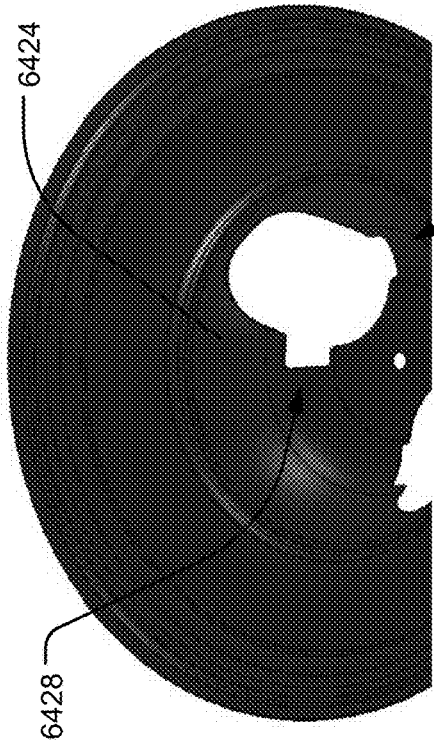
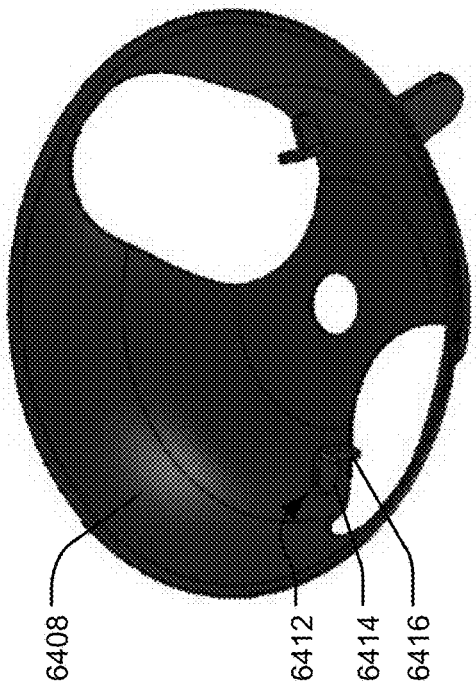
FIG. 66C
FIG. 66D
FIG. 66A
FIG. 66B

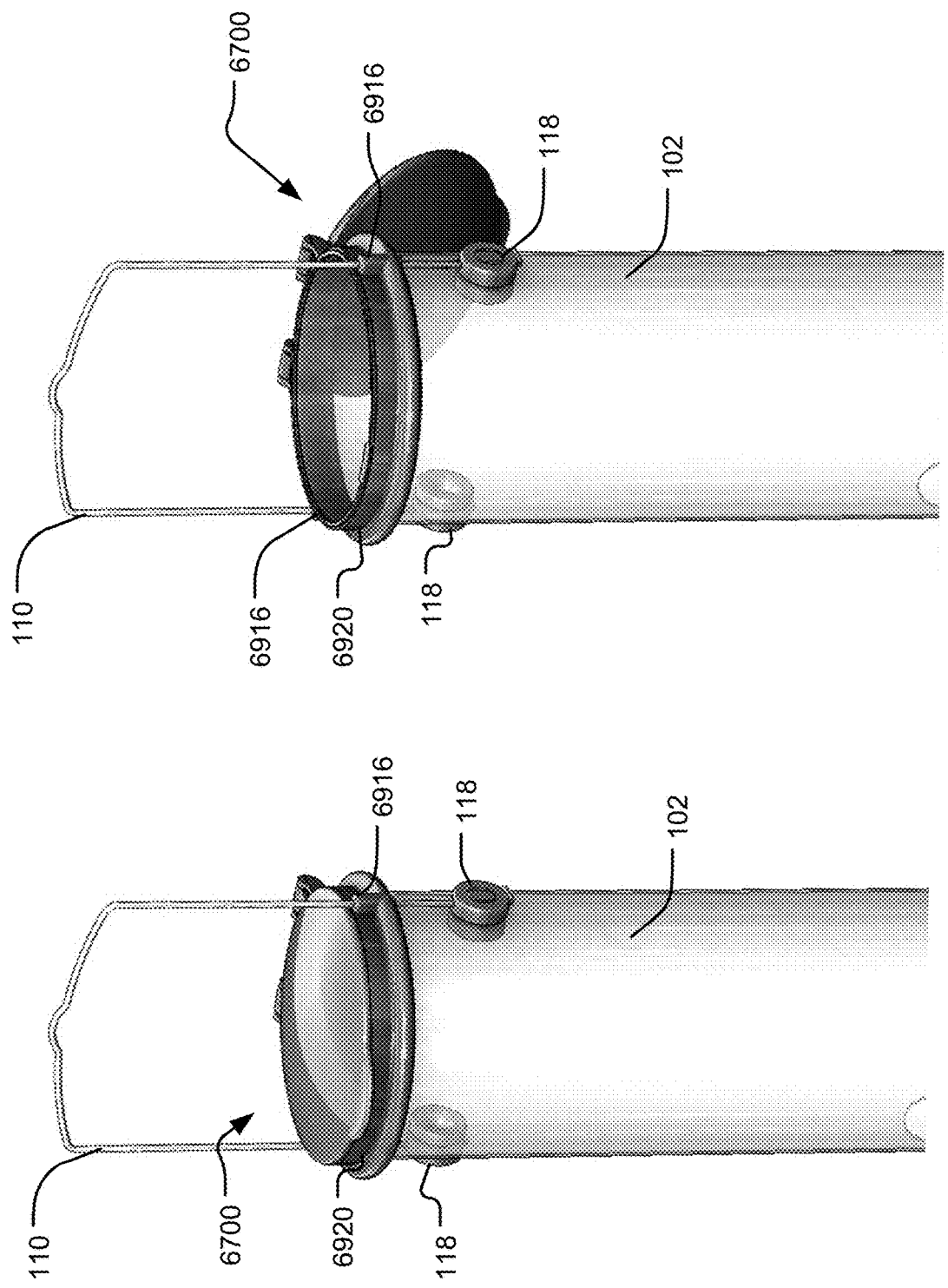

SYSTEMS AND METHODS FOR FACILITATING SEED FEEDER FILLING

CROSS-REFERENCE TO RELATED APPLICATIONS

The present application claims priority under 35 U.S.C. § 119 to U.S. Provisional Application No. 62/534,006 entitled "Systems and Methods for Facilitating Seed Feeder Filling," and filed Jul. 18, 2017. The present application is a continuation-in-part of PCT Application No. PCT/US2016/023471, entitled "Systems and Methods for Facilitating Seed Feeder Filling" and filed on Mar. 21, 2016, which is a continuation-in-part of U.S. patent application Ser. No. 29/550,881, entitled "Birdseed Tote" and filed on Jan. 7, 2016. Further, PCT Application No. PCT/US2016/023471 claims priority to U.S. Provisional Patent Application No. 62/135,618, entitled "Systems and Methods for Facilitating Seed Feeder Filling" and filed on Mar. 19, 2015. Each of these applications is incorporated by reference herein in its entirety.

BACKGROUND

Many bird feeders configured to dispense seeds are notoriously burdensome to fill. Generally, such bird feeders are suspended from a tree or other structure where birds may access the seeds. When the seed supply is depleted, a user has to remove the suspended bird feeder and carry it to where the user's stock of seed is stored for refilling. After the bird feeder is refilled, the user then carries the bird feeder back to the tree or structure and rehangs it. Having to make multiple trips each time a bird feeder is empty often deters users from refilling the bird feeder regularly and detracts from the enjoyment of the hobby. Alternatively, some users prefer to carry the stock of seed to the bird feeder for refilling. Having to carry an often heavy bag of seed back and forth similarly deters users from refilling the bird feeder regularly and detracts from the enjoyment of the hobby. Moreover, refilling bird feeders in one of these manners routinely causes seed spillage. It is with these observations in mind, among others, that various aspects of the present disclosure were conceived and developed.

BRIEF SUMMARY

Implementations described and claimed herein address the foregoing problems by providing systems and methods for facilitating filling of bird feeders configured to dispense seeds. In one implementation, an easy fill bird feeding system includes one or more easy fill bird feeders and one or more birdseed totes.

In one implementation, an easy fill bird feeder includes a body extending from a proximal end to a distal end. The body defines a reservoir with a body opening into the reservoir. The opening is disposed at the proximal end of the body. A cap assembly is connected to the body at the proximal end and covers the opening. The cap assembly includes a hinge engaging a lid to a cap base at a first side, with the hinge creating a rotation path for the lid between an open position and a closed position. The lid is releasably connected to the cap base at a second side in the closed position. A cap opening is defined by the cap base and provides access to the reservoir through the body opening. A spring assembly applies a bias on the lid towards the open position. The easy fill bird feeder includes a releasor of the cap assembly. Movement of the releasor disconnects the lid from the cap base at the second side, and the bias of the spring assembly moves the lid from the closed position to the open position upon the lid being disconnected from the cap base. The bias of the spring assembly holds the lid in the open position, providing access to the reservoir through the cap opening.

In another implementation, an easy fill bird feeder includes a body extending from a proximal end to a distal end. The body defines a reservoir with a body opening into the reservoir. The opening is disposed at the proximal end of the body. A cap assembly is connected to the body at the proximal end and covers the opening. The cap assembly includes a lid engaged to a base at a first side via a transition portion, with the transition portion creating a rotation path for the lid between an open position and a closed position. The lid is releasably connected to the cap base at a second side in the closed position. A cap opening is defined by the base and provides access to the reservoir through the body opening. A spring assembly applies a bias on the lid towards the closed position. The easy fill bird feeder includes a releasor of the cap assembly. Movement of the releasor disconnects the lid from the cap base at the second side, and the bias of the spring assembly moves the lid from the closed position to the open position upon the lid being disconnected from the cap base. The bias of the spring assembly holds the lid in the closed position, automatically closing the lid when the releasor is released.

In another implementation, an easy fill bird feeder includes a body extending from a proximal end to a distal end. The body defines a reservoir with a body opening into the reservoir. The opening is disposed at the proximal end of the body. A cap assembly is connected to the body at the proximal end and covers the opening. The cap assembly includes a cover slidably coupled to a cap. The cover includes an outer and inner surface and at least one cover opening with a corresponding stop tab positioned on the inner surface. The cap includes at least one cap opening with a first and second tab receiver, the first and second tab receivers configured to receive the stop tab when the cover is rotated. When the cap is in the open position, the cover opening and cap opening align to provide access to the reservoir.

In another implementation, an upward force is received by a depression on a cap assembly connected to a body at a proximal end. The body defines a reservoir, and the cap assembly has a cap opening providing access to the reservoir. A lid of the cap assembly is released at a first side upon the depression receiving an upward force. The lid moves from the closed position to the open position along a rotation path created by a hinge at a second side. The open position provides access to the reservoir through the cap opening. Birdseed is received through the cap opening into the reservoir.

In another implementation, an easy fill bird feeder includes a body extending from a proximal end to a distal end. The body defines a reservoir with a body opening into the reservoir. The opening is disposed at the proximal end of the body. A cap assembly is connected to the body at the proximal end and covers the opening. The cap assembly includes a lid with an upper portion and a lower portion partitioned by a step. A hanger is coupled to the lid on the lower portion and a clip is positioned on the upper portion. The clip is configured to clip to the hanger to hold the lid in an open position.

In another implementation, a depression is received of a release button on a cap assembly connected to a body at a proximal end. The body defines a reservoir, and the cap assembly has a cap opening providing access to the reservoir. A lid of the cap assembly is released at a first side upon the depression of the release button. The lid is moved from a closed position to an open position using a bias of a spring assembly upon the release of the lid. The lid moves from the closed position to the open position along a rotation path created by a hinge at a second side. The lid is held in the open position by the spring bias, and the open position provides access to the reservoir through the cap opening. Birdseed is received through the cap opening into the reservoir.

In still another implementation, a birdseed tote includes a pair of opposing sidewalls each extending from a distal end to a proximal end and between a front end and a back end. A distal surface connects the distal ends of the pair of opposing side walls, and a back wall connects the back ends of the pair of opposing side walls. A neck extends from the front ends of the pair of opposing side walls. The pair of opposing sidewalls, the back wall, the distal surface, and the neck form a tote body configured to hold birdseed. The tote body has a proximal edge extending along a plane. The neck includes a neck surface extending along a contour from the distal surface to a spout. An axis line of the spout extends parallel to the plane of the proximal edge of the tote body. The neck surface is shaped to direct the birdseed from the distal surface through an opening in the spout without an orientation of the plane extending past a perpendicular angle to a target.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 1 illustrates an example easy fill bird feeding system including an easy fill bird feeder and a birdseed tote.

FIGS. 4A and 4B show top and bottom views, respectively, of the bird feeder of FIG. 2.

FIG. 8A shows a top view of the cap assembly of FIG. 7.

FIG. 8B is the same view as FIG. 8A with the lid removed for clarity.

FIGS. 13A-13C illustrate side, front, and back views, respectively, of the bird feeder of FIG. 12.

FIGS. 17A and 17B show top and bottom views, respectively, of the bird feeder of FIG. 15.

FIGS. 19A-19C illustrate side, front, and back views, respectively, of the bird feeder of FIG. 18.

FIGS. 23A-23C illustrate side, front, and back views, respectively, of the bird feeder of FIG. 22.

FIG. 32A shows an example flip plug for a cap assembly open and closed.

FIG. 32B shows a perspective side view and a perspective bottom view of an example twist plug for a cap assembly.

FIG. 32C shows a top view of an example squeeze plug for a cap assembly.

FIG. 32D shows a perspective side view of another example flip plug for a cap assembly.

FIGS. 33A and 33B illustrate a cap assembly with the flip plug of FIG. 32A with a birdseed tote removed and inserted, respectively.

FIGS. 37A and 37B illustrate a cap assembly with an example chute, closed and open, respectively.

FIGS. 64A-B are a first view and a second view, respectively, of the cap assembly shown in FIGS. 60A-B on another example bird feeder.

FIGS. 65A-C illustrate an example cap assembly including a cover slidably coupled to a cap. FIG. 65A is an isometric view of the cap assembly in a closed position on an example bird feeder. FIGS. 65B-C are an isometric view of the cap assembly in a partially opened position and a fully opened position, respectively.

FIGS. 66A-D illustrate an example cap and cover of the cap assembly shown in FIGS. 65A-C. FIGS. 66A-B are an isometric top view and an isometric bottom view, respectively, of the cover. FIGS. 66C-D are an isometric top view and an isometric bottom view, respectively, of the cap.

FIGS. 70A-B show the example cap assembly of FIGS. 69A-B on an example bird feeder in the closed and open position, respectively.

DETAILED DESCRIPTION

Figure 2:
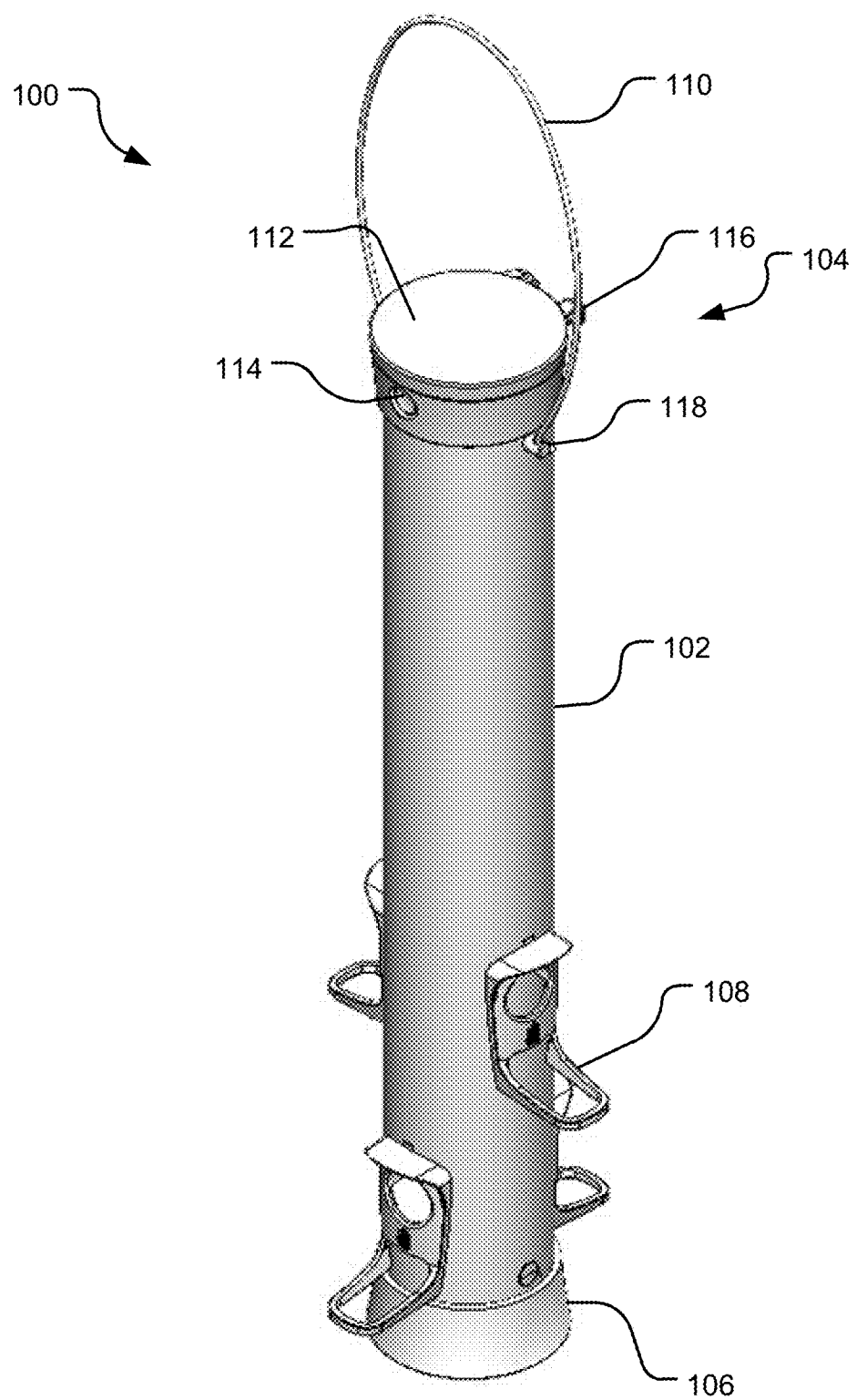
FIG. 2 shows an isometric view of an example easy fill bird feeder.
Figure 3C:
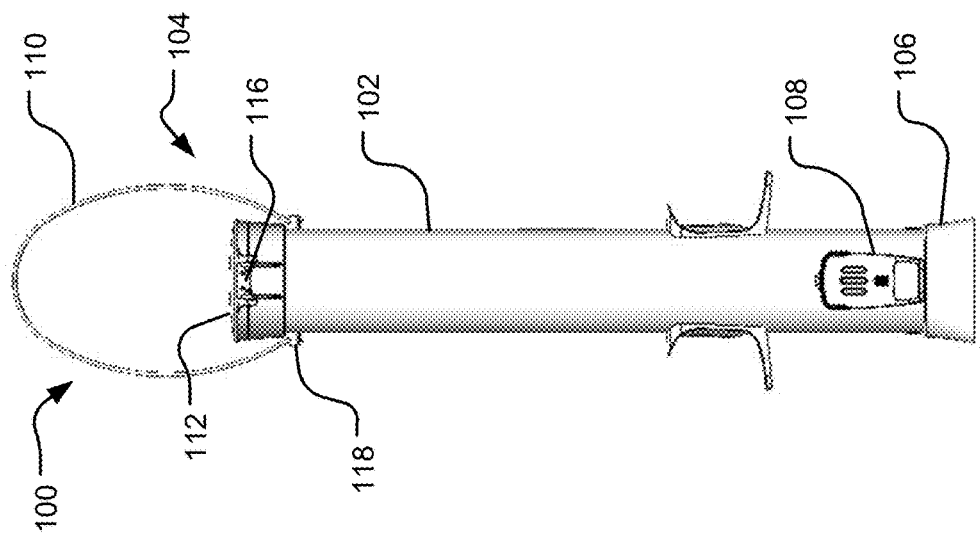
FIGS. 3A-3C illustrate side, front, and back views, respectively, of the bird feeder of FIG. 2.
Figure 3B:
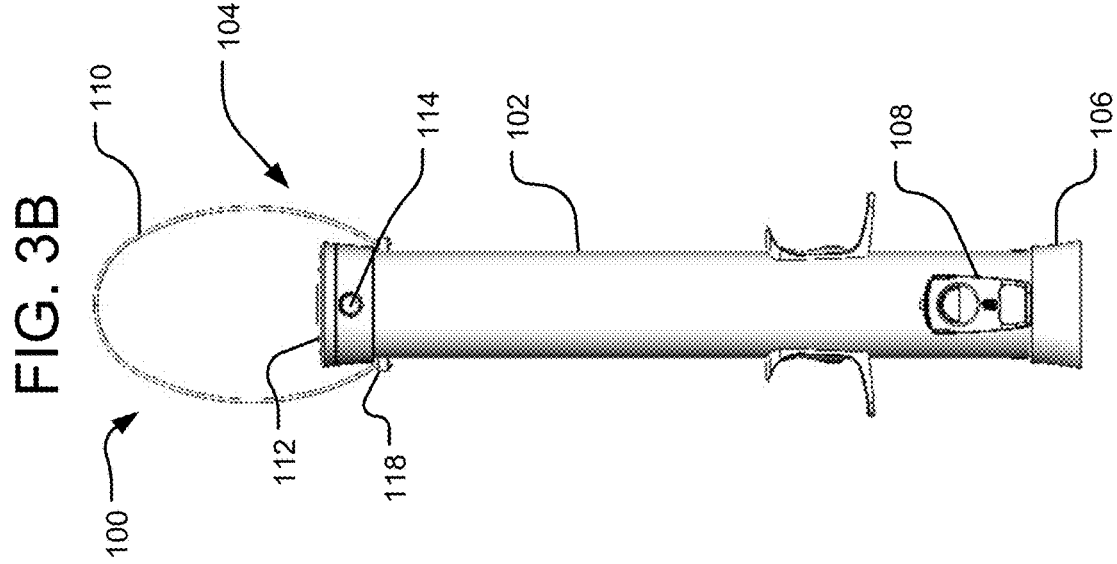
Figure 3A:
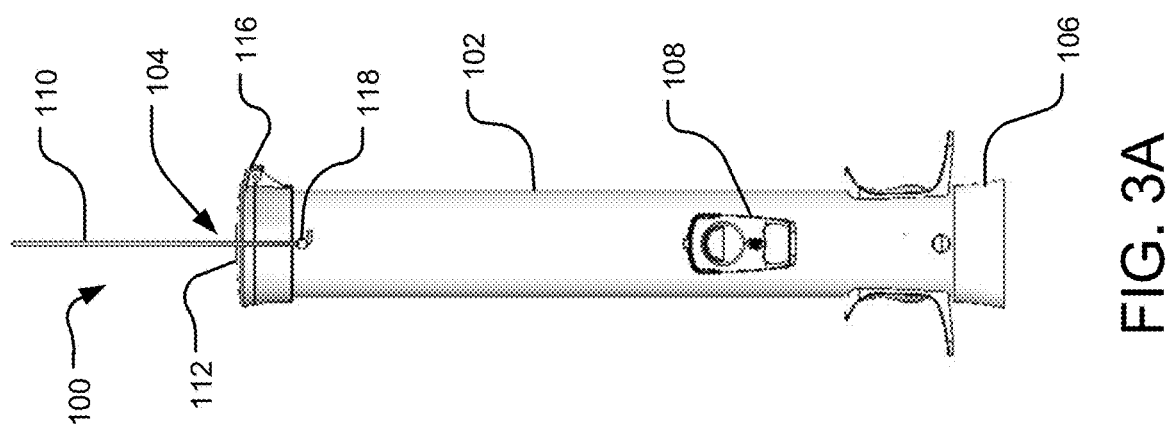

Aspects of the present disclosure involve systems and methods for facilitating bird feeder filling. In one aspect, an easy fill bird feeding system includes at least one bird feeder and a birdseed tote. Each of the bird feeders includes a cap assembly that has a joint, such as a hinge, permitting a lid to move between an open position and a closed position. The lid may be biased towards the open position, such that upon release, the lid automatically moves from the closed position to the open position, thereby providing access to a reservoir of the bird feeder. For example, the cap assembly may include a releasor, such as a release button, that a user pushes with a finger to release and automatically move the lid to the open position for access to the reservoir for filling. A neck of the birdseed tote directs seed from an interior of the birdseed tote through a spout into the reservoir. The neck is shaped to facilitate pouring of the seed, even the last remaining seed at the bottom of the interior of the birdseed tote, into the reservoir. Once the bird feeder is refilled, the user reengages the lid by moving the lid from the open position to the closed position. The easy fill bird feeding system thus permits a user to carry the birdseed tote in a first hand, open the lid of the bird feeder with a second hand, pour the birdseed into the reservoir of the bird feeder using the first hand, and close the lid of the bird feeder with the second hand once filled. Thus, the user may easily refill one or more bird feeders without having to remove the bird feeder from where it is hanging or place the birdseed tote on the ground. The lid may also be biased towards the closed position, such that after the lid is opened, the lid will automatically move from the open position to the closed position. For example, the cap assembly may include a cap handle that a user pulls on to open the lid for access to the reservoir for filling. The spout can be inserted into the reservoir while the lid is opened. After the neck is inserted into the opening, the user can release the handle and allow the lid to begin to move to the closed position. The neck will keep the lid opened and when the neck is removed the lid will automatically move to the closed position. The lid biased towards the closed position removes the last step of closing the lid of the bird feeder with the second hand once filled.

The various systems and methods disclosed herein generally provide for facilitating filling of a reservoir covered by a lid. The example implementations discussed herein reference bird feeders and birdseed. However, it will be appreciated by those skilled in the art that the presently disclosed technology is applicable to other reservoir devices and filling substances, such as liquid substances (e.g., water) or solid substances. Further, various example implementations of such bird feeders and birdseed totes are shown in the drawings. It will be appreciated that other executions of bird feeders and birdseed totes are contemplated.

To begin a detailed discussion of an example easy fill bird feeding system 5, reference is made to FIG. 1. In one implementation, the easy fill bird feeding system 5 includes one or more birdseed totes 10 and one or more easy fill bird feeders 100. As detailed herein, the easy fill bird feeding system 5 permits a user to fill the bird feeder 100 without having to remove the bird feeder 100 from where it is hanging or place the birdseed tote 10 on the ground. The bird feeder 100 may be opened and closed using one hand, while the other hand is used to pour birdseed from the birdseed tote 10 into the bird feeder 100. The process of filling the bird feeder 100 is thus simplified and hassle-free, thereby allowing the user to focus on the enjoyable aspects of the hobby.

Turning to FIGS. 2-4B, a first example of the easy fill bird feeder 100 is illustrated. In one implementation, the easy fill bird feeder 100 includes a body 102 extending from a proximal end to a distal end. The body 102 may be a variety of shapes and sizes and/or include various design features. For example, the body 102 may be cylindrical, spherical, cubical, pyramidal, conical, and/or other shapes with angled, contoured, and/or linear surfaces. In the example shown in FIGS. 2-4B, the body 102 is cylindrical in shape with a circular cross-section. The body 102 may further be made from a variety of materials, including, but not limited to, plastic, glass, metal, ceramic, organic material, and/or the like. The body 102 defines a reservoir configured to hold a supply of birdseed.

A cap assembly 104 is disposed at the proximal end of the body 102, and a base 106 is disposed at the distal end of the body 102. In one implementation, the cap assembly 104 is connected to the body 102 at the proximal end to cover and uncover an opening of the body 102 into the reservoir for filling the reservoir with birdseed. One or more perches 108 are positioned relative to access ports in the reservoir 102 through which a bird may access the birdseed. In one implementation, the perches 108 are disposed in opposing pairs with one perch 108 disposed on a side opposite a corresponding perch 108. More particularly, a front perch is opposite a back perch and a first side perch is opposite a second side perch. The base 106 may include one or more angled surfaces configured to direct the supply of seed to the access ports.

A hanger 110 is configured to suspend the bird feeder 100 from a hanging structure, such as a tree, pole, or the like. In one implementation, the hanger 110 is adjustable to set a height of the bird feeder 100 that is customized for the user. Stated differently, the hanger 110 may be adjusted so that the cap assembly 104 is at a height where the user is able to easily insert a spout of the birdseed tote 10 into the cap assembly 104 for filling. The hanger 110 may be mounted to the reservoir 102, for example, using a hanging rod 118 extending transversely through the body 102.

The cap assembly 104 generally includes a lid 112, a releasor 114, and a joint assembly 116, permitting the lid 112 to move between an open position and a closed position. The lid 112 is biased towards the open position, such that upon release by the releasor 114, the lid 112 automatically moves from the closed position to the open position, thereby providing access to the reservoir of the bird feeder 100 for filling. The joint assembly 116 may include a spring assembly, a plug assembly (e.g., a twist plug, a flip plug, squeeze plug, etc.), a chute assembly, a flip lid assembly, a valve assembly, a flap assembly, and/or the like. The releasor 114 may be any form of connection configured to disengage and move the lid 112 and/or joint assembly 116 to provide access to the reservoir of the body 102. For example, the releasor 114 may be a release button, a release switch, a release knob, or other releasor that may be depressed, pulled, slid, flipped, rotated, or otherwise moved to release the lid 112 or provide access to the reservoir. The example implementations of FIGS. 1-24B illustrate the joint assembly 116 as a spring assembly and the releasor 114 as a release button. However, it will be appreciated that such depictions and references to the release button 114 and the spring assembly 116 are exemplary only and not intended to be limiting.

Figure 5:
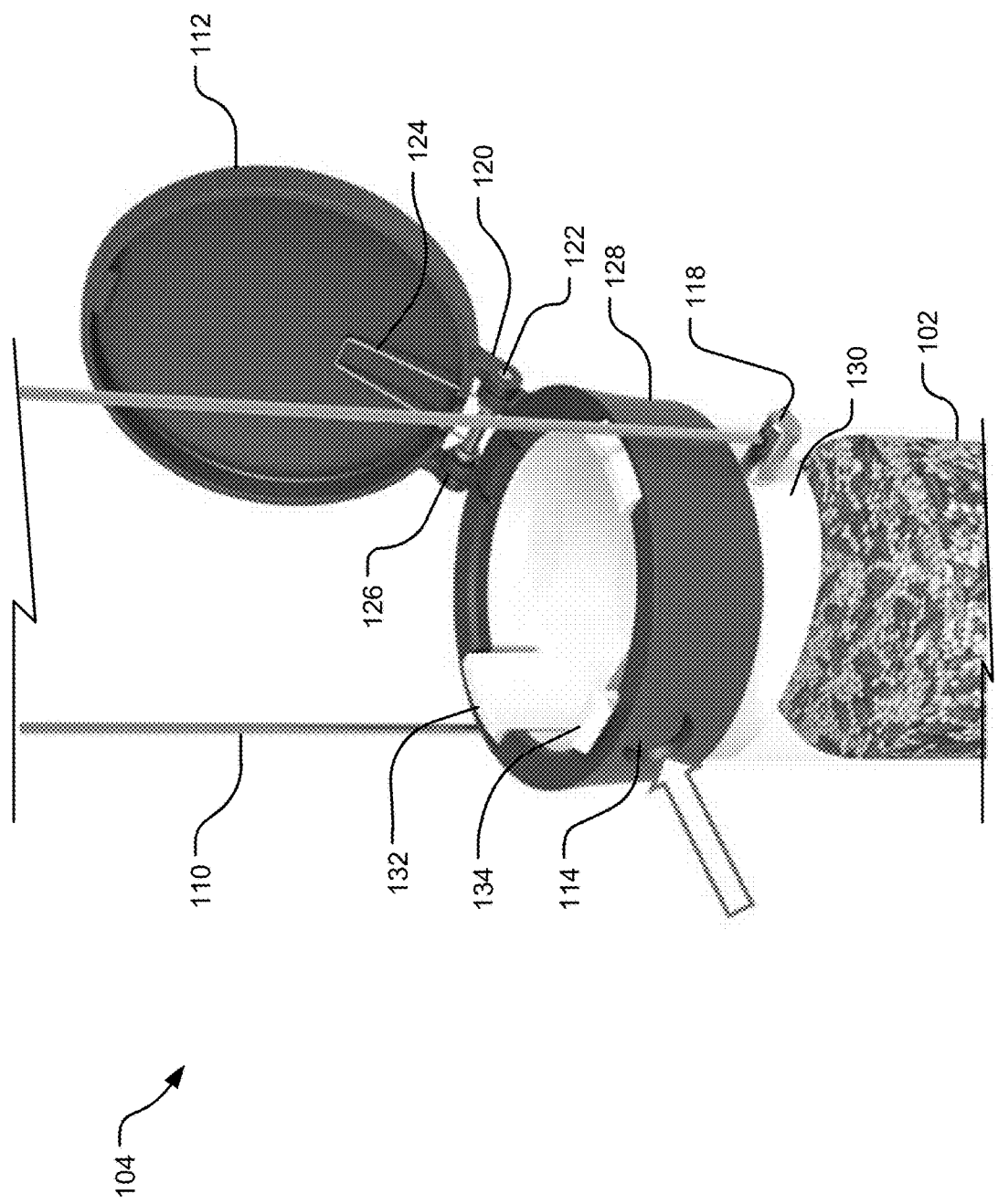
FIG. 5 is a detailed view of an example cap assembly of the bird feeder of FIG. 2.
Figure 6:
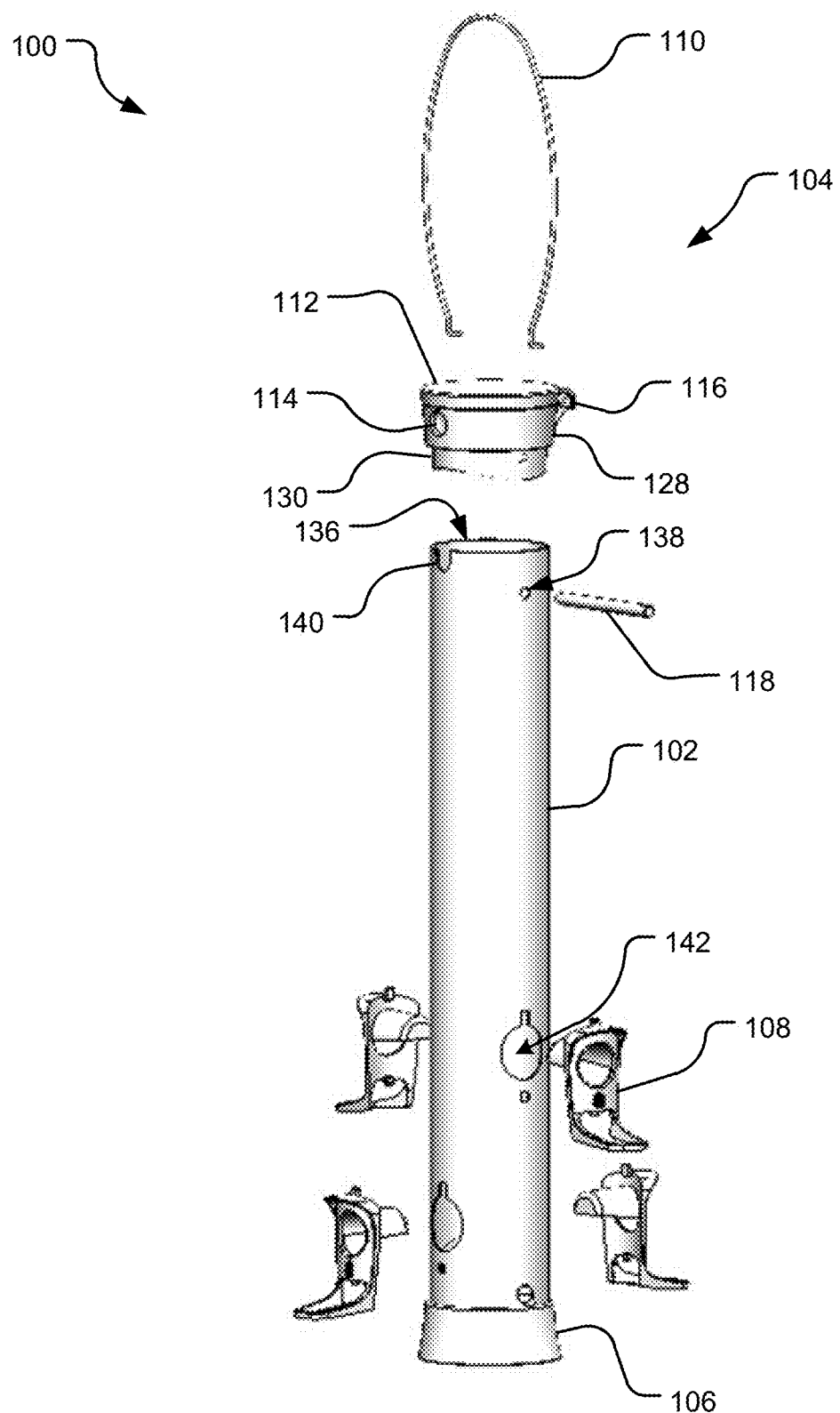
FIG. 6 is an exploded view of the bird feeder of FIG. 2.
Figure 7:
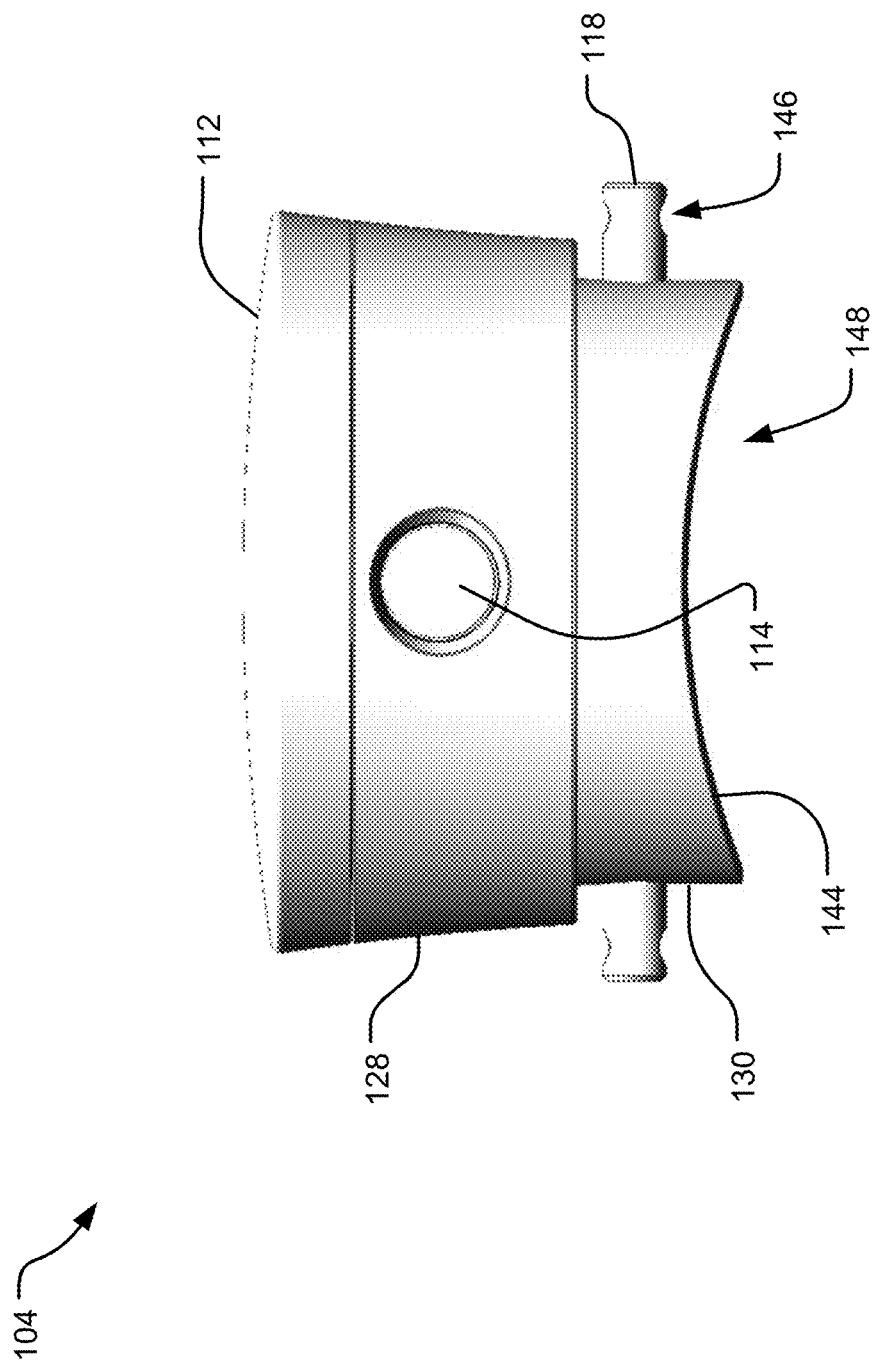
FIG. 7 shows a front view of the cap assembly of FIG. 4.

In one implementation, to fill the bird feeder 100, a user engages the release button 114, which releases the lid 112 using a spring assembly 116 having one or more protrusions 120 through which a pin 122 may be inserted to engage one or more corresponding protrusions 126 to create a hinge. The hinge provides an angle of rotation for the lid 112, permitting the lid 112 to move between the open position and the closed position along a rotation path. The spring assembly 116 automatically flips the lid 112 to the open position, as shown in FIG. 5. As such, the user may open the bird feeder 100 for filling while the bird feeder 100 remains suspended from the hanging structure. The bias of the spring assembly 116 ensures that the lid 112 remains in the open position throughout filling. Upon receiving an external force against the lid 112, the lid 112 moves from the open position to the closed position, where the lid 112 is then re-engaged and secured in the closed position. Thus, a user may easily open and close the lid 112 with one hand while holding a birdseed tote 10 in the other.

Referring to FIG. 5, in one implementation, the lid 112 of the cap assembly 104 includes a pair of the protrusions 120, and a cap base 128 includes a pair of the corresponding protrusions 126. The hinge of the spring assembly 116 is formed by inserting the pin 122 through holes in the pair of protrusions 120, the corresponding protrusions 126, and a spring 124, such that the spring 124 exerts a spring bias against a surface of the lid 112. The spring 124 thus is mounted on the pin 122, with the spring bias configured to automatically and quickly move the lid 112 from the closed position to the open position upon a release of the lid 112 via the release button 114.

In one implementation, the hinge engages the lid 112 to the cap base 128 at a first side, with the lid 112 releasably connected to the cap base 128 at a second side in the closed position. Depression of the release button 114 disconnects the lid 112 from the cap base 128 at the second side, with the spring bias of the spring 124 automatically moving the lid 112 from the closed position to the open position along the rotation path of the hinge. The bias of the spring 124 holds the lid 112 in the open position until an external force, such as applied by a portion of a user hand (e.g., one or more fingers), moves the lid 112 along the rotation path to the closed position where the lid 112 is connected at the first side, holding the lid 112 in the closed position.

The cap base 128 is disposed at the proximal end of the body 102 of the bird feeder 100. The cap base 128 may be secured at the proximal end of the body 102, for example, using a mount 130 having one or more side arms 132. In one implementation, the mount 130 is engaged to the body 102, and the side arms 132 extend proximally along the cap base 128 and engage the proximal edge of the cap base 128. The mount 130 may further include a lid arm 134 extending therefrom configured to engage the lid 112 to hold the lid in the closed position. Stated differently, the lid arm 134 releasably connects the lid 112 to the cap base 128. In one implementation, when the release button 114 is pushed, the lid arm 134 is displaced inwardly, thereby disconnecting the lid 112 from the cap base 128 and moving the lid 112 to the open position using the spring 124. The release button 114 may be a separate piece from the lid arm 134 or integral with the lid arm 134 as one piece.

Tuning to FIGS. 6-8B, in one implementation, the cap assembly 104 is engaged to the proximal end of the body 102 using the hanging rod 118. More particularly, the body 102 may have one or more openings into the reservoir, such as a body opening 136, rod openings 138, a cap assembly channel 140, and one or more access ports 142. In one implementation, the body opening 136 is disposed at the proximal end of the body 102, through which birdseed may be poured into the reservoir. The cap assembly 104 is connected to the body 102 at the proximal end to cover the body opening 136. In one implementation, the cap assembly 104 is connected to the body 102 by inserting the hanging rod 118 through the rod openings 138 and corresponding openings on the mount 130. Hanger openings 146 in the hanging rod 118 receive the hanger 110, preventing the hanging rod 118 from sliding out from the rod openings 138. In one implementation, the cap assembly 104 is connected to the body 102 with a distal edge 144 of the mount 130 disposed below a proximal edge of the body 102, such that a portion of the body 102 covers the mount 130 and the proximal edge of the body 102 meets the cap base 128. A cap assembly opening 148 is thus disposed within the body opening 136.

Figure 11B:
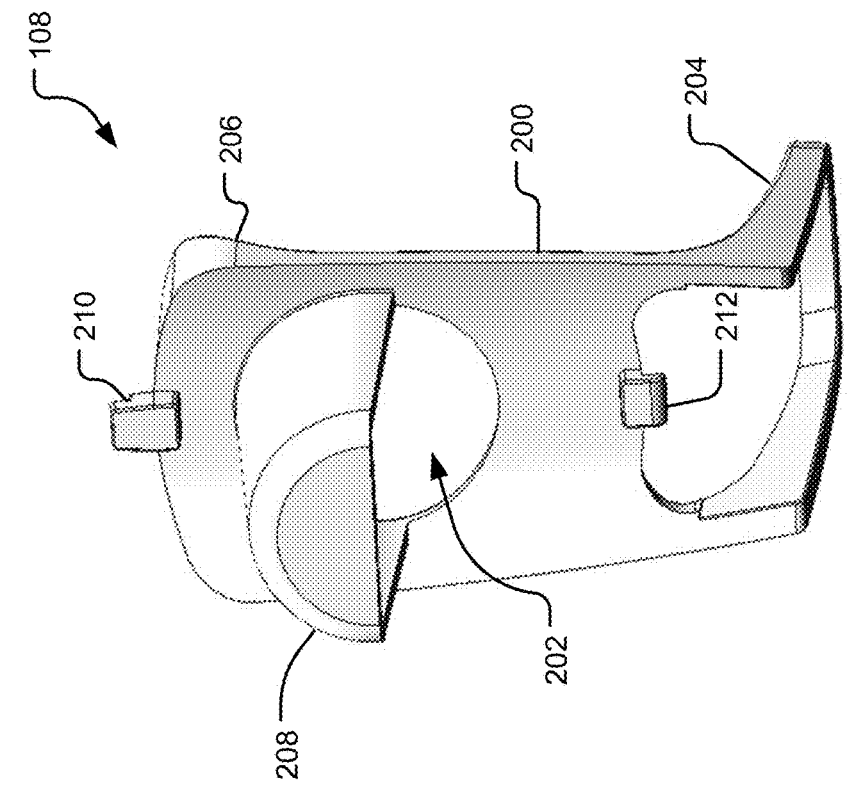
FIGS. 11A and 11B show a perspective front view and a perspective back view of an example continuous perch.
Figure 11A:
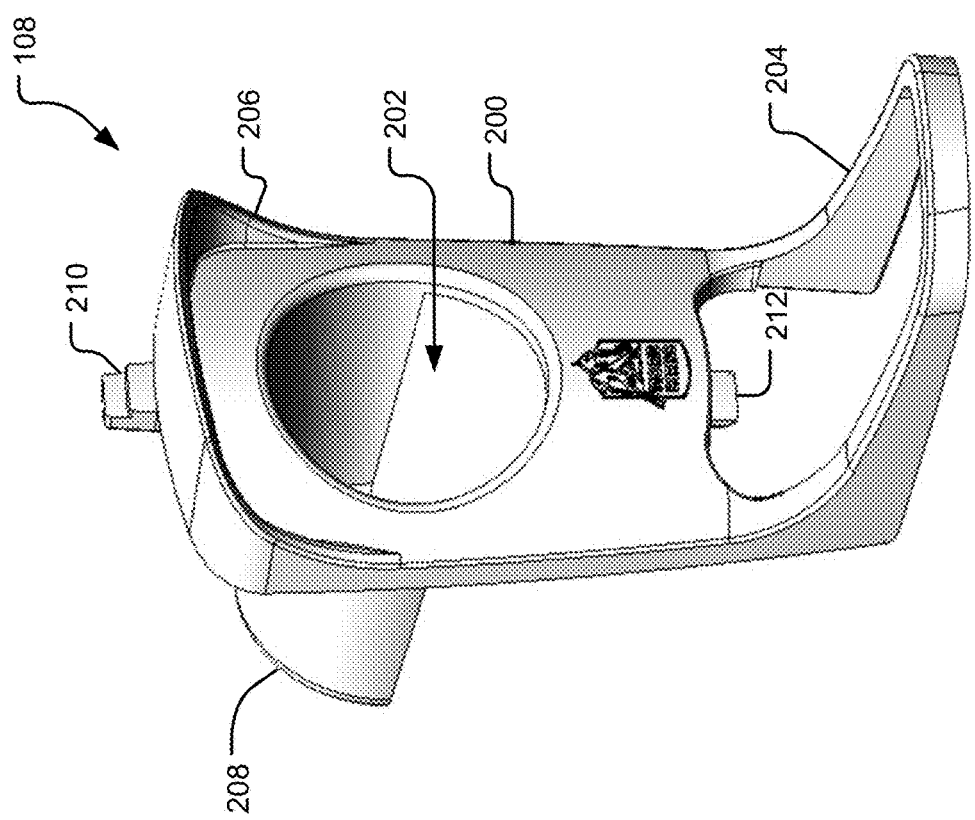
Figure 12:
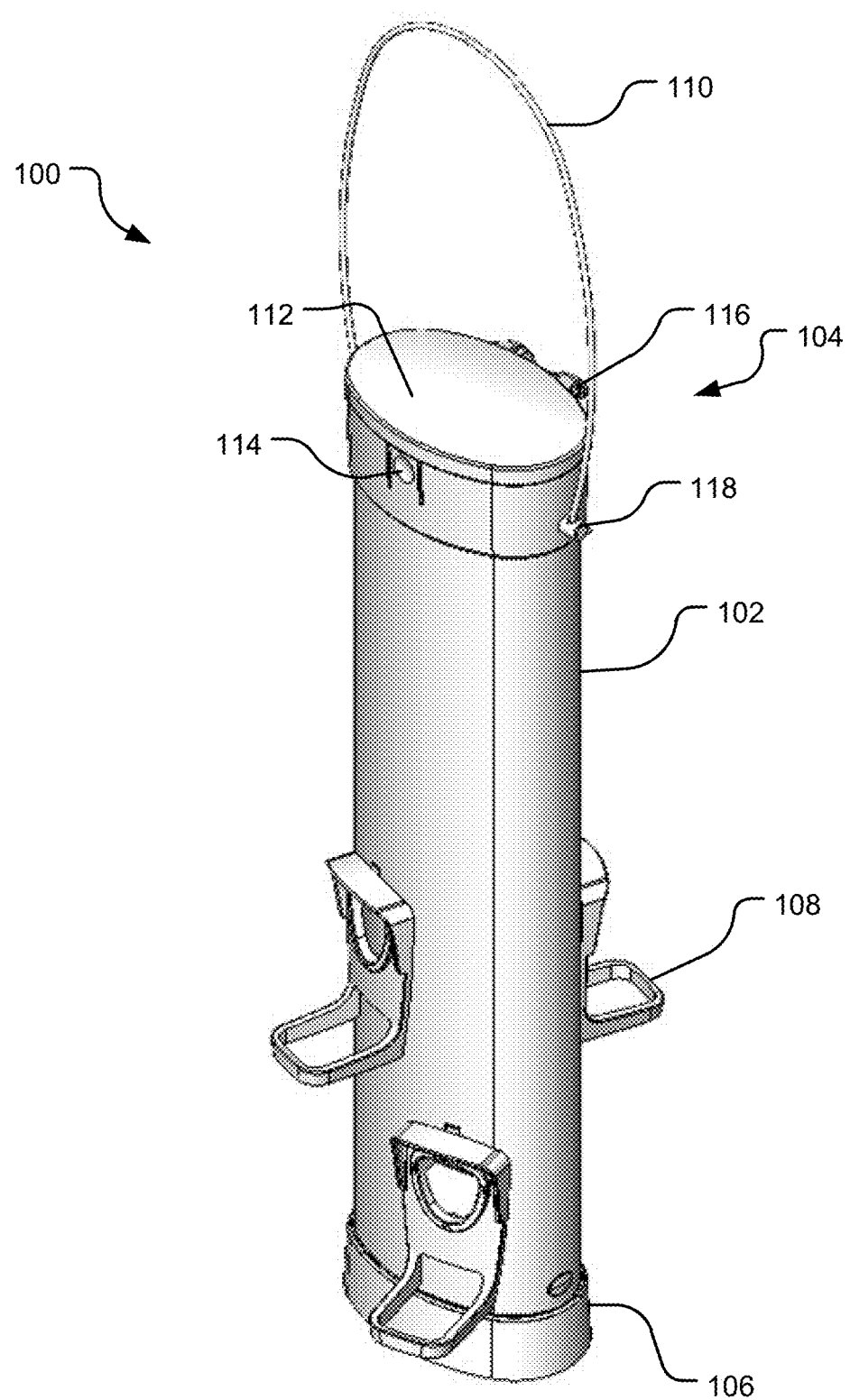
FIG. 12 shows an isometric view of another example bird feeder configured for easy filling.
Figure 14B:
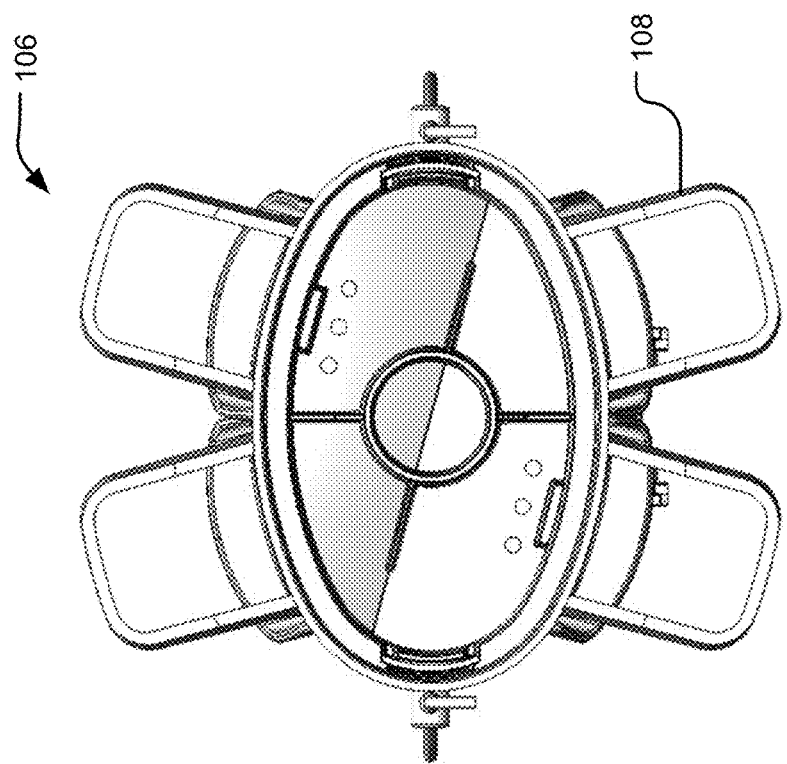
FIGS. 14A and 14B show top and bottom views, respectively, of the bird feeder of FIG. 12.
Figure 14A:
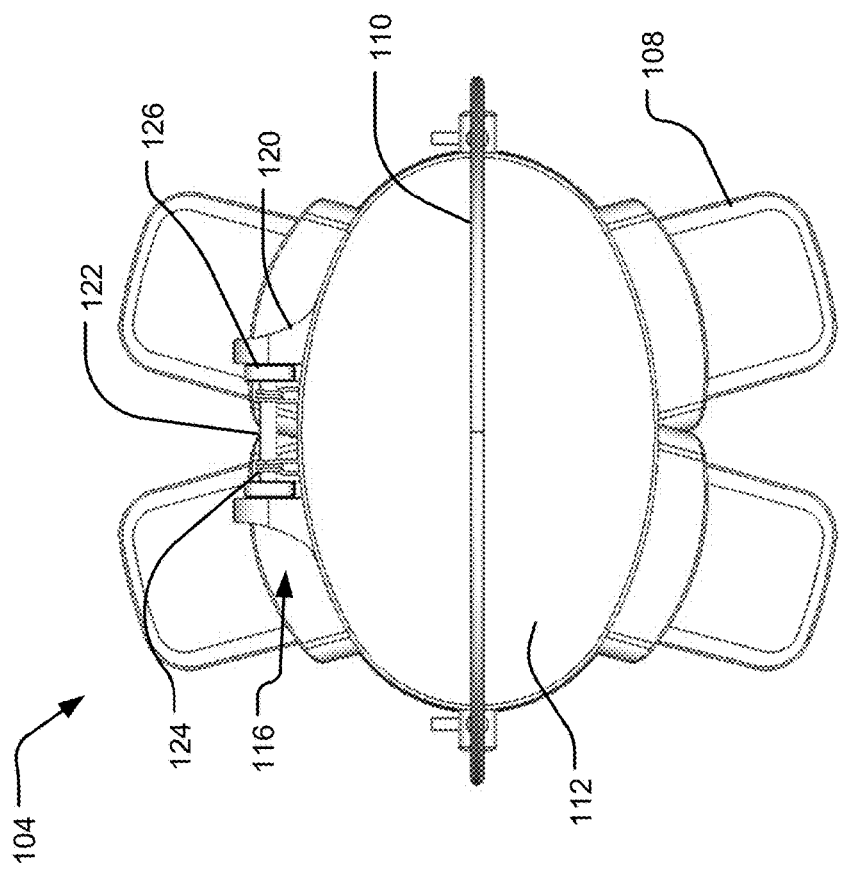
Figure 15:
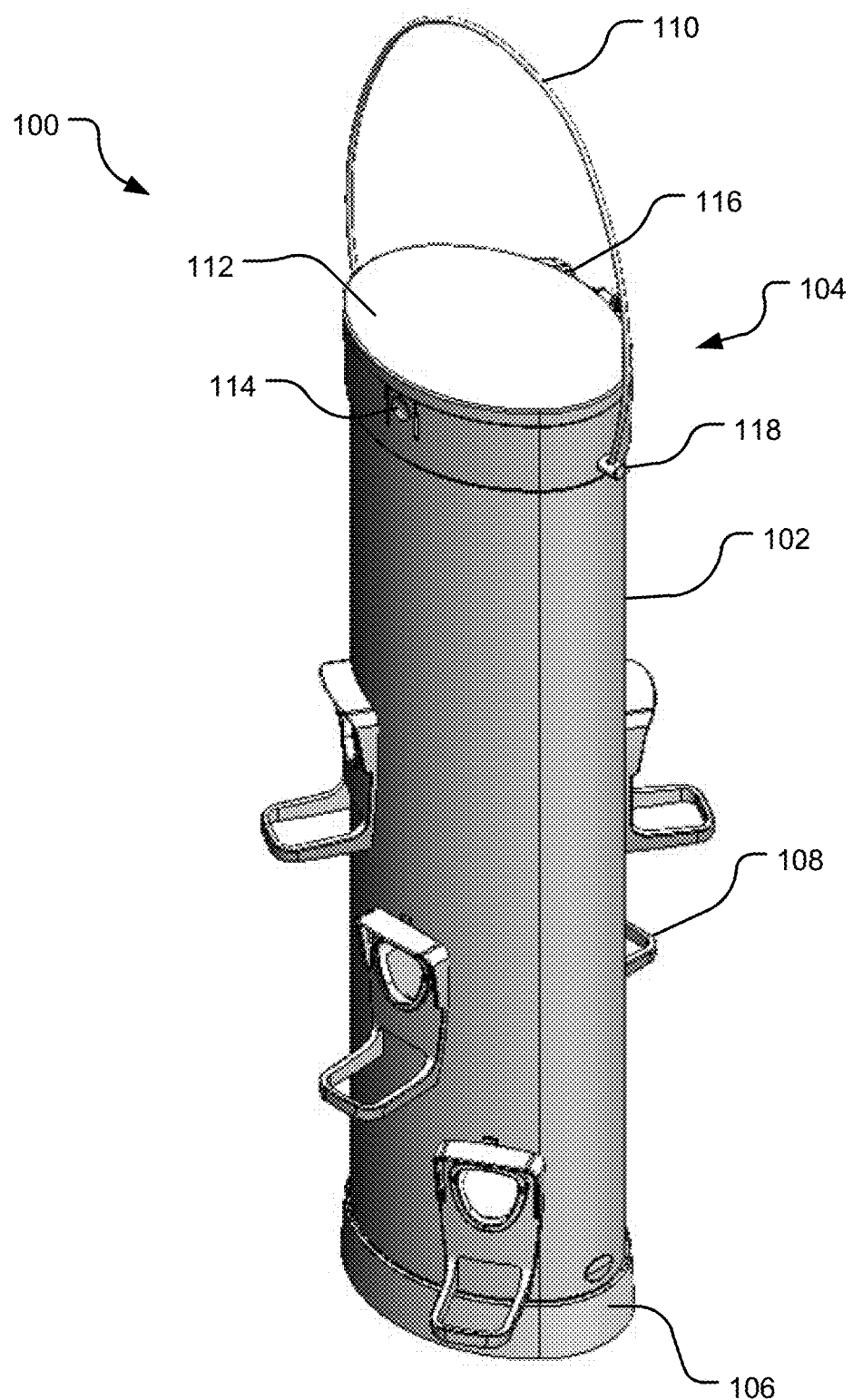
FIG. 15 shows an isometric view of another example bird feeder configured for easy filling.
Figures 16B, 16C:
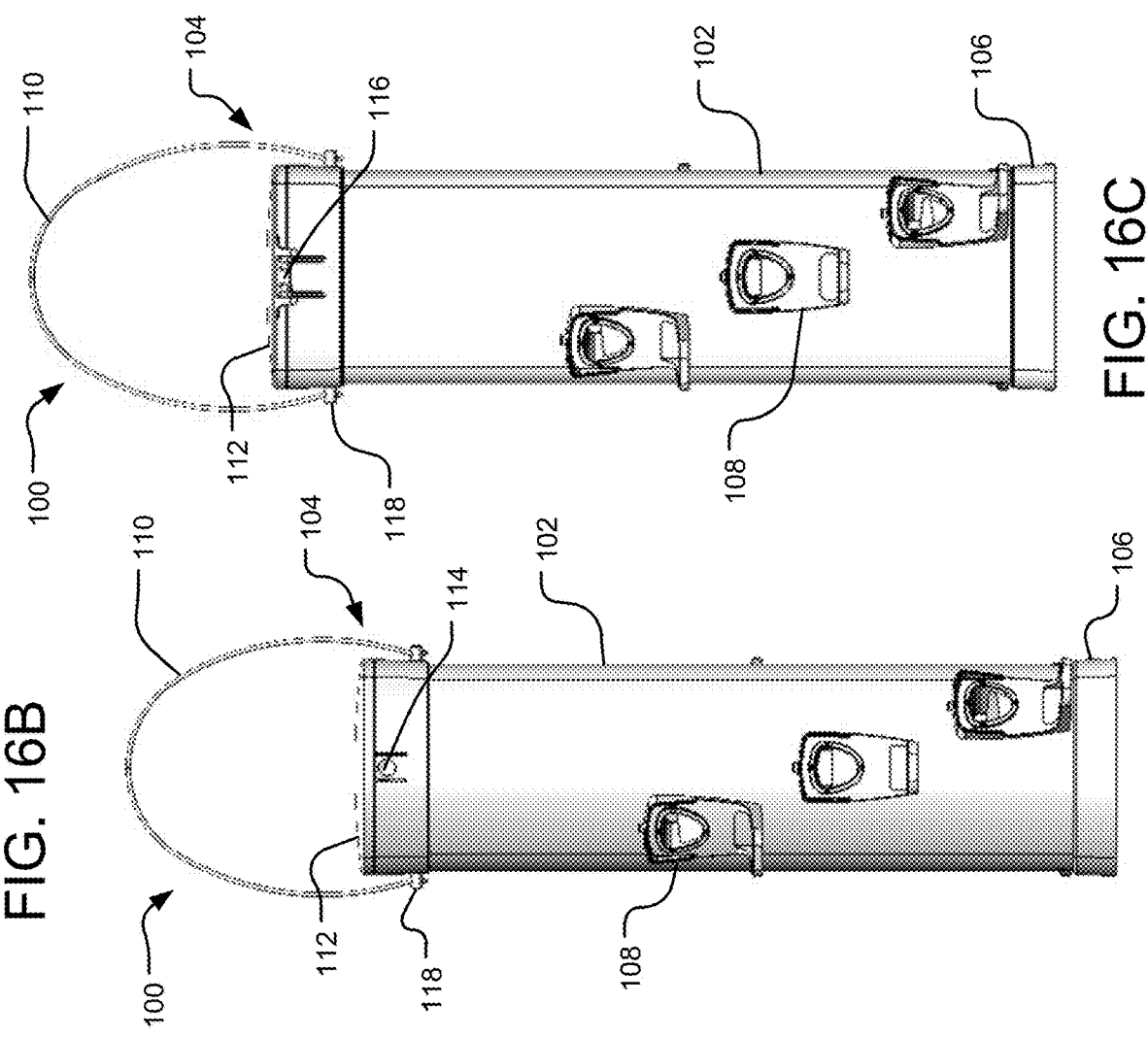
FIGS. 16A-16C illustrate side, front, and back views, respectively, of the bird feeder of FIG. 15.
Figure 16A:
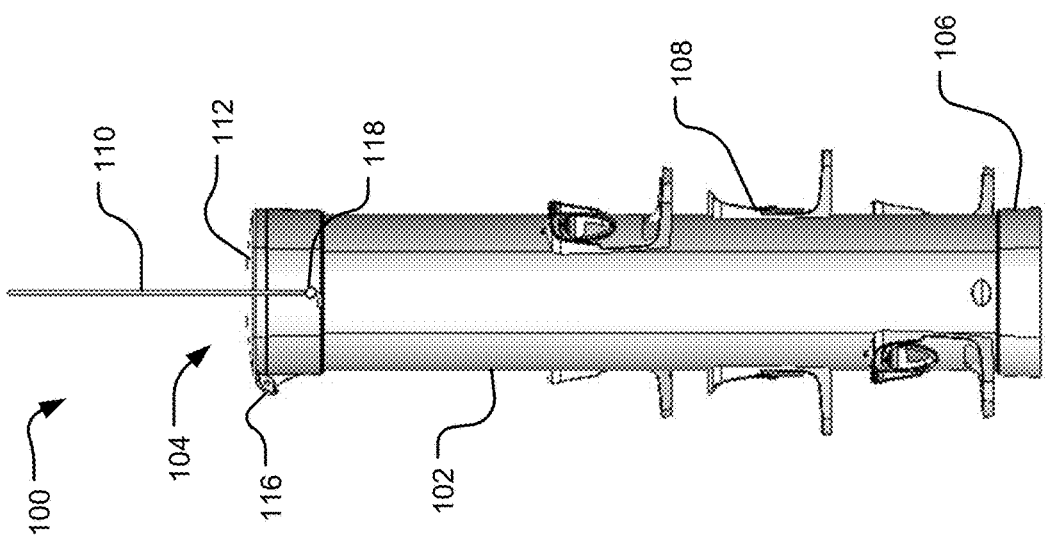
Figure 18:
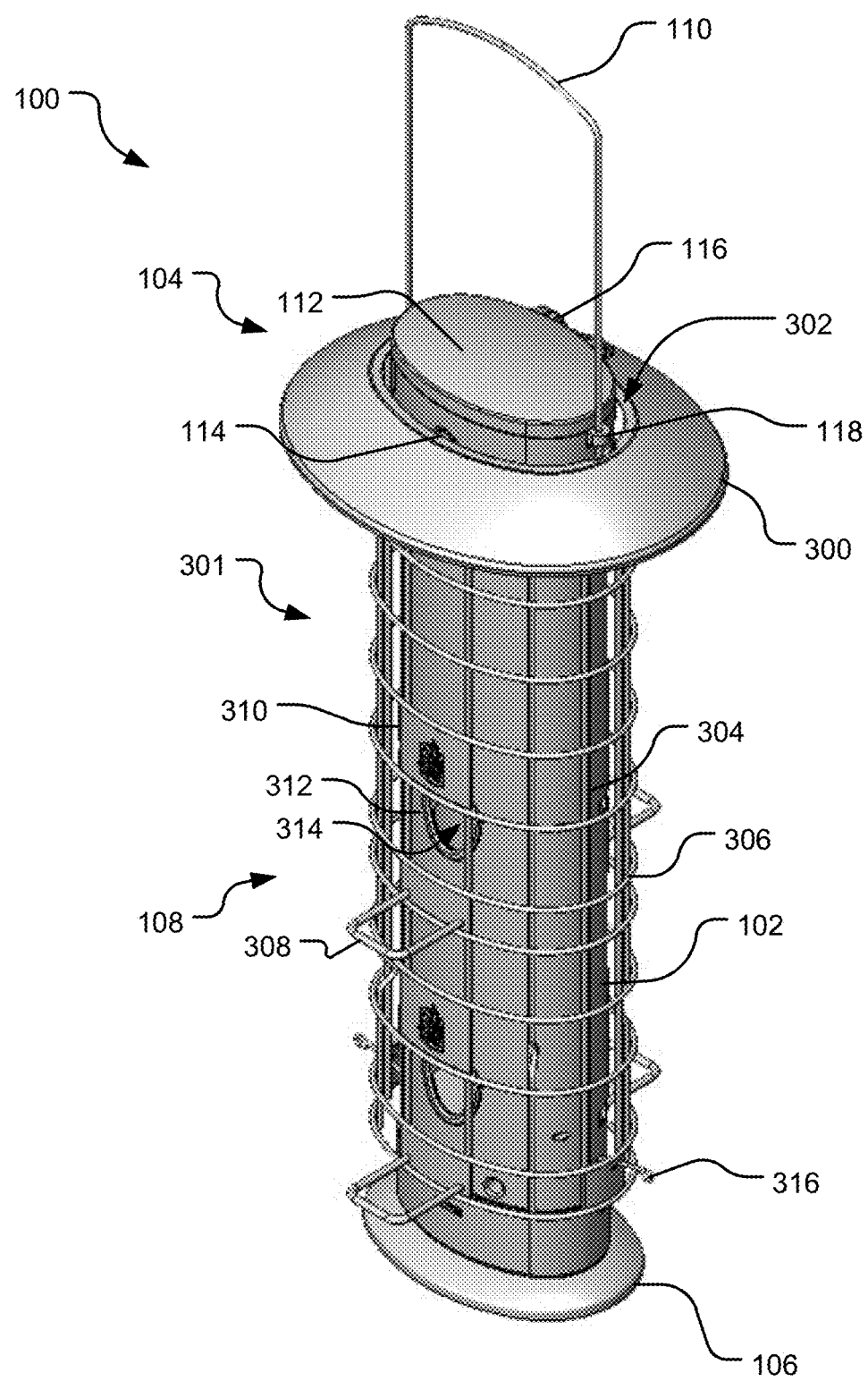
FIG. 18 shows an isometric view of another example bird feeder configured for easy filling and having a squirrel resistant mechanism.
Figure 20B:
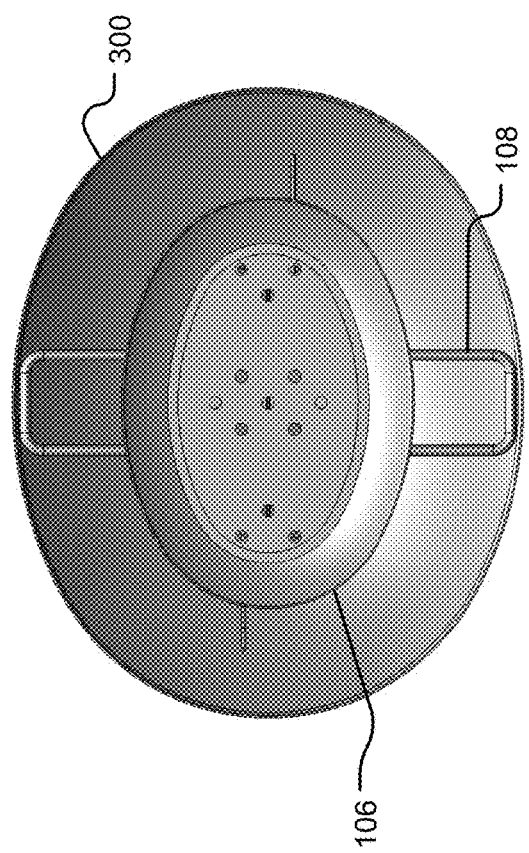
FIGS. 20A and 20B show top and bottom views, respectively, of the bird feeder of FIG. 18.
Figure 20A:
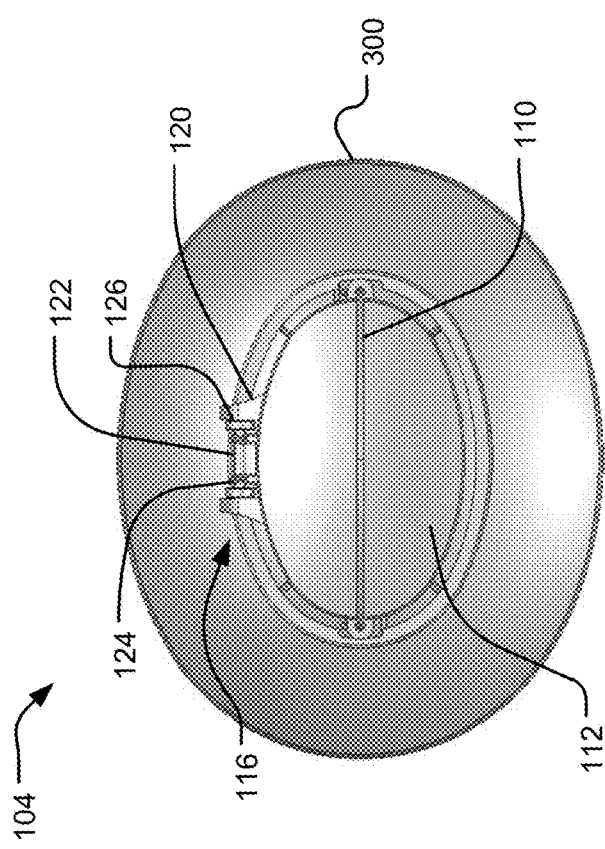
Figure 21B:
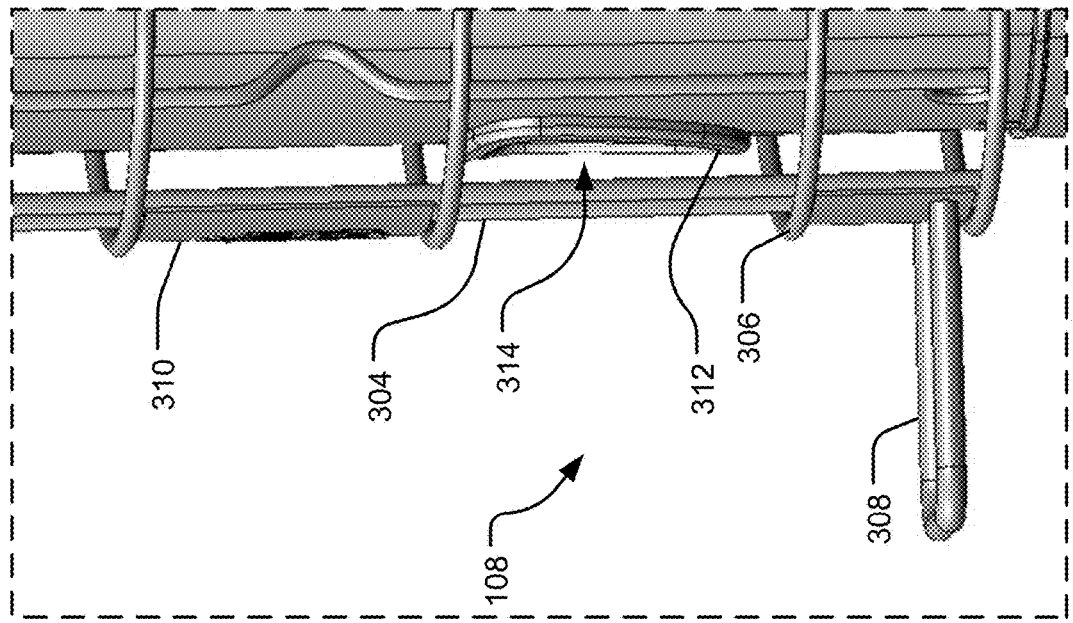
FIGS. 21A and 21B are detailed perspective and side views, respectively, of one of the perches with the squirrel resistant mechanism.
Figure 21A:
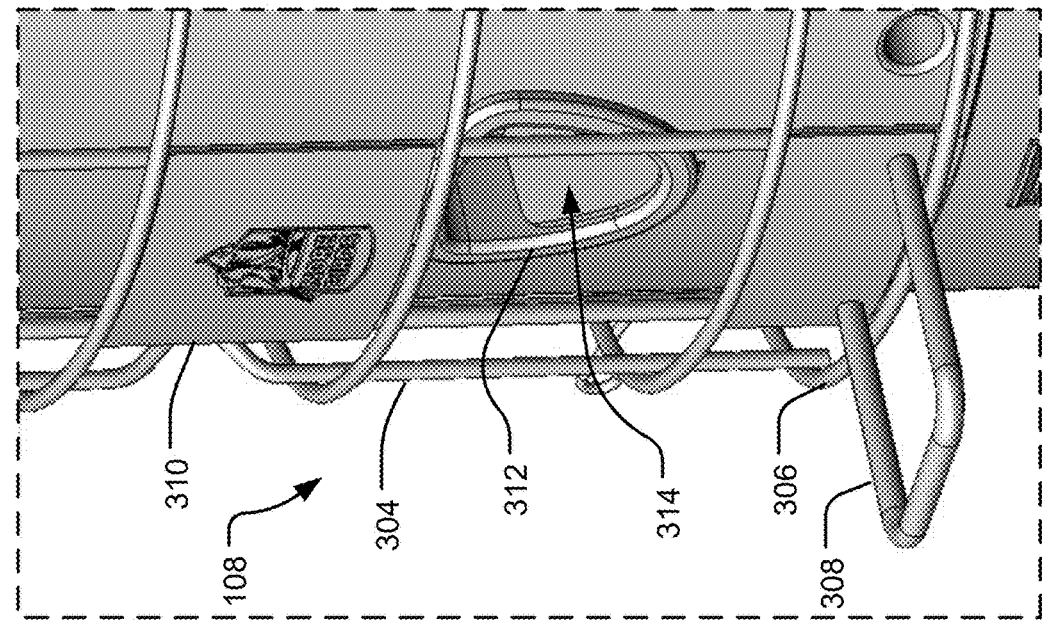
Figure 22:
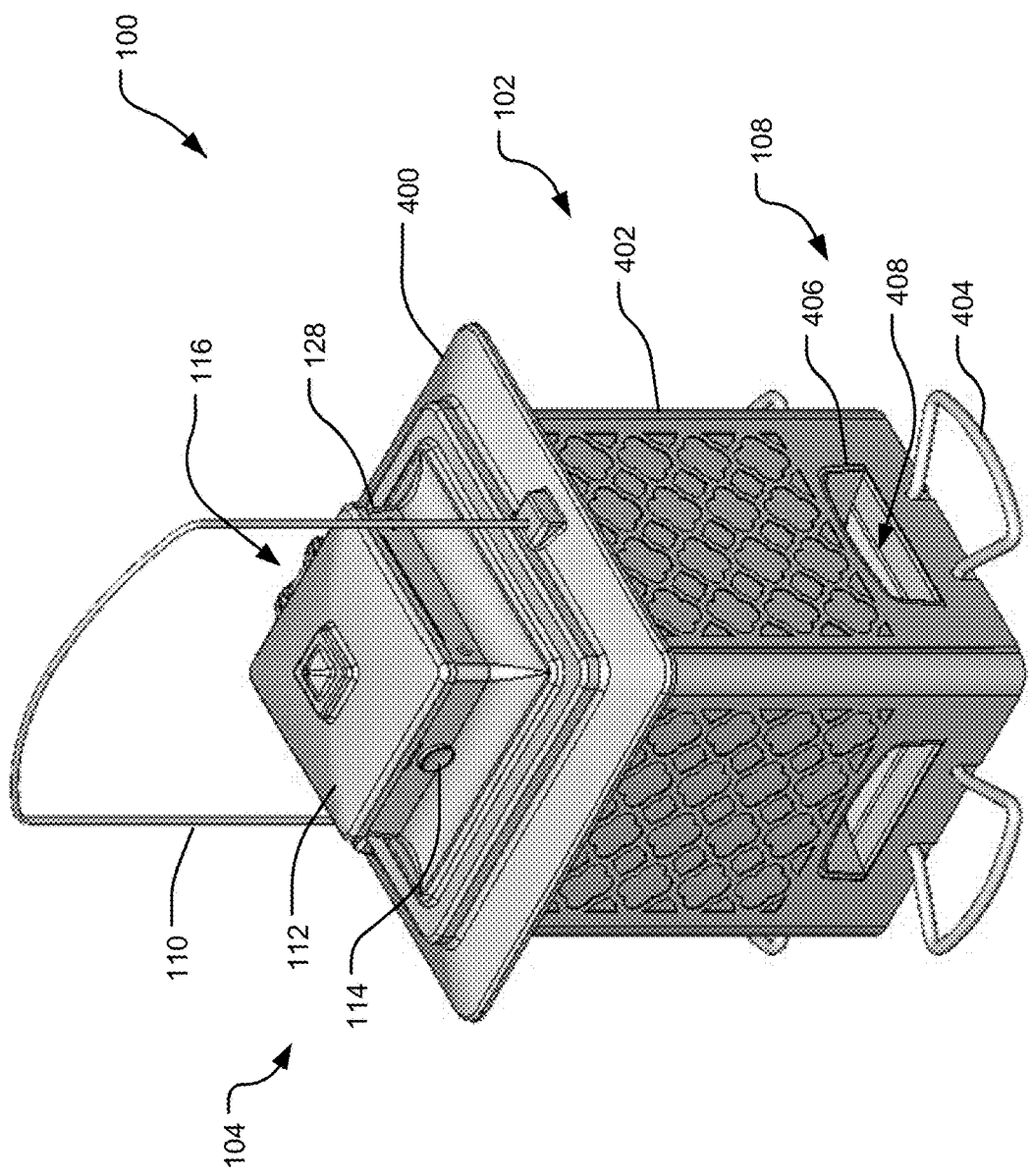
FIG. 22 shows an isometric view of another example bird feeder configured for easy filling.
Figure 24B:
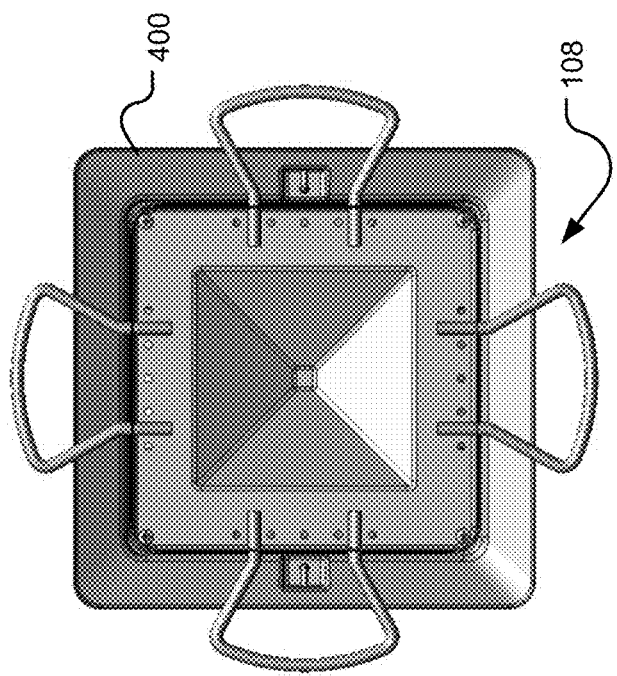
FIGS. 24A and 24B show top and bottom views, respectively, of the bird feeder of FIG. 22.
Figure 24A:
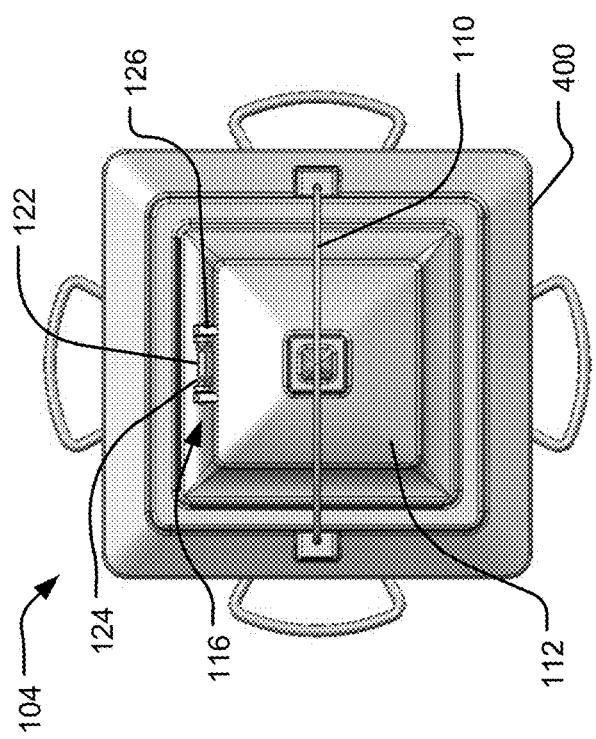
Figure 25:
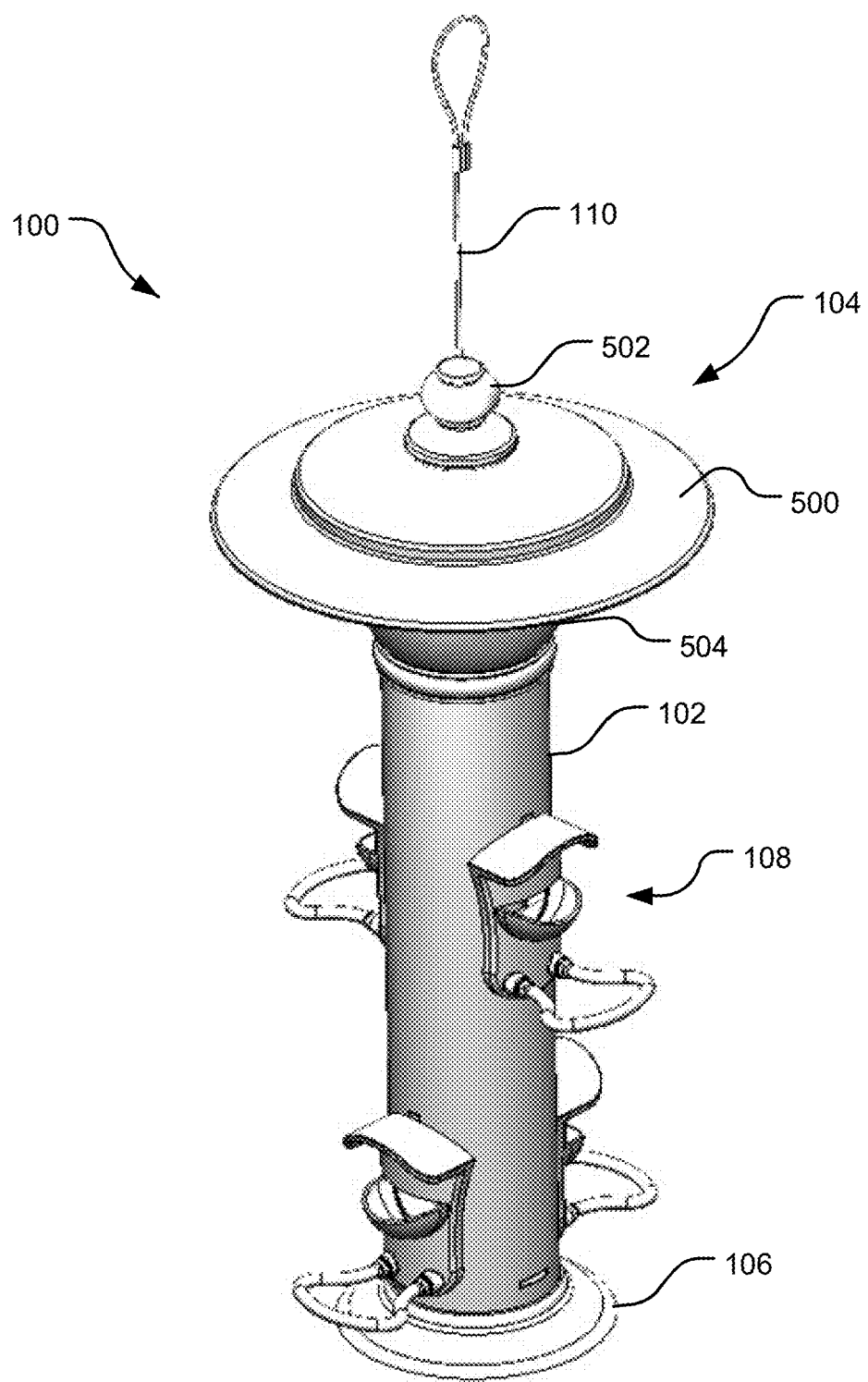
FIGS. 25 and 26 show isometric views of another example bird feeder configured for easy filling with a finial inserted and removed, respectively, from a cap assembly.
Figure 26:
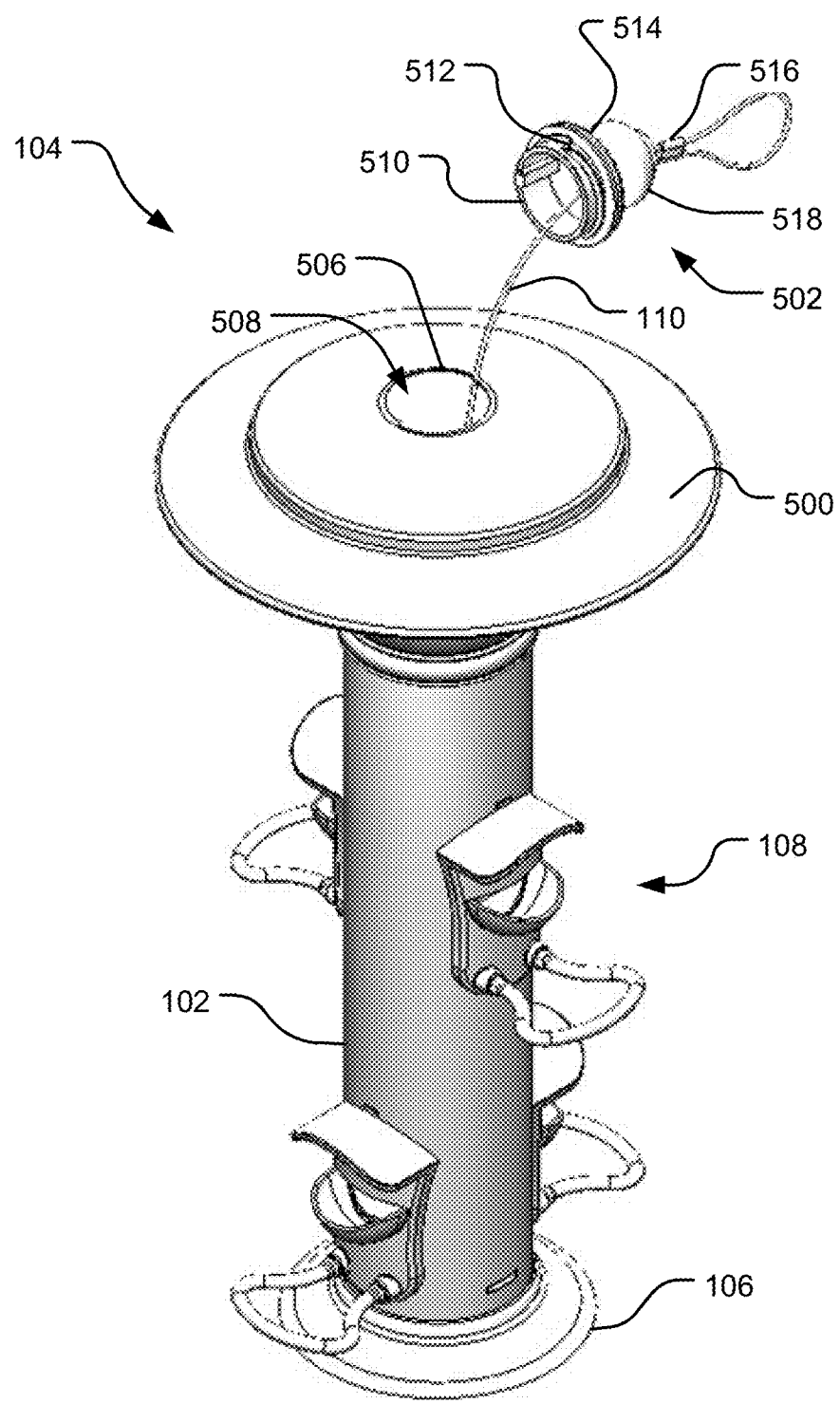
Figure 27:
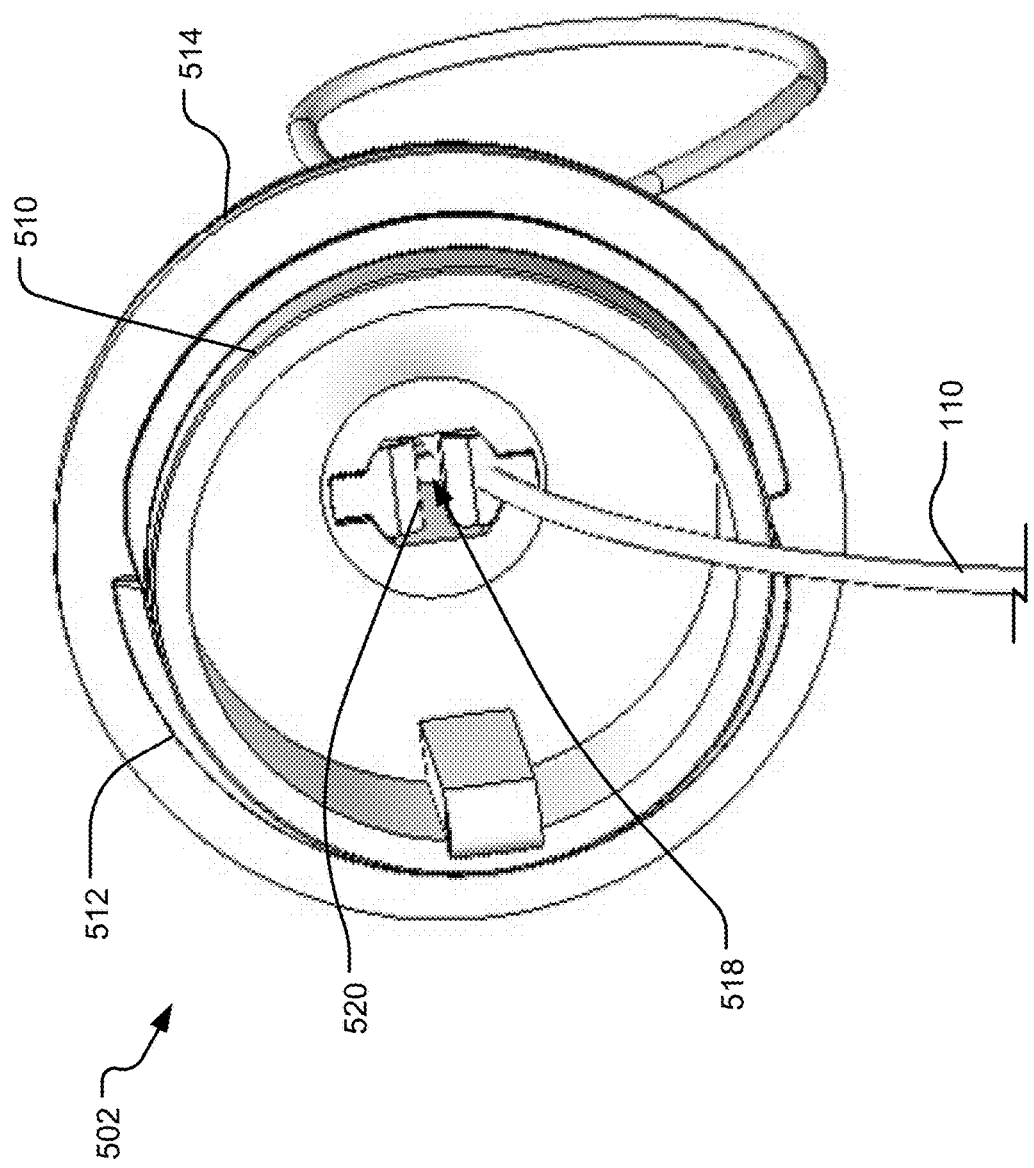
FIGS. 27 and 28 are detailed views of the finial of the bird feeder of FIG. 25.
Figure 28:
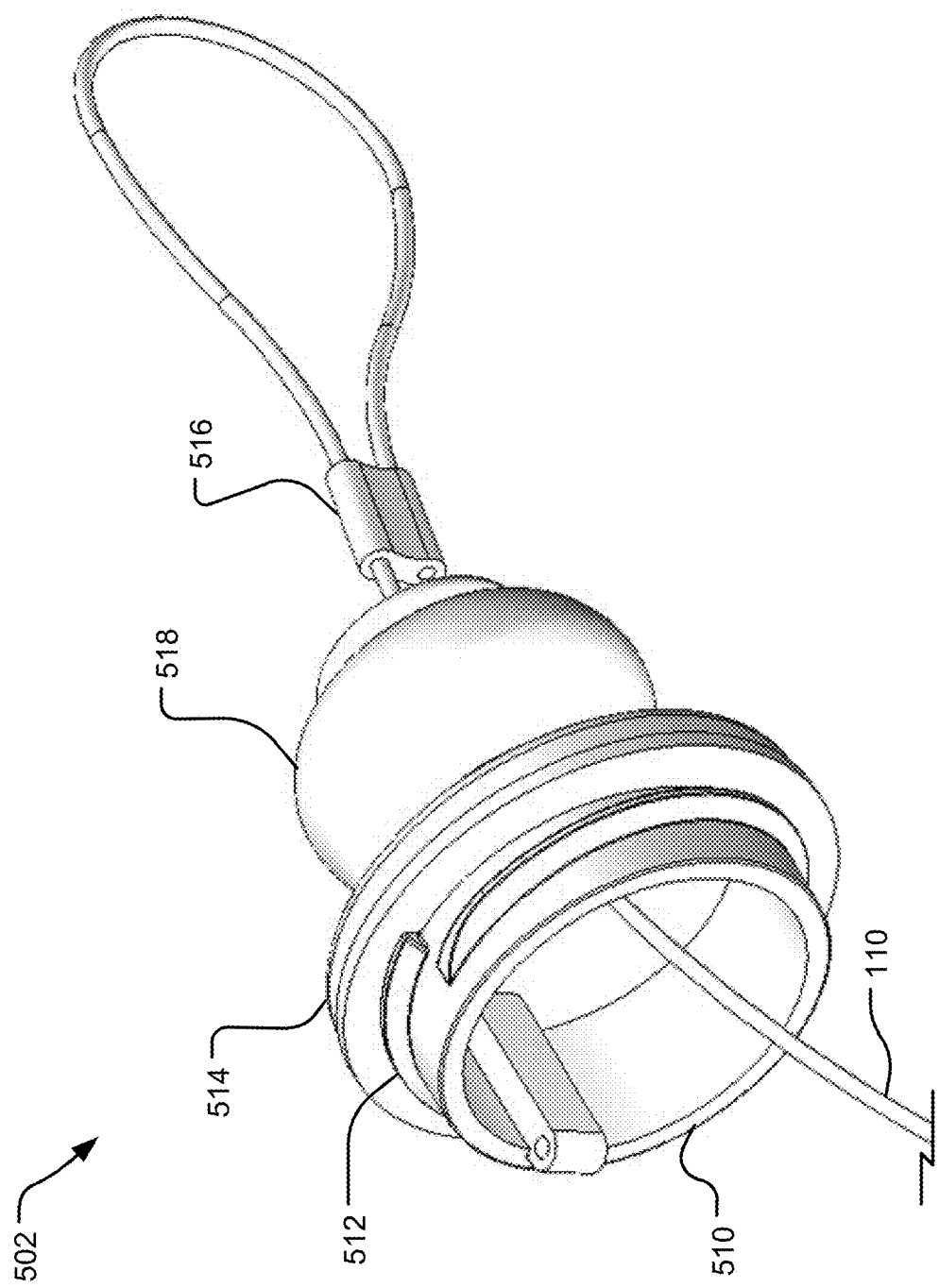
Figure 29:
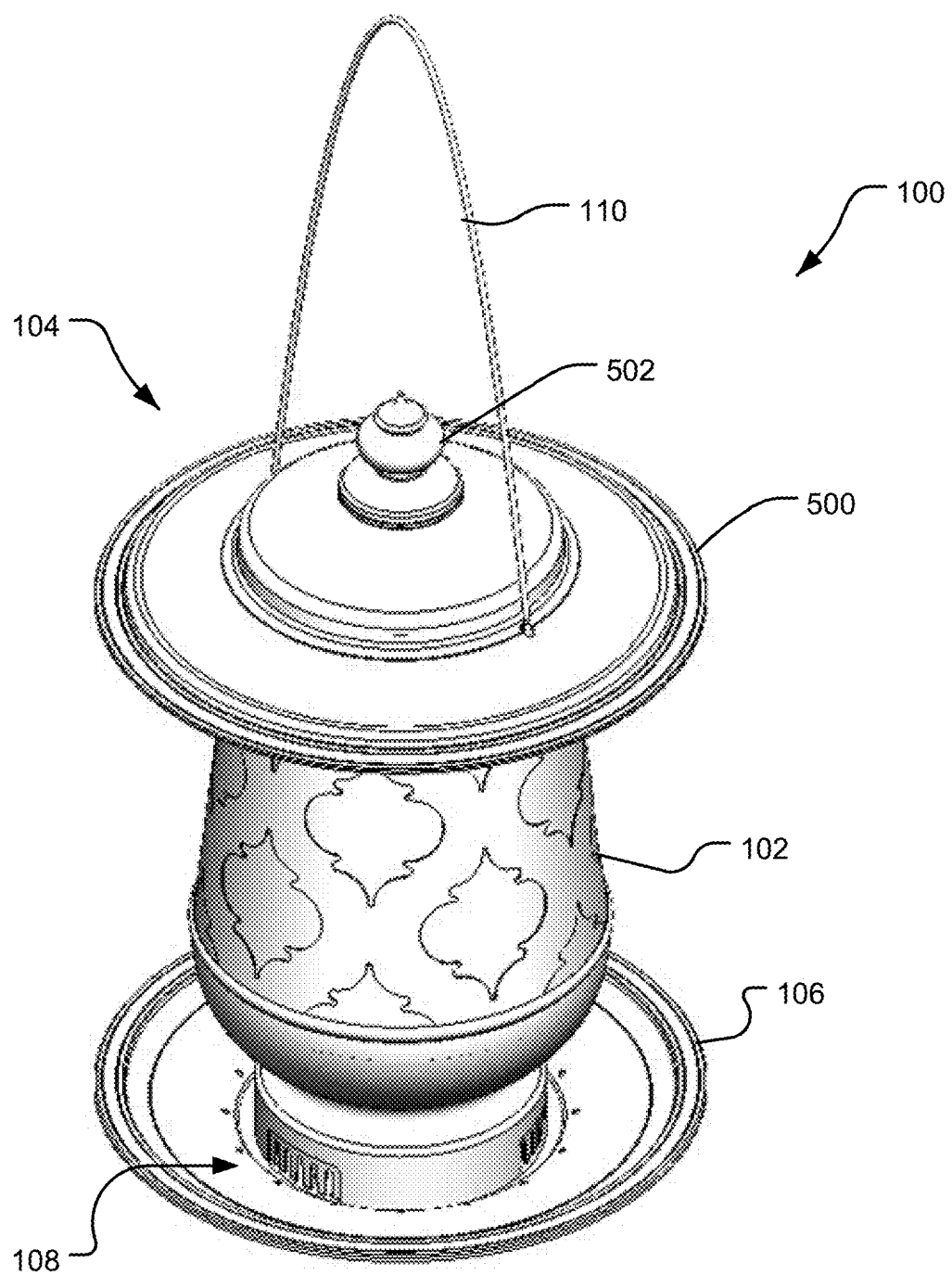
FIGS. 29 and 30 show isometric views of another example bird feeder configured for easy filling with a finial inserted and removed, respectively, from a cap assembly.
Figure 30:
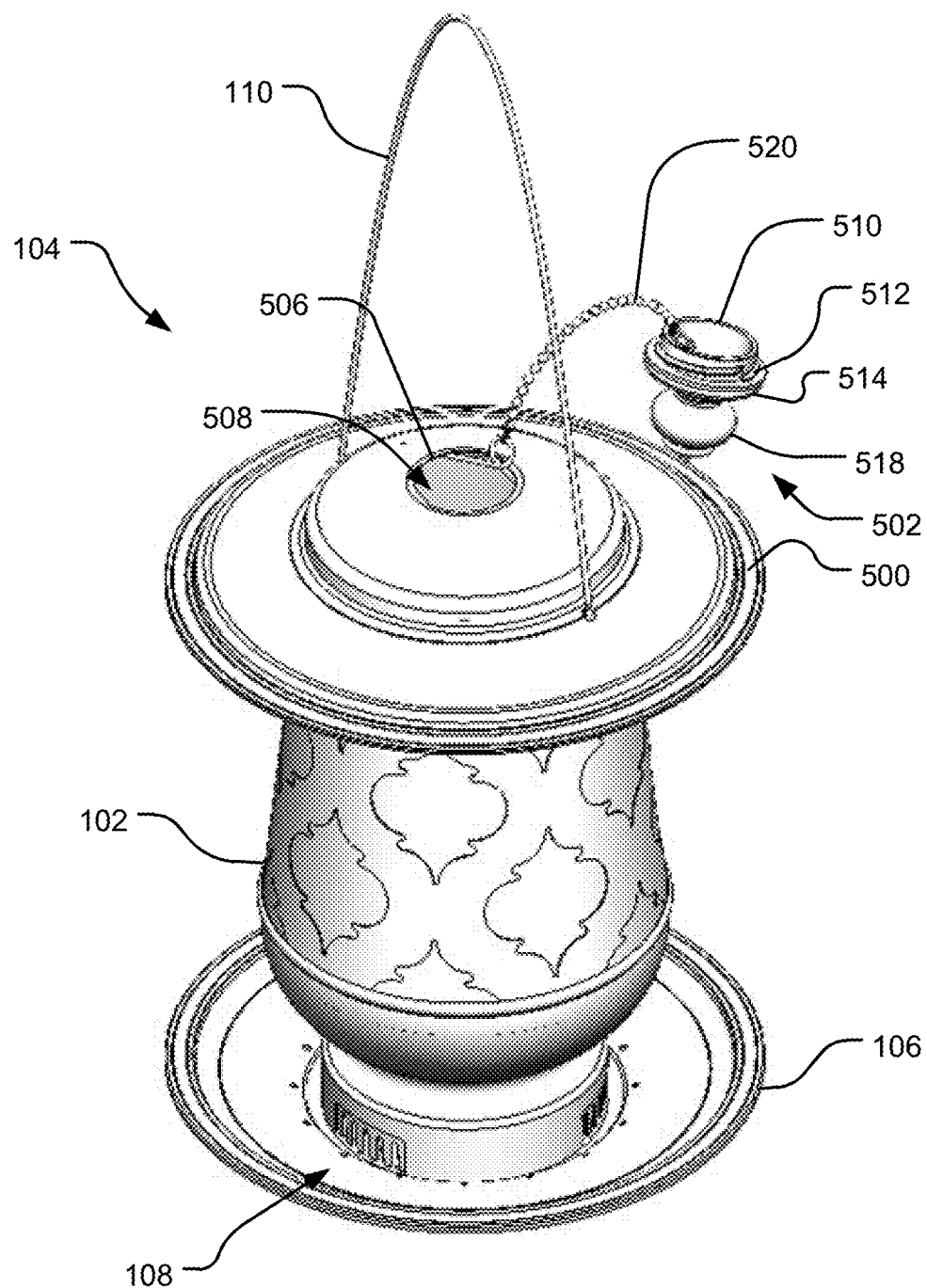
Figure 31:
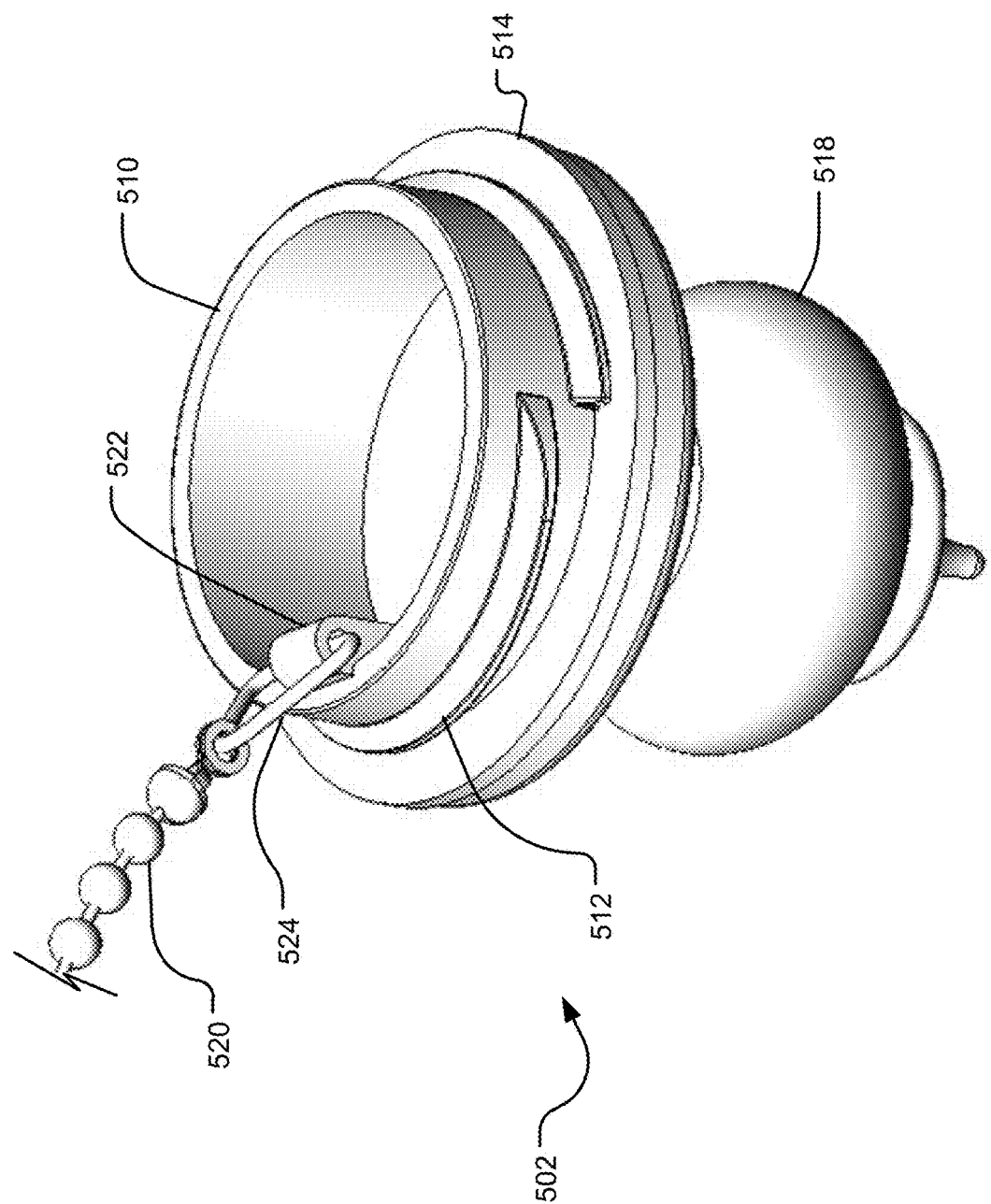
FIG. 31 is detailed view of the finial of the bird feeder of FIG. 30.

Once the cap assembly 104 is connected to the body 102, access to the reservoir for filling is accomplished by moving the lid 112 to the open position, as detailed herein, and pouring the birdseed through the cap assembly opening 148 into the reservoir. Once the reservoir has birdseed, one or more birds may use the one or more perches 108 to access the birdseed in the reservoir through the corresponding access ports 142. Referring to FIGS. 11A-11B, the perches 108 may each be continuous, formed from one integral body. In one implementation, the body of the perch 108 includes a perch surface 200 defining an opening 202 through the access ports 142. A perch protrusion 204 extends from the perch surface 200, which a bird may use to rest while accessing the birdseed. The body of the perch 108 may further include a perch cover 206 and one or more engaging features 208-212 to removably engage the body 102 at the access ports 142. For example, an inward projection 208 may be configured to extend into the reservoir of the body 102 through the access port 142, and projections 210 and 212 may be configured to snap or otherwise engage the body 102 to secure the perch 108 in the access port 142.

Figure 9:
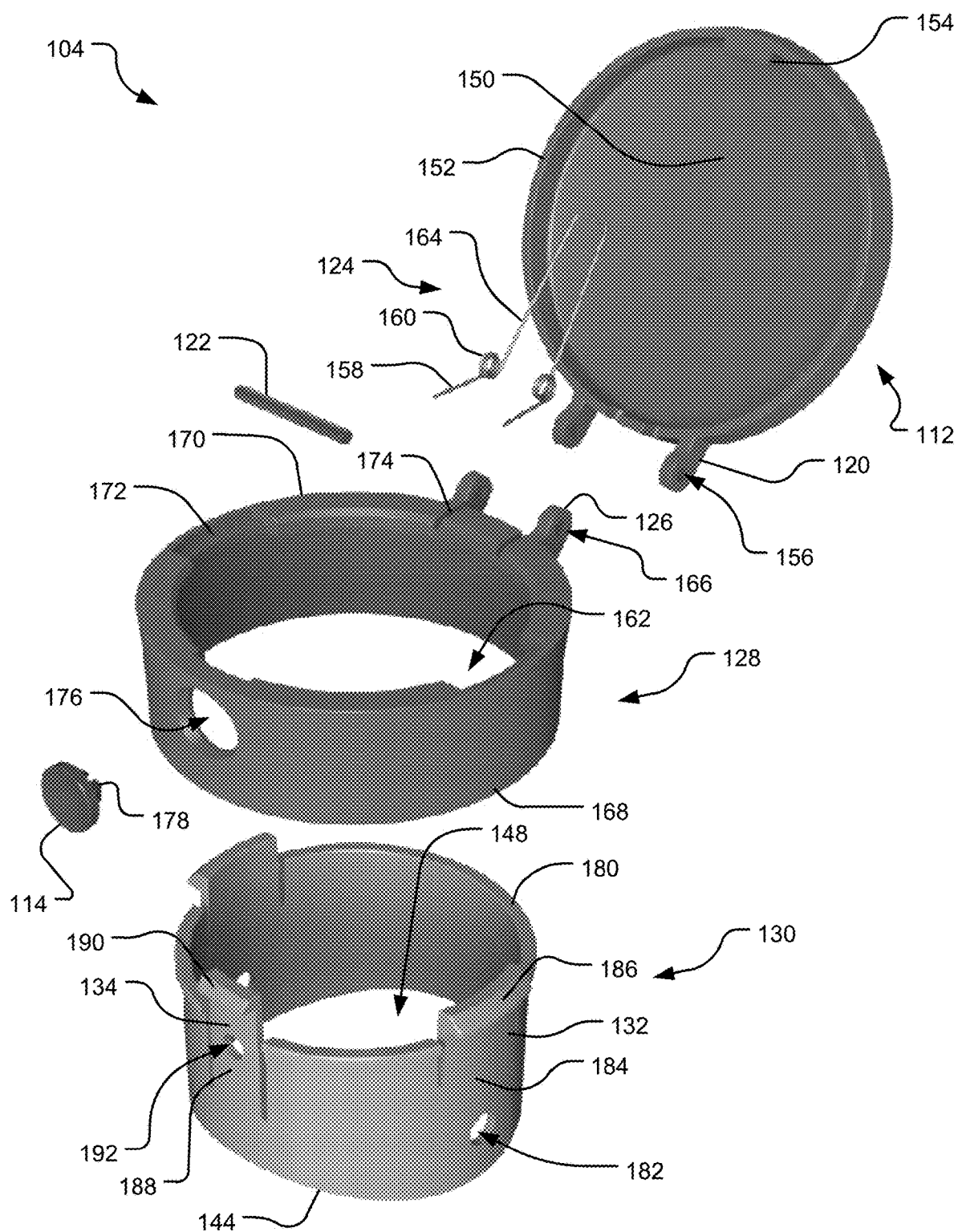
FIG. 9 is an exploded view of the cap assembly of FIG. 7.
Figure 10:
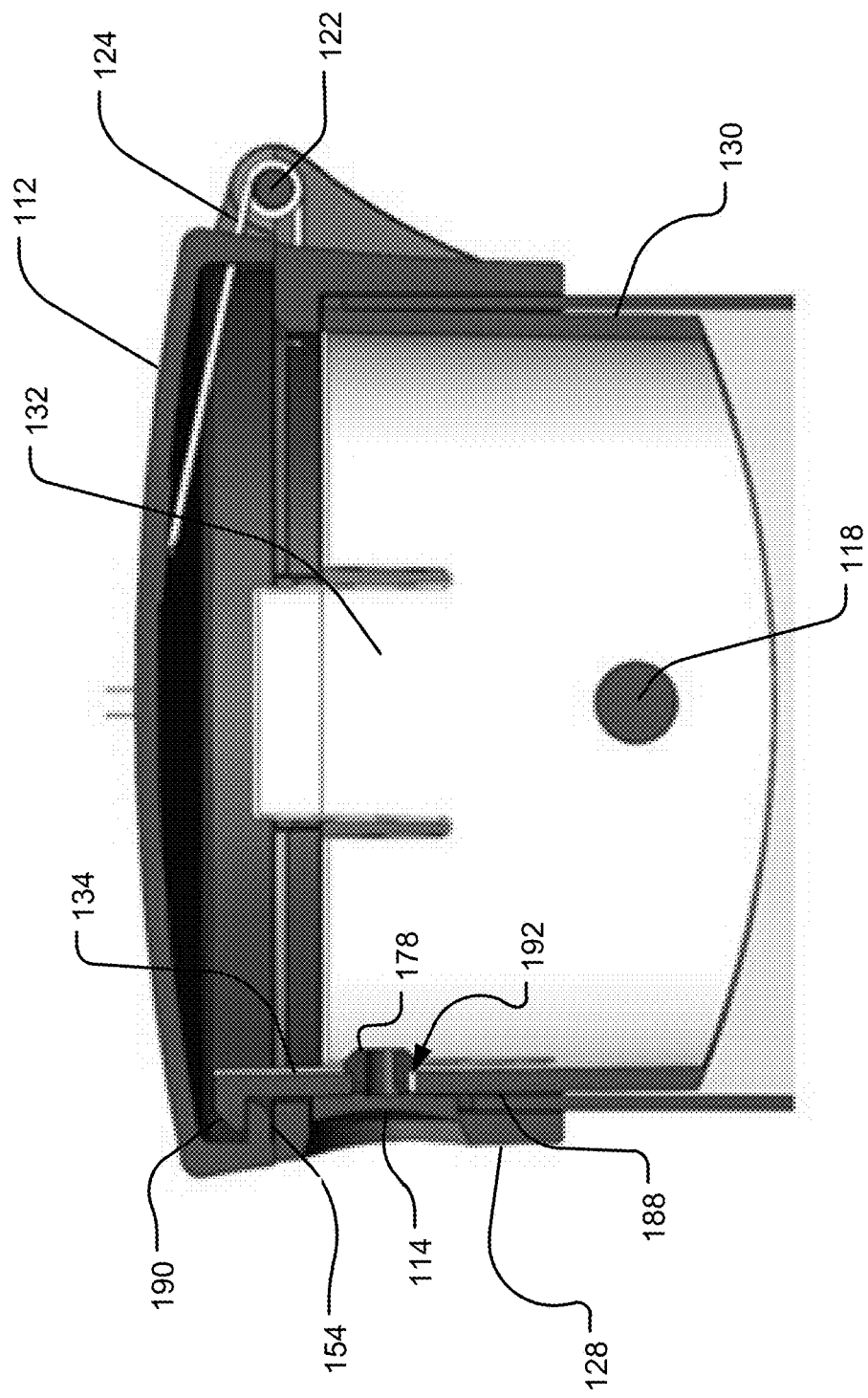
FIG. 10 is a side cross-sectional view of the cap assembly of FIG. 7.

As can be understood from FIGS. 9-10, in one implementation, the lid 112 includes an internal surface 150 with a lip 152 extending therefrom. The lid 112 may be a variety of shapes based on the body opening 136, for example. In one implementation, the protrusions 120 extend from the lip 152 at a first side of the lid 112 and a latch 154 is disposed at a second side of the lip 152. The protrusions 120 may include pin openings 156 to receive the pin 122. Similarly, the cap base 128 includes pin openings 166 in the corresponding protrusions 126 to engage the lid 112 to the cap base 128 and form the hinge. In one implementation, the corresponding protrusions 126 extend from a ridge 170 of the cap base 128 to form the hinge at the first side of the lid 112 with the lip 152 configured to meet the ridge 170 of the cap base 128 to cover the body opening 136 with the lid 112.

In one implementation, the spring 124 is mounted on the pin 122 to form the spring assembly 116. The spring 124 may include a cap base end 158 connected to a lid end 164 with one or more coils. The spring 124 may be mounted on the pin 122 by inserting the pin 122 through the coils 160, such that the pin 122 extends through the pin openings 156, the pin openings 166, and the coils 160. Once the hinge is formed, the spring 124 applies a bias against the internal surface 150 of the lid 112. More particularly, in one implementation, the cap base end 158 of the spring 124 is disposed within spring crevices 174 formed in the ridge 170 of the cap base 128, and at least a portion of the lid end 164 of the spring 124 rests against the internal surface 150 of the lid 112, with the coils 160 defining the bias exerted against the internal surface of the lid 150. The bias of the spring 124 is such that the lid 112 is automatically moved to the open position and held there upon release of the latch 154 of the lid 112.

As described herein, in one implementation, the cap base 128 is connected to the body 102 using the mount 130. The side arms 132 of the mount 130 extend proximally through a cap opening 162 of the cap base 128 to the ridge 170 where the side arms 132 engage arm indents 172 of the cap base 128. In one implementation, each of the side arms 132 includes an arm body 184 extending proximally to an arm protrusion 186, which extends transversely from the arm body 184 to engage the arm indent 172 defined in the ridge 170. The arm body 184 is configured for movement relative to a mount body 180 permitting disengagement of the mount 130 from the cap base 128. Similarly, the lid arm 134 of the mount 130 includes an arm body 188 extending proximally to a lid protrusion 190, which extends transversely from the arm body 188 to releasably engage the latch 154 of the lid 112. Thus, the lid arm 134 connects the lid 112 at the first side and holds the lid 112 in the closed position.

In one implementation, the arm body 188 of the lid arm 134 includes an arm opening 192 configured to receive engagers 178 of the release button 114, with the cap base 128 including a releasor opening 176 providing access to the release button 114. The release button 114 is thus mounted to the lid arm 134 in one implementation, such that depression of the release button 114 displaces the arm body 188 of the lid arm 134, disengaging the lid protrusion 190 from the latch 154 of the lid 112 and automatically moving the lid 112 from the closed position to the open position. In another implementation, the release button 114 is defined from the arm body 188 of the lid arm 134, with the release button 114 being integral with the lid arm 134.

As described herein, the easy fill bird feeder 100 may be different shapes and sizes and include various aesthetic and functional features. For additional examples of different implementations of the easy fill bird feeder 100, reference is made to FIGS. 12-24B.

In the example shown in FIGS. 12-14B, the body 102 may be cylindrical in shape with an oval cross-section, and the perches 108 may be arranged on the body 102 in two pairs, one pair disposed on the front of the body 102 and one pair disposed on the back of the body 102. Turning to the example shown in FIGS. 15-17B, the body 102 may be similarly cylindrical in shape with an oval cross-section, and the perches 108 may be arranged on the body 102 in a set of three, one set disposed on the front of the body 102 and one set disposed on the back of the body 102.

Referring next to FIGS. 18-21B, the bird feeder 100 may include a squirrel resistant mechanism, which may be similar to the systems and methods disclosed in U.S. patent application Ser. No. 14/624,375, entitled "Wild Bird Feed Dispenser with Squirrel Resistant Mechanism" and filed Feb. 17, 2015, which is incorporated by reference herein in its entirety. In one implementation, the squirrel resistant mechanism includes a roof 300 connected to a cage 301. The roof 300 extends outwardly transverse to a length of the body 102. In one implementation, the cage 301 is formed by an intersection of a plurality of elongated rods 304 and 306. A plurality of vertical rods 304 extend along a length of the body 102 and intersect with a plurality of horizontal rods 306 extending transfers to a length of the body 102. One or more cage perches 308 extend from the cage 301 and are disposed near access ports 312 having openings 314 aligned with the access ports 142 through which birds may access the birdseed in the reservoir of the body 102. In one implementation, panels 310 are disposed on the cage 301 relative to the openings, and if a weight on a portion of the cage 301 or the roof 300 exceeds a threshold (e.g., a maximum weight of a bird), the panels 310 are displaced to cover the openings 314 to prevent access to the birdseed in the reservoir of the body 102.

Turning next to FIGS. 22-24B, the bird feeder 100 similarly includes a roof 400 extending outwardly transverse to a length of the body 102 and forming part of the cap assembly 104. Further, the base 102 of the bird feeder 100 shown in FIGS. 22-24B has a cubical body 402 with decorative features, and the perches 108 include a distal edge 406 defining a wide opening 408 to the reservoir and a projection 404 disposed distal to the wide opening 408.

As also discussed herein, the cap assembly 104 may include a variety of other features for easy filling in place of or in addition to the features described with respect to FIGS. 2-24B. For example, the cap assembly may include one or more of a releasable finial, a plug, a cap, a flap, a flip lid, a chute, and one way valve. Examples of these may be seen in FIGS. 25-38, and it will be appreciated that other implementations may be executed.

For examples of the cap assembly 104 including a releasable finial, reference is made to FIGS. 25-31. In one implementation, the bird feeder 100 includes a finial 502 configured to releasably engage a roof 500 of the cap assembly to provide access to the reservoir of the body 102. The body 102 may include a mouth 504 defining the body opening 136. In one implementation, the roof 500 includes a roof rim 506 defining a roof opening 508 providing access to the reservoir through the body opening 136. The roof rim 506 may be sized and shaped to receive a spout of the birdseed tote 10. In one implementation, to prevent the finial 502 from falling during filling, the hanger 110 is connected the body 102 and extends through a connector 520 in a knob 518 of the finial 502 where a hanger holder 516 secures the hanger 110. The connector 520 permits the finial 502 to be moved along a length of the hanger 110 as needed during filling while preventing the finial 502 from disconnecting from the bird feeder 102. The connector 520 may alternatively be a chain connected to the finial 502 using corresponding hooks 522 and 524. Here, the hanger 110 may extend directly from the roof 500 separate from the finial 502. In one implementation, to secure the finial 502 to the roof 500, a body 510 extends from a surface 514 and has engaging features 512, such as helical threads, configured to engage the roof rim 506.

Turning to FIG. 32A, in one implementation, the cap assembly 104 includes flip plug 600 having a plug lid 602 connected to a plug base 608 with a hinge 606 extending from a base rim 610. The plug lid 602 includes a tab 604 for gripping to move the plug lid 602 between an open position providing access to the reservoir through a plug opening 612 and a closed position. As can be understood from FIGS. 33A-33B, in one implementation, the flip plug 600 may be disposed in a roof 614, such that the plug lid 602 may be flipped to the open position to insert a spout 16 of the birdseed tote 10 into the plug opening 612 to pour birdseed into the reservoir of the body 102 from a body 12 of the birdseed tote 12 using a neck 14.

For an example twist plug 800 for the cap assembly 104, reference is made to FIG. 32B. In one implementation, the twist plug 800 includes a plug body 802 with a grip 804 extending proximally therefrom and an engaging portion 806 extending distally therefrom. The engaging portion 806 may have a variety of engaging features, such as helical threads. FIG. 32C shows a top view of an example squeeze plug 700 for the cap assembly 104. In one implementation, the squeeze plug 700 includes side portions 702 movably mounted on a plug body 704 permitting the side portions to be displaced inwardly to disengage the squeeze plug 700 to permit access to the body opening 136. FIG. 32D shows a perspective side view of another example flip plug 900 for the cap assembly 104. In one implementation, the flip plug 900 includes a plug lid 902 connected to a plug base 908 with a hinge 906 extending from a base rim 910. The plug lid 902 includes a tab 904 for gripping to move the plug lid 902 between an open position providing access to the reservoir through a plug flap 914 defined in a surface 912 and a closed position.

Figure 34:
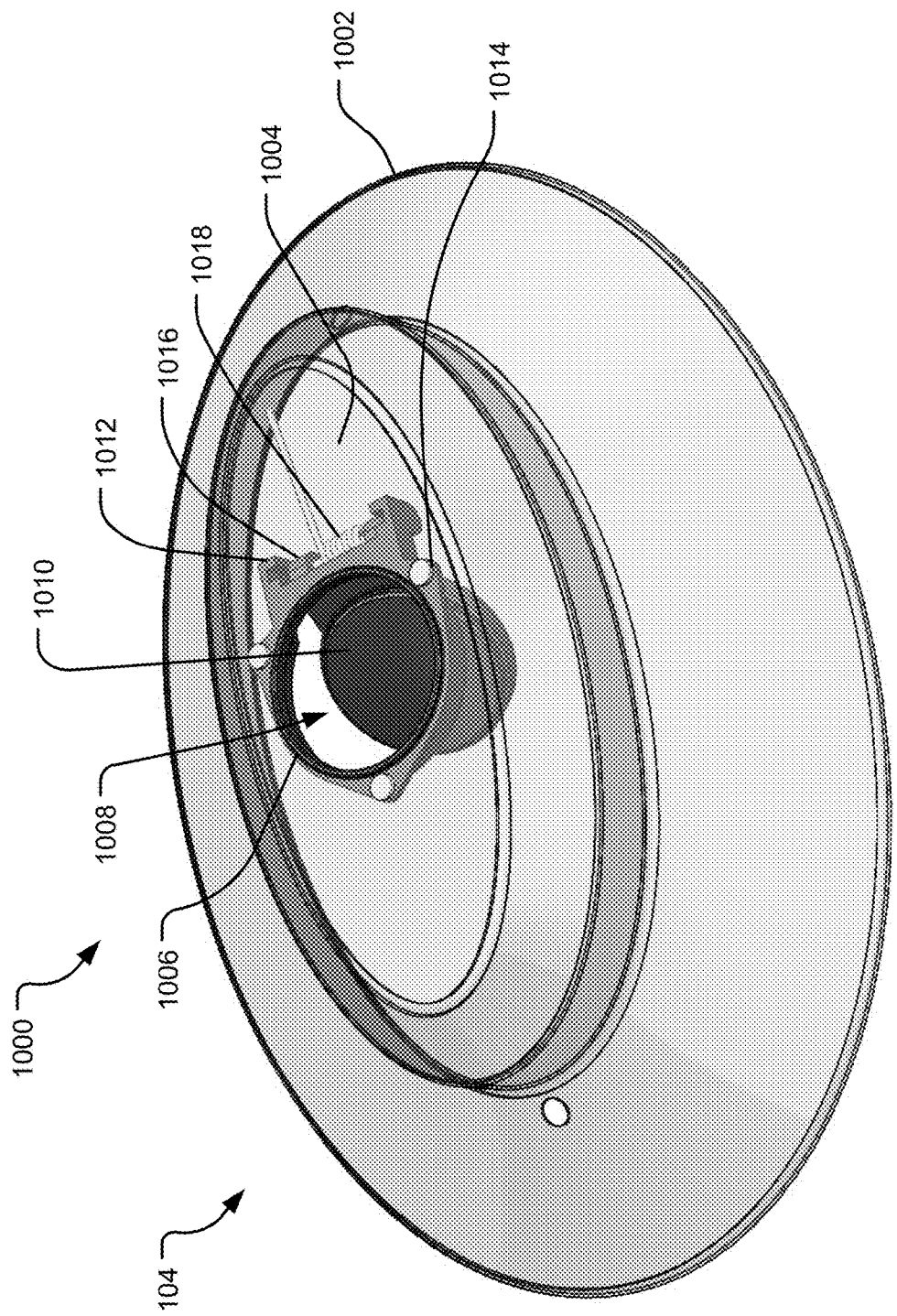
FIG. 34 shows a perspective top view of an example flap for a cap assembly.

Turning to FIG. 34, the cap assembly 104 includes an example flap assembly 1000. The cap assembly 104 includes a proximal roof section 1004 and a distal roof section 1002 extending outwardly therefrom. A flap opening 1008 is defined in the proximal roof section 1004 by a flap rim 1006. A flap 1010 is mounted to an inner surface of the proximal roof section 1004 by a mount 1012. The flap 1010 is connected to the mount 1012 with a hinge 1016, and a spring 1018 permits the flap 1010 to move from a closed position covering the flap opening 1008 to an open position when a force exceeding a threshold is applied against the flap 1010. For example, in one implementation, the force is applied against the flap 1010 by the spout 16 of the birdseed tote 10.

Figures 35A, 35B:
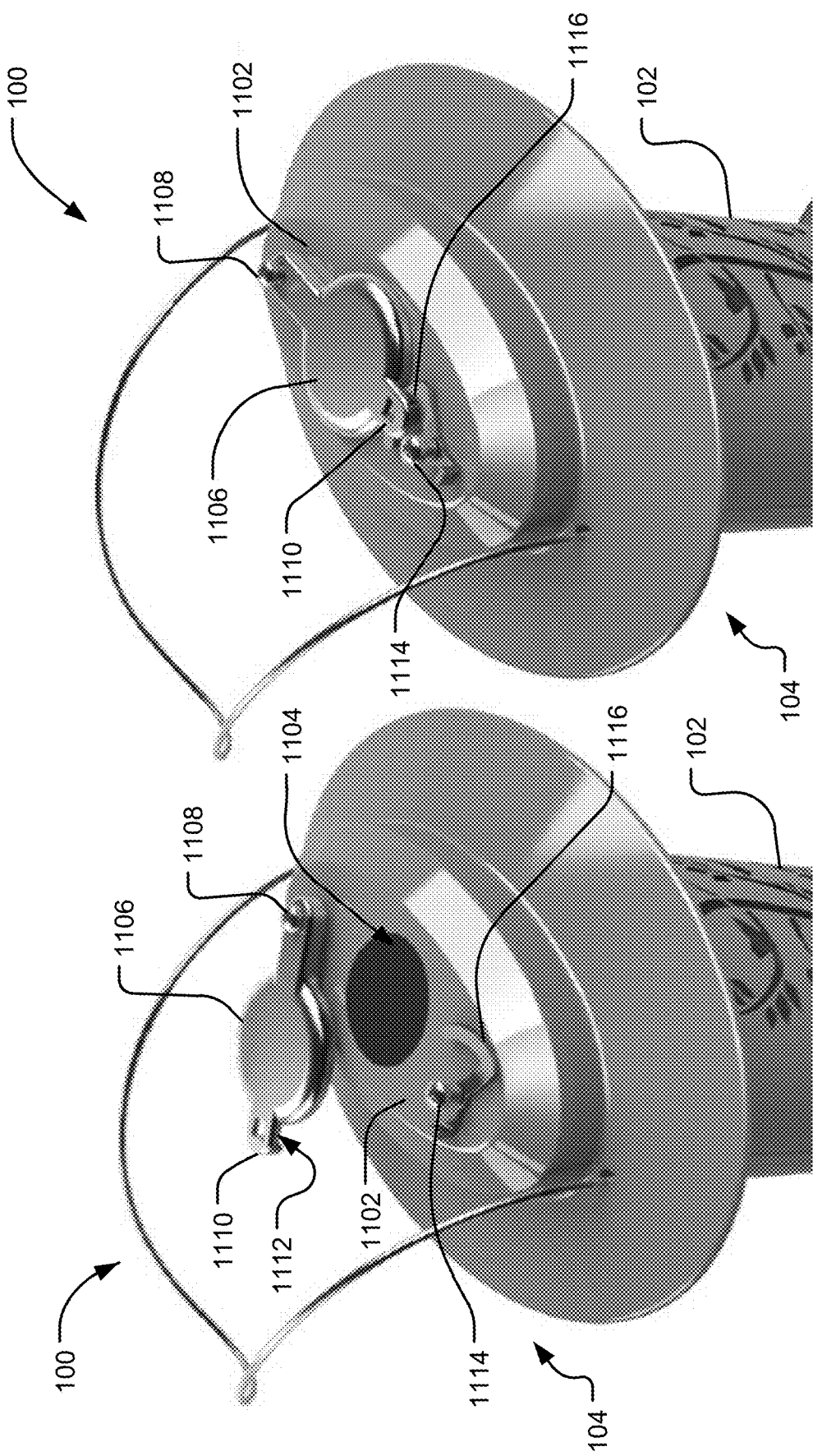
FIGS. 35A and 35B illustrate a cap assembly with an example squirrel resistant plug open and closed, respectively.

In one implementation, the cap assembly 104 includes a squirrel resistant plug, an example of which is shown in FIGS. 35A and 35B. The cap assembly 104 includes a roof 1102 having an opening 1104 defined therein. The squirrel resistant plug is formed by a cover 1106 mounted at a first side to the roof 1102 using a fastener 1108 and a latch 1110 at a second side. The latch 1110 includes a latch opening 1112 configured to receive a hook 1116 mounted to the roof 1102 using a fastener 1114. When the hook 1116 is inserted through the latch opening 1112, the cover 1106 is secured over the opening 1104, preventing squirrels or similar pests from accessing the birdseed in the reservoir. To move the plug to an opening position for filling, the hook 1116 is disconnected from the latch 1110 and the cover 1106 moved.

Figure 36B:
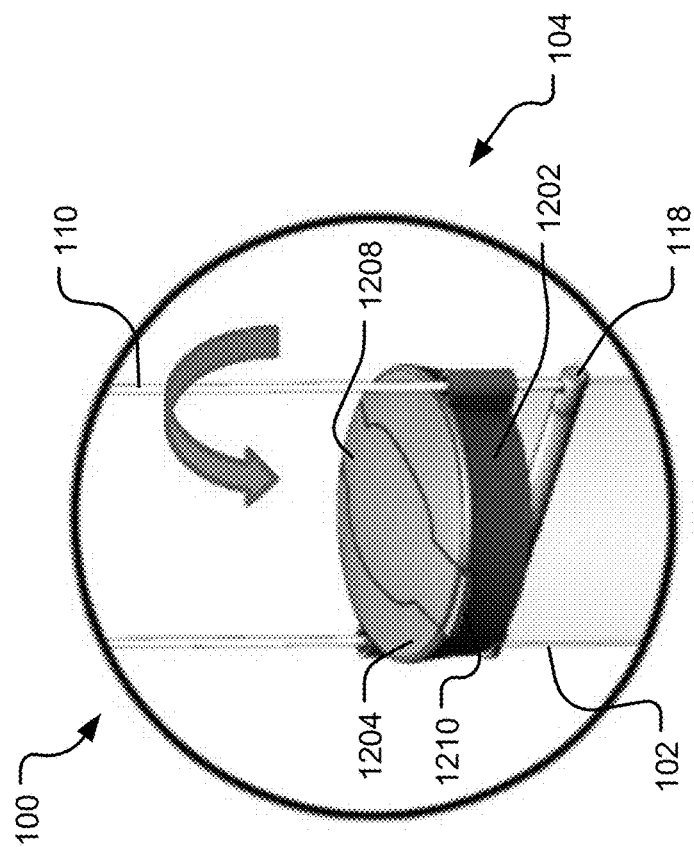
FIGS. 36A and 36B illustrate a cap assembly with an example flip lid, open and closed, respectively.
Figure 36A:
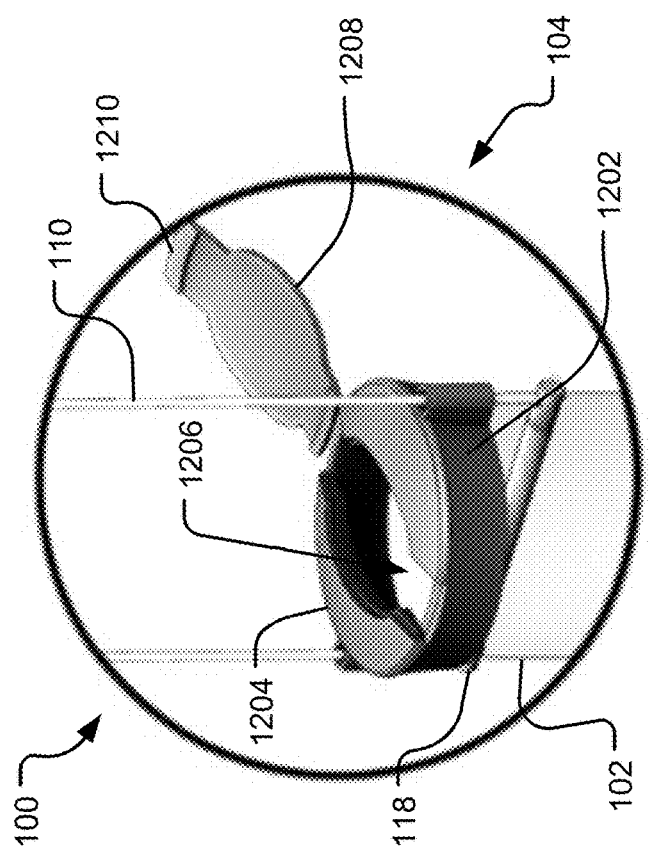

Turning to FIGS. 36A and 36B, the cap assembly 104 may include a flip lid having a base 1202 connected to the body 102 with a surface 1204 extending transversely therefrom to cover a portion of the body opening 136. A lid 1208 is connected to the base 1202 with a hinge at a first side and releasably connected at a second side with a tab 1210, permitting the lid 1208 to move from a closed position to an open position to cover and uncover an opening 1206 defined by the surface 1204.

As can be understood from FIGS. 37A and 37B, the cap assembly 104 may include a chute 1304 having side surfaces 1302 connected by a cover surface 1306. To access the reservoir of the body 102, the cover surface 1306 may be pulled to reveal a chute opening 1308 into the reservoir. Once the reservoir is filled with birdseed, the cover surface 1306 may be pushed to move the chute 1304 to the closed position with chute opening 1308 covered.

Figure 38:
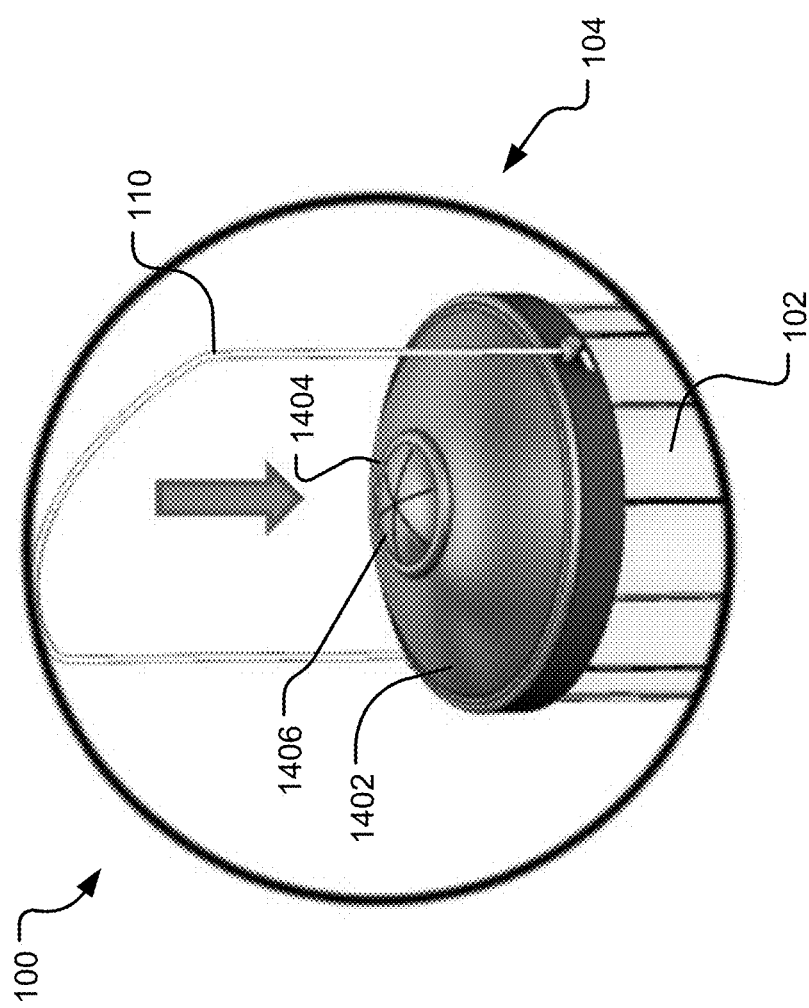
FIG. 38 shows a cap assembly with an example valve.
Figure 39:
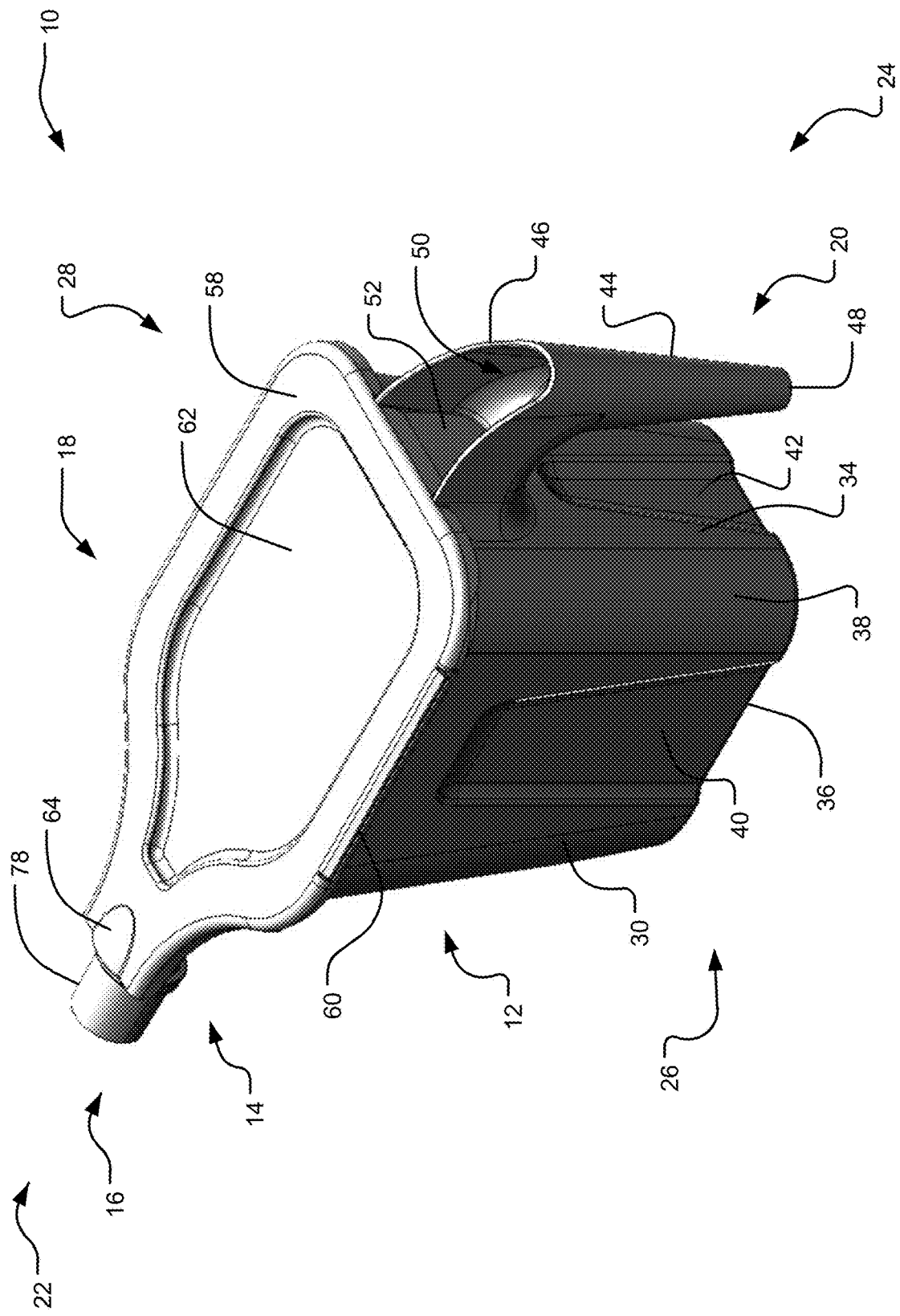
FIG. 39 illustrates a back perspective view of an example birdseed tote.
Figure 40:
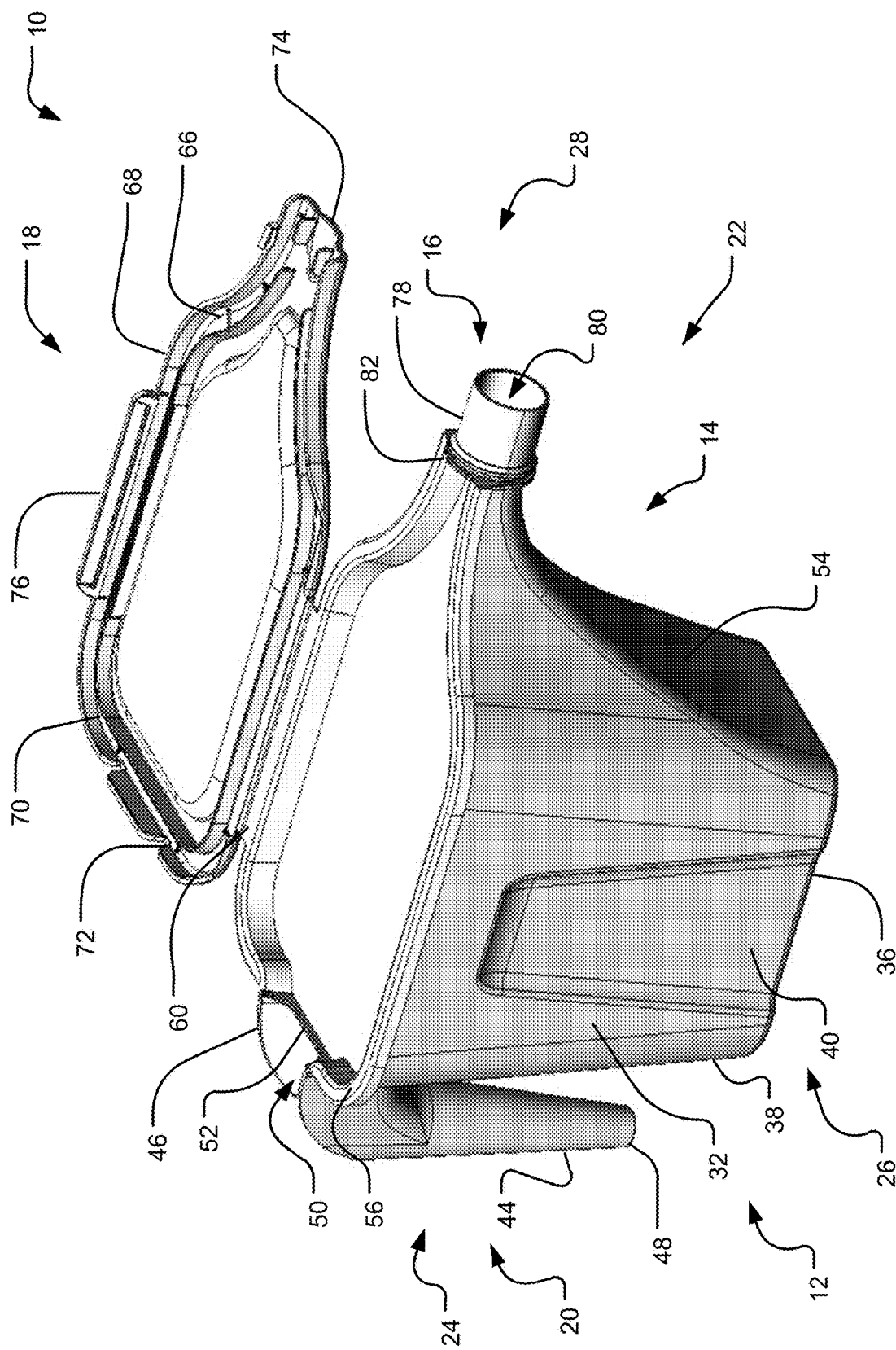
FIG. 40 shows a side perspective view of the birdseed tote of FIG. 39 with the lid open.
Figure 41:
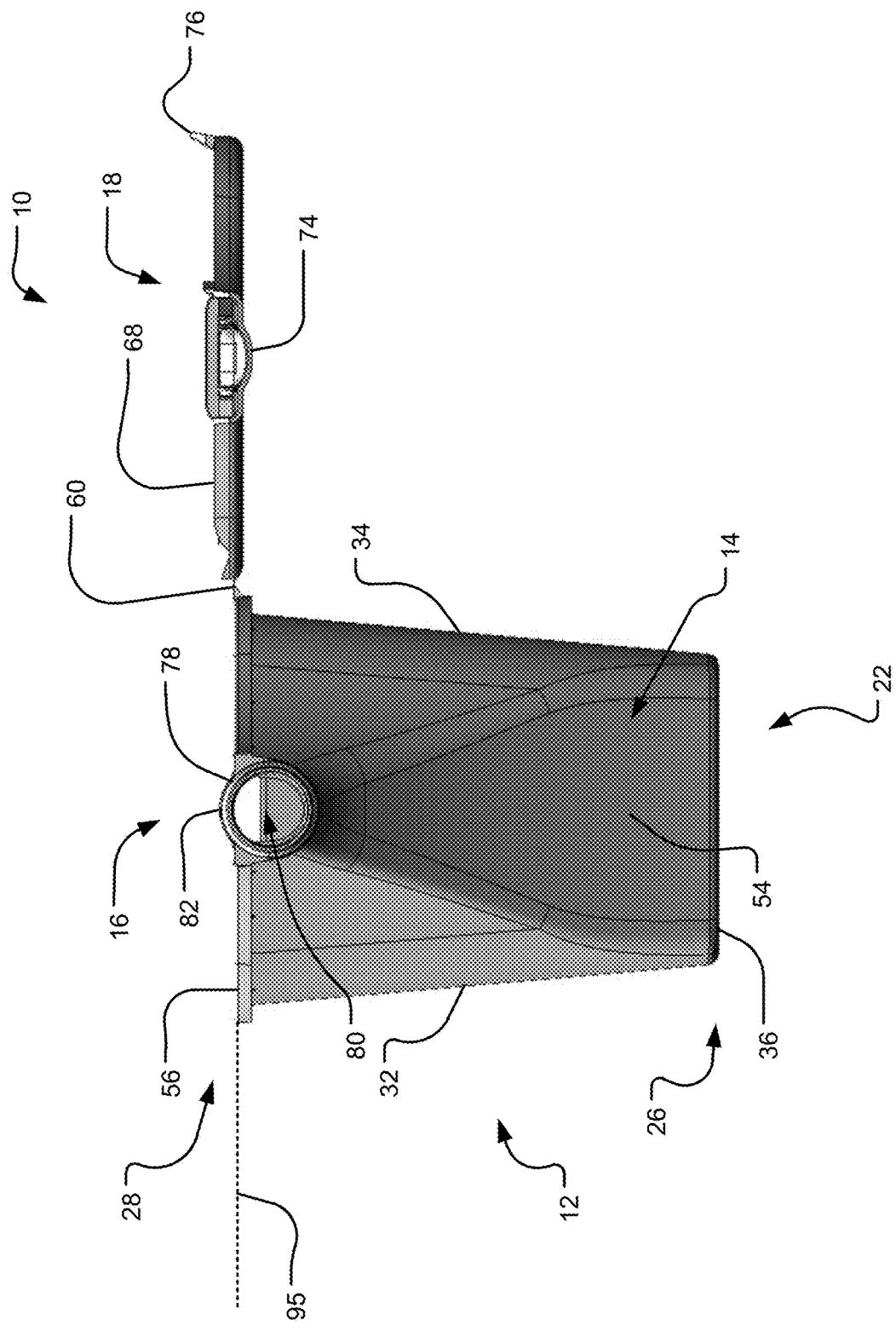
FIG. 41 is a front view of the birdseed tote of FIG. 40.
Figure 42:
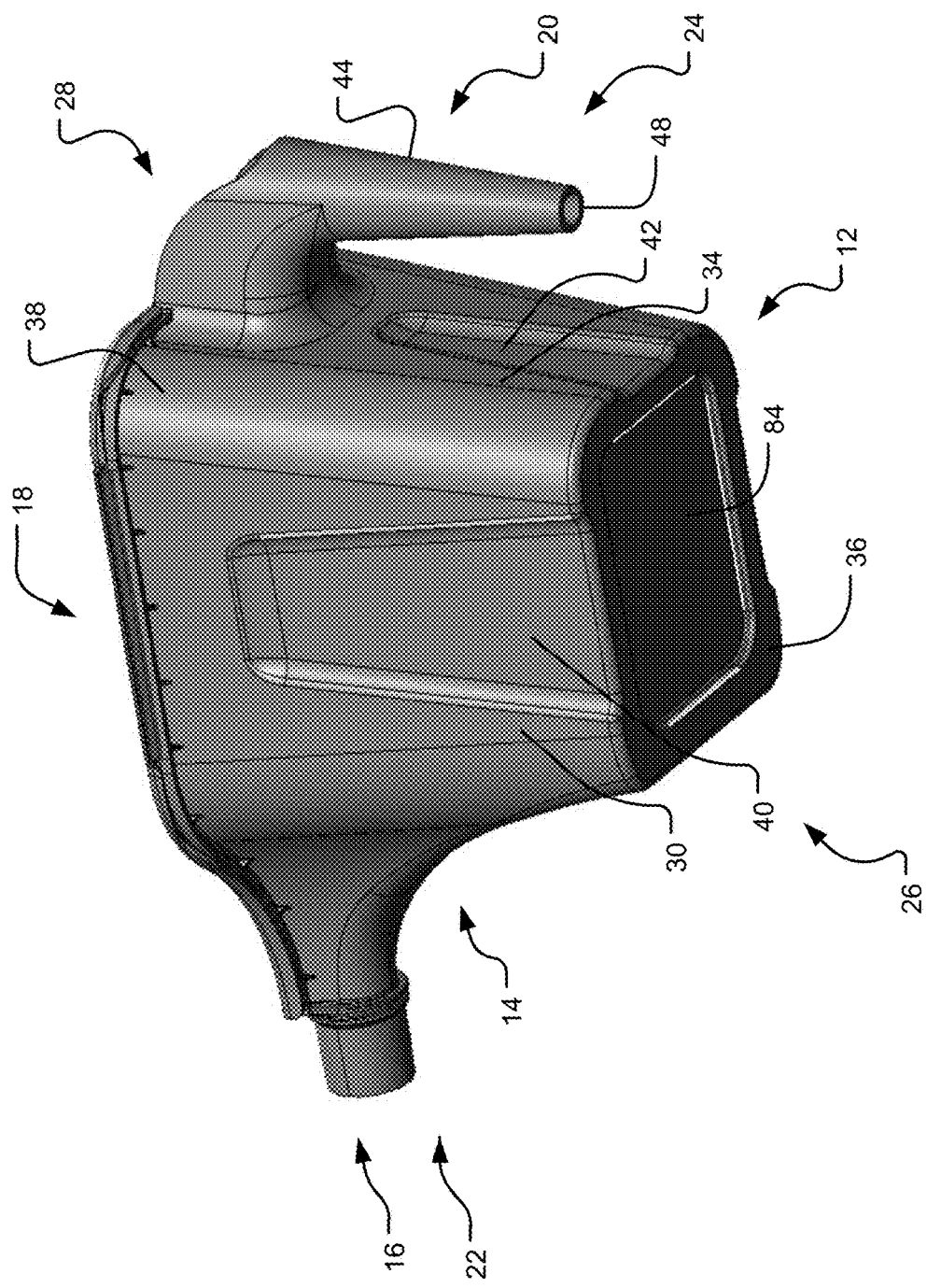
FIG. 42 shows a distal perspective view of the birdseed tote of FIG. 39.
Figure 43:
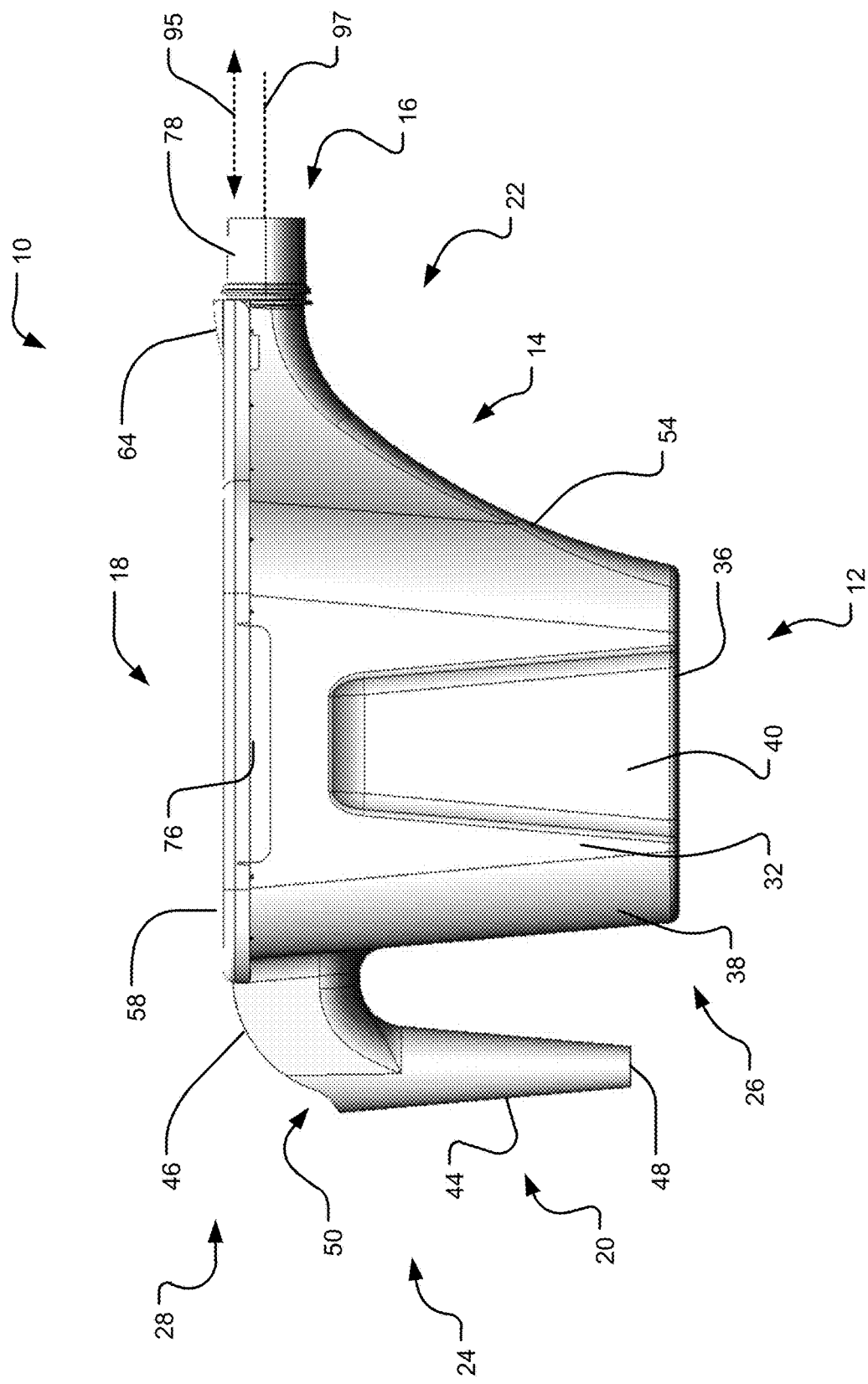
FIG. 43 is a side view of the birdseed tote of FIG. 39.
Figure 44:
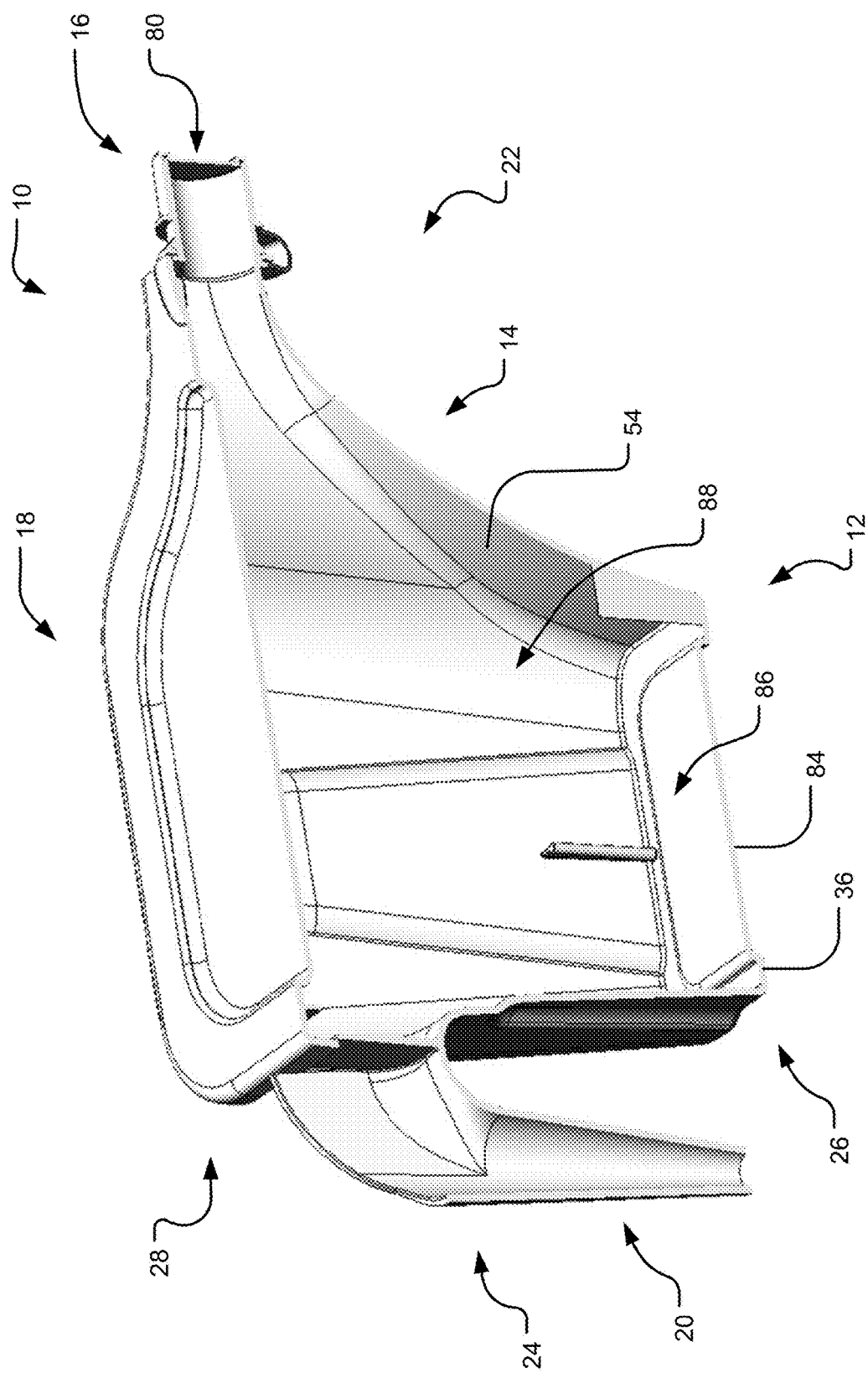
FIG. 44 is a side perspective cross-sectional view of the of the birdseed tote of FIG. 39.

As another example of the cap assembly 104, reference is made to FIG. 38, which includes a valve formed by one or more flexible surfaces 1406 covering a valve opening 1404 defined in a lid 1402. The spout 16 of the birdseed tote 10 or similar device is inserted through the valve opening 1404 by displacing the flexible surfaces 1406, and once the spout 16 is removed, the flexible surfaces 1406 return to their original orientation in a closed position covering the valve opening 1404.

Similar to the easy fill bird feeders 100, the birdseed tote 10 may include a variety of features for easy filling, carrying, and storing. Examples of the birdseed tote 10 are illustrated in FIGS. 39-59. However, it will be appreciated that other implementations may be executed.

For a detailed description of an example of the birdseed tote 10, reference is made to FIGS. 39-47. In one implementation, the birdseed tote 10 includes a tote body 12 with a neck 14 and a handle 20 extending therefrom or otherwise connected thereto. The neck 14 may extend or otherwise connect to a spout 16. A lid 18 covers an opening into an interior of the tote body 12.

In one implementation, a first sidewall 30 and a second sidewall 32 each extend between a front end 22 and a back end 24 and from a distal end 26 to a proximal end 28. The first sidewall 30 and the second sidewall 32 may be opposing sidewalls oriented generally parallel to each other. A distal surface 36 connects distal ends of the first sidewall 30 and the second sidewall 32, and a back wall 34 connects back ends of the first sidewall 30 and the second sidewall 32. In one implementation, the back ends of the first sidewall 30 and the second sidewall 32 are connected with a contoured corner 38 of the back wall 34. In one implementation, the neck 14 extends from front ends of the first sidewall 30 and the second sidewall 32, which may be similarly connected with a contoured corner. The first sidewall 30, the second sidewall 32, the distal surface 36, the back wall 34, and the neck 14 form the tote body 102 and define an interior 88 configured to hold a supply of birdseed. Various indents (e.g., 40, 42, and 84) may be present in the tote body 12.

Figure 50:
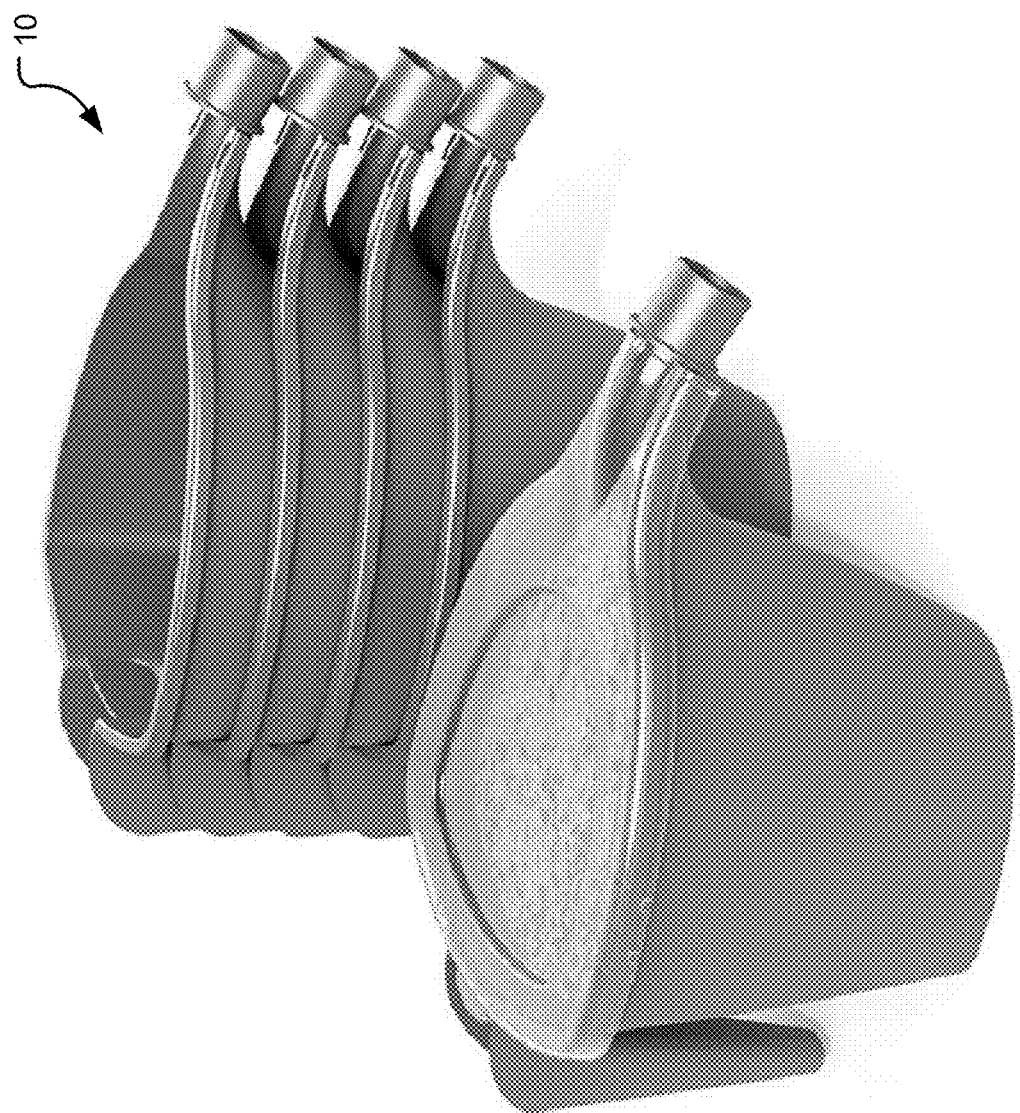
FIG. 50 shows the birdseed tote of FIG. 48 and a plurality of stacked birdseed totes in a nested position.

The handle 20 may be configured to permit the birdseed totes 10 to be stacked in a nested position (e.g., with the tote body 12 of one birdseed tote 10 positioned in the interior 88 of another birdseed tote 10 an example of which shown in FIG. 50) for display without jamming the tote bodies 12 together. More particularly, in one implementation, the handle 20 includes a handle body 44 extending proximally from a distal tip 48 to a handle edge 46. The handle edge 46 defines a handle opening 50 configured to receive the handle body 44 of another birdseed tote 10. A shape and size of the handle opening 50 prevents the second birdseed tote 10 from being moved too far distally into the first birdseed tote 10 where the two birdseed totes 10 would jam together making it difficult to pull them apart. In one implementation, a back panel 52 prevents a birdseed from spilling from the interior 88 of the tote body 12 into the handle opening 50. When the birdseed totes 10 are filled with birdseed, they generally will not be placed in a nested position but may be placed in a storage position with the distal surface 36 of one of the birdseed totes 10 being placed on a proximal surface 58 of the lid 18 of another of the birdseed totes 10. In one implementation, the distal surface 36 is placed on an indented surface 62 of the proximal surface 58 of the lid 18. The lid 118 may further include a raised portion 64 disposed near a spout body 78 of the spout 16.

The lid 18 may be completely removable from the tote body 12 or releasably engaged to the tote body 12 on a first side (e.g., near the second sidewall 32) with a tab 76 and permanently connected on a second side (e.g., near the first sidewall 30) with a hinge 60. In one implementation, the tote body 12 includes a proximal edge 56 that is integral with the hinge 60. The lid 18 includes a distal surface 66 from which a lip 68 extends to engage the proximal edge 56 to close the interior 88 of the tote body 12. In one implementation, a track 70 extends from the distal surface 66 to define a channel to receive the proximal edge 56. The lid 18 may be configured to accommodate the handle 20 and the spout 16, for example, with handle recesses 72 to accommodate the handle edge 46 and with a spout edge 74 to meet a spout rim 82.

Figure 45:
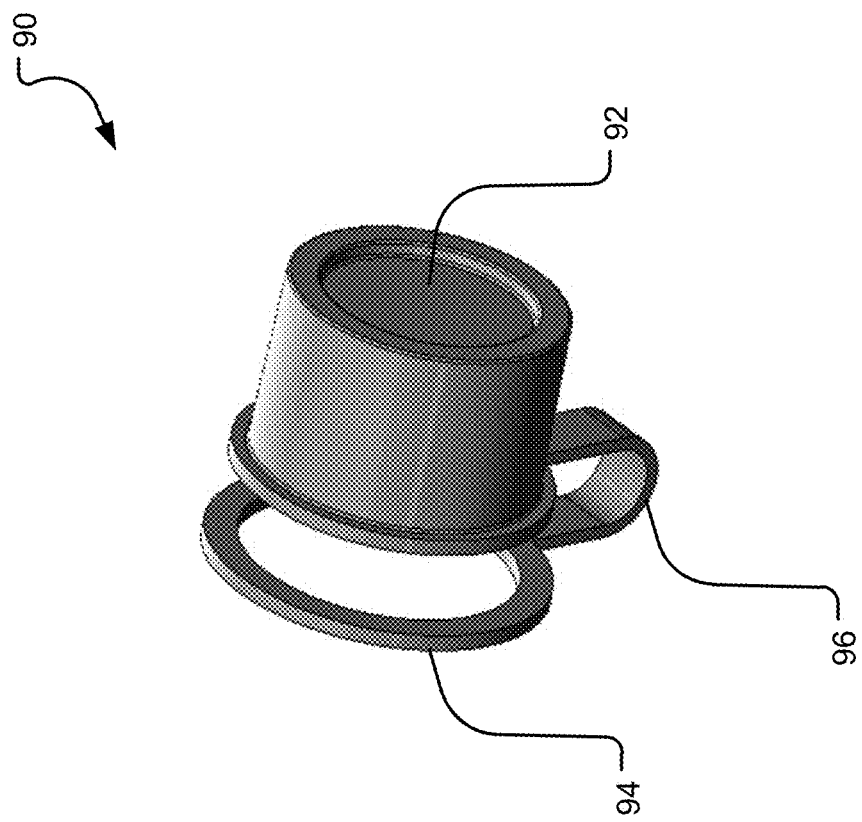
FIG. 45 shows an example spout cap.
Figures 46A, 46B:
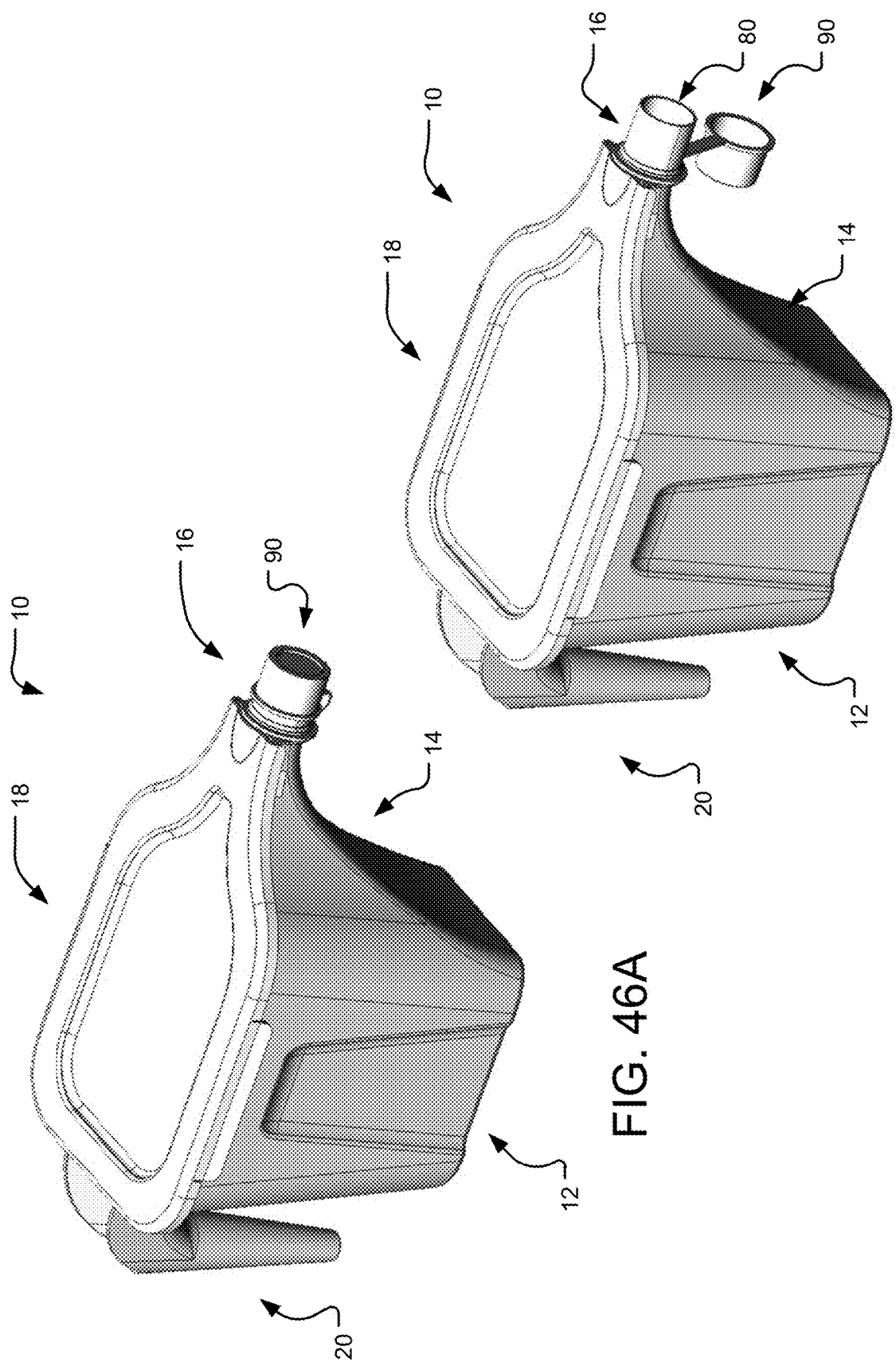
FIGS. 46A and 46B show the of the birdseed tote of FIG. 39 with the spout cap closed and open, respectively.
Figure 47:
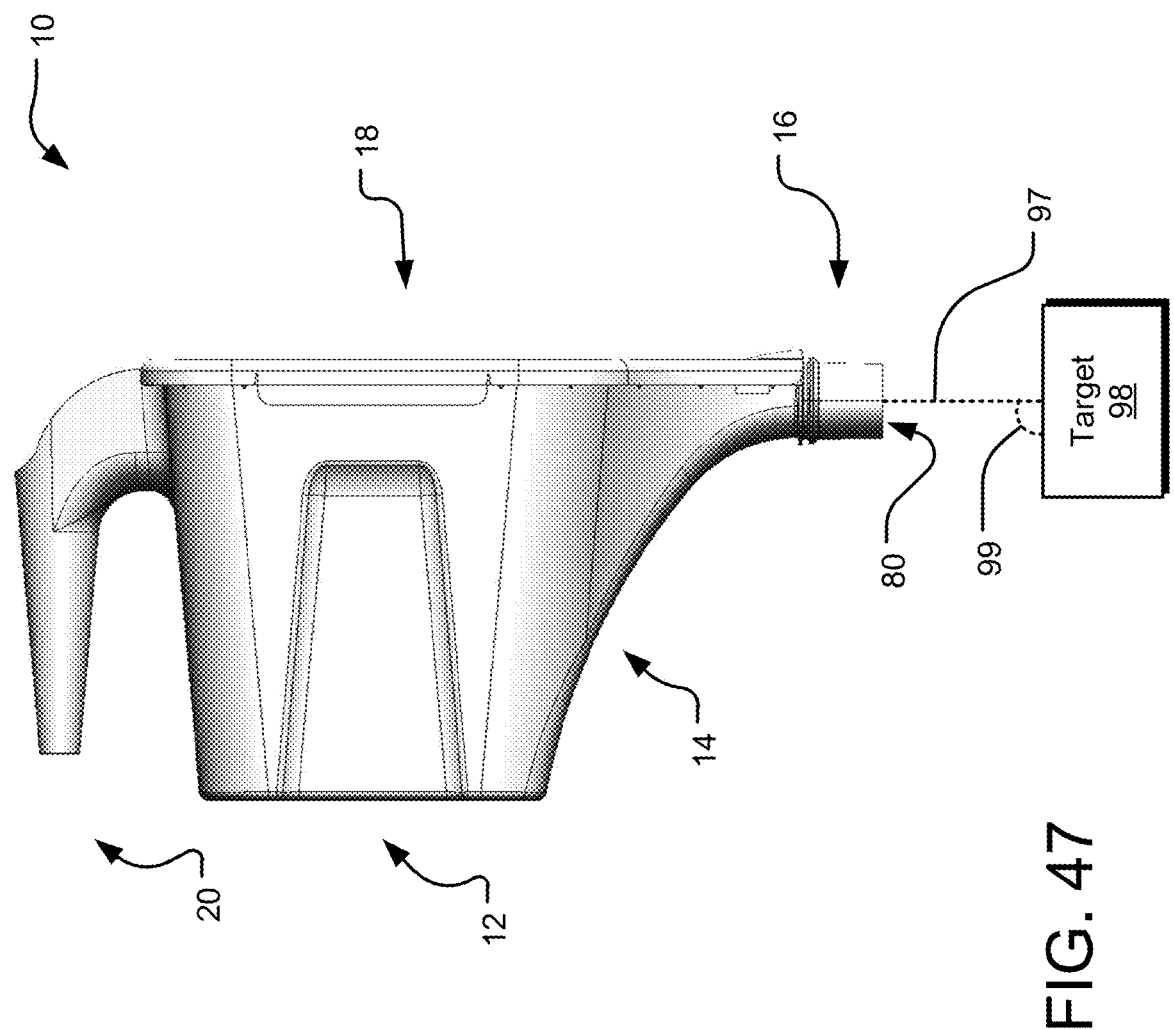
FIG. 47 shows the of the birdseed tote of FIG. 39 in a vertical orientation with a plane of a proximal edge of the tote body and an axis line of the spout at perpendicular angle to a target.

Turning to FIGS. 45-46B, in one implementation, the spout body 78 defines a spout opening 80, which may be covered using a spout cap 90. In one implementation, the spout cap 90 includes a spout cap body 92 attached to a spout cap ring 94 with a connector 96. The spout can ring 94 may be engaged to the spout rim 82 to prevent the spout cap 90 from getting misplaced when the spout opening 80 is uncovered.

In one implementation, the neck 14 includes a neck surface 54 extending along a contour from the distal surface 36 to a distal end of the spout body 78. In one implementation, the contour along which the neck surface 54 extends includes a plurality of angles defined relative to the distal surface 36 ranging from ten degrees to twenty degrees (e.g., a first angle of ten degrees, a second angle of fifteen degrees, and a third angle of twenty degrees). The neck surface 54 may transition into the distal end the spout body 78 via the spout rim 82. Similarly, in one implementation, the proximal edge 56 of the tote body 12 defines and extends along a plane 95. The proximal edge 56 may transition into a proximal end of the spout body 78 via the spout rim 82. The spout body 78 defines an axis line 97 extending along a center of the spout opening 80 and parallel to the plane 95 of the proximal edge 56 of the tote body 12.

As described herein, the neck surface 54 is shaped to direct the birdseed from the distal surface 36 of the tote body 12 through the spout opening 80 without an orientation of the plane 95 and thus the axis line 97 extending past an angle 99 that is perpendicular to a target 98. Stated differently, the neck surface 54 is shaped according to the angle of repose of the birdseed, such that the birdseed moves under its own weight from a bottom section 86 of the interior 88 of the tote body 12 without having to extend the tote body 12 past a vertical orientation.

Figure 48:
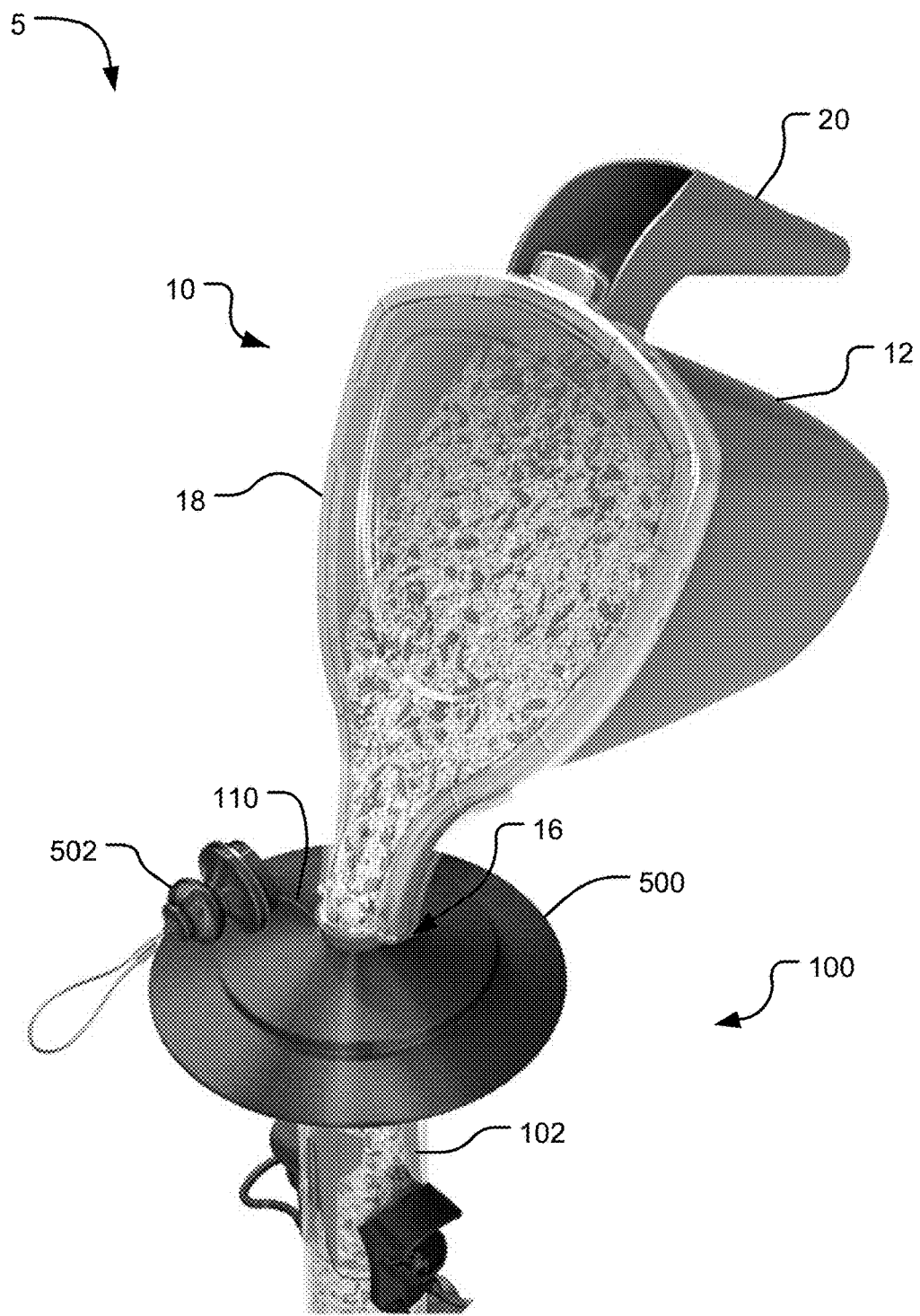
FIG. 48 illustrates another example birdseed tote with the spout inserted into a cap assembly for easy filling.
Figure 49:
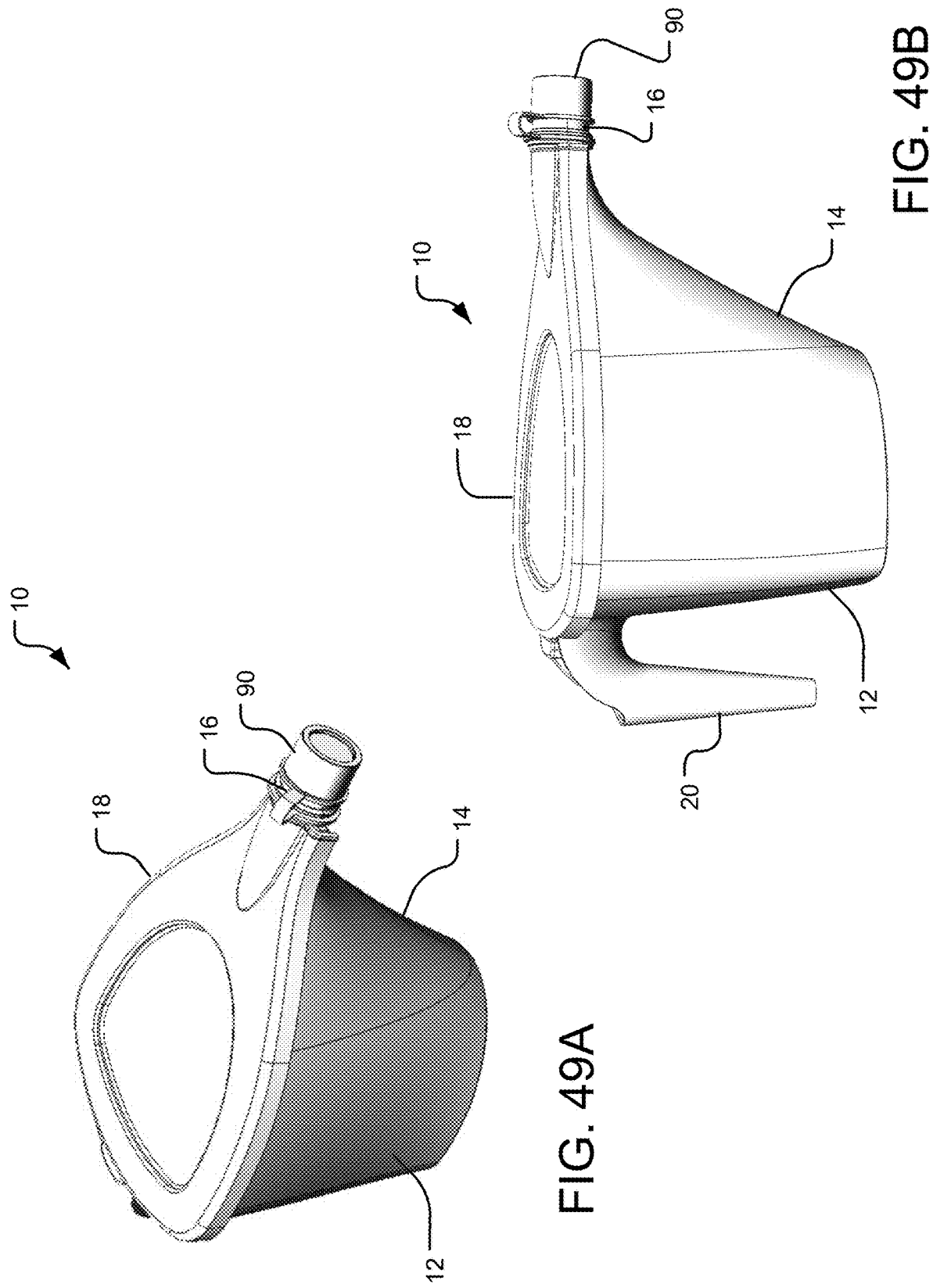
FIGS. 49A and 49B show front perspective and side views, respectively, of the example birdseed tote of FIG. 48.
Figure 51:
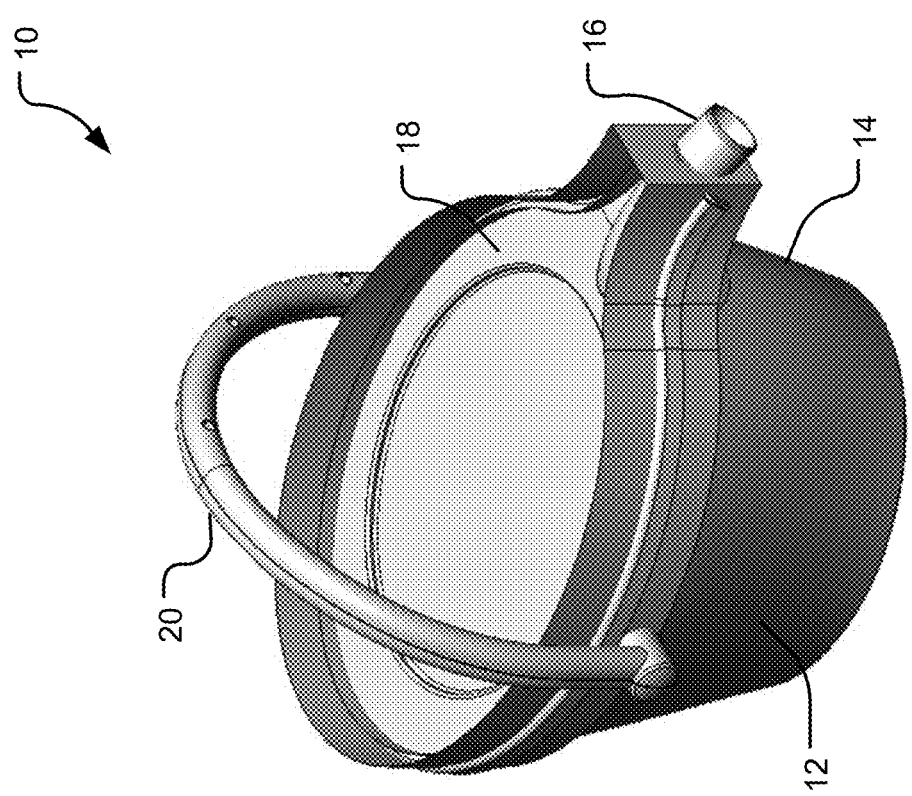
FIG. 51 is a perspective view of another example birdseed tote.
Figure 52:
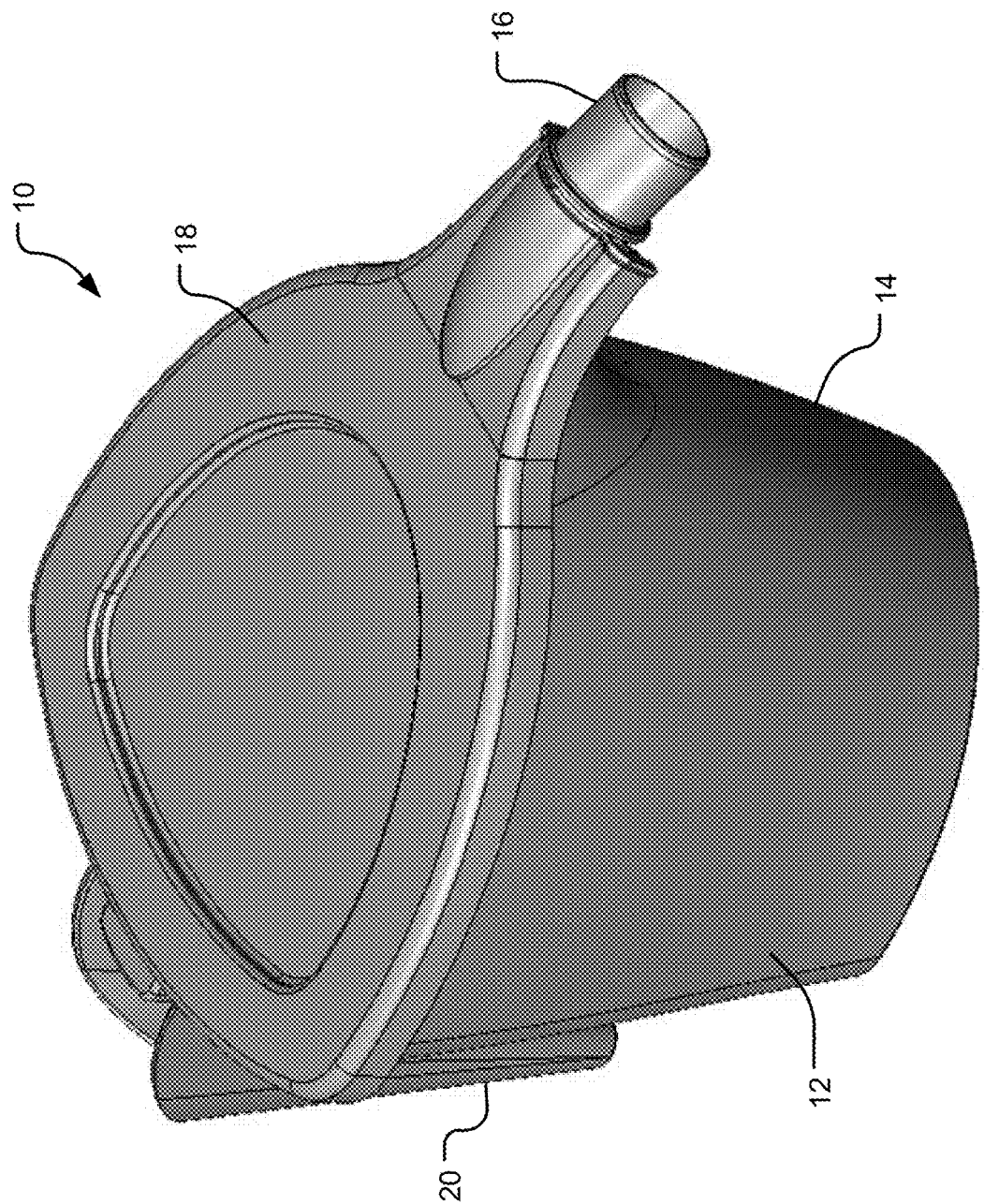
FIG. 52 is a perspective view of yet another example birdseed tote.
Figure 53:
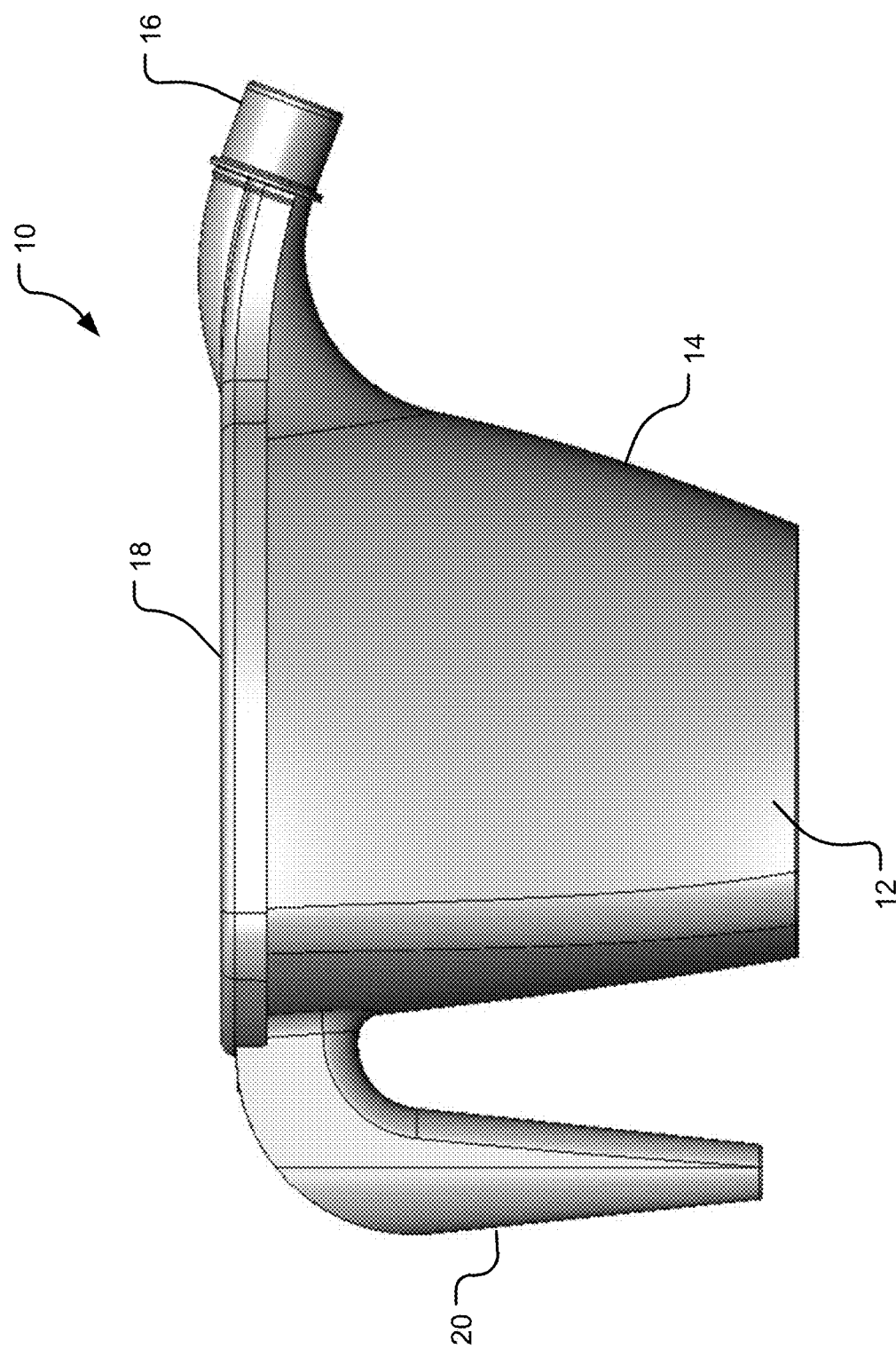
FIG. 53 is a side view of the birdseed tote of FIG. 52.
Figure 54:
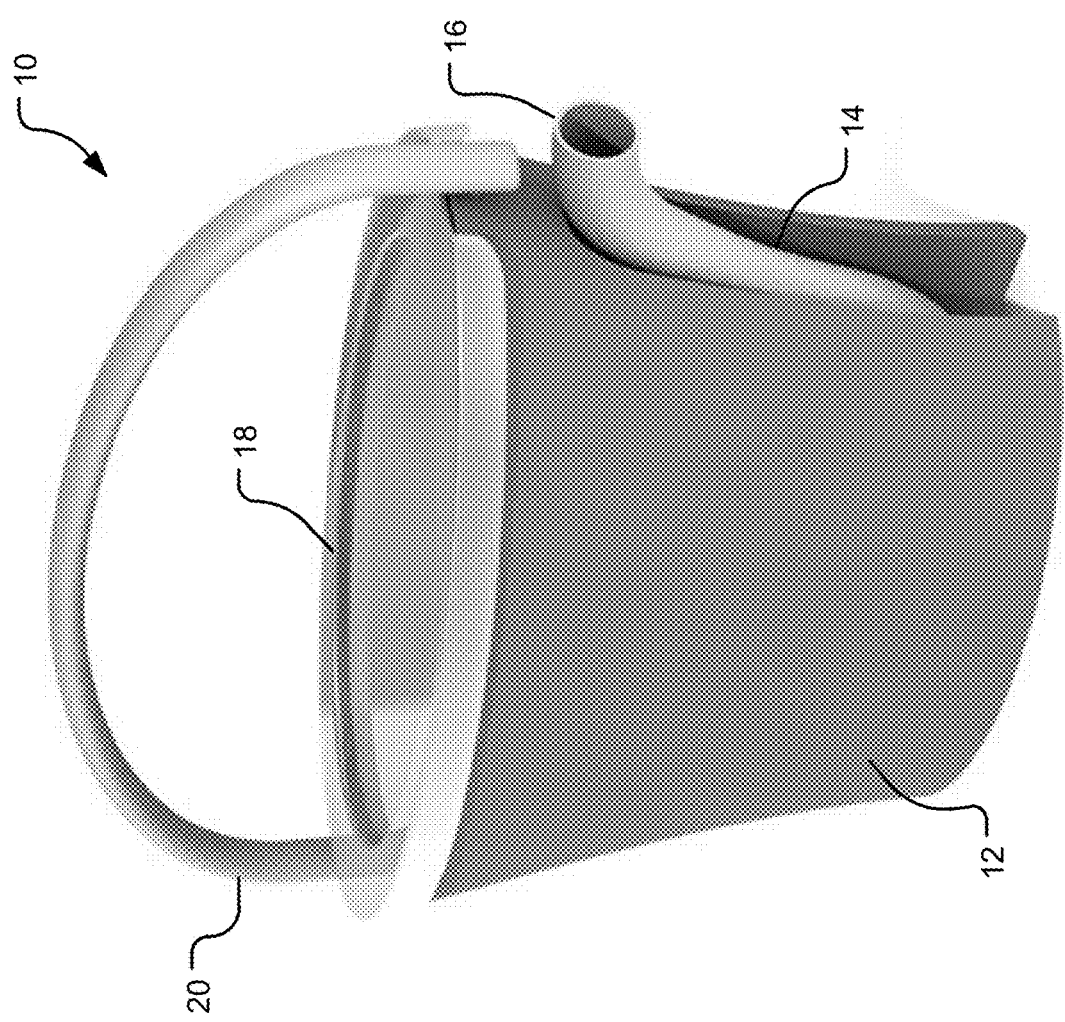
FIG. 54 is a perspective view of still another example birdseed tote.
Figure 55:
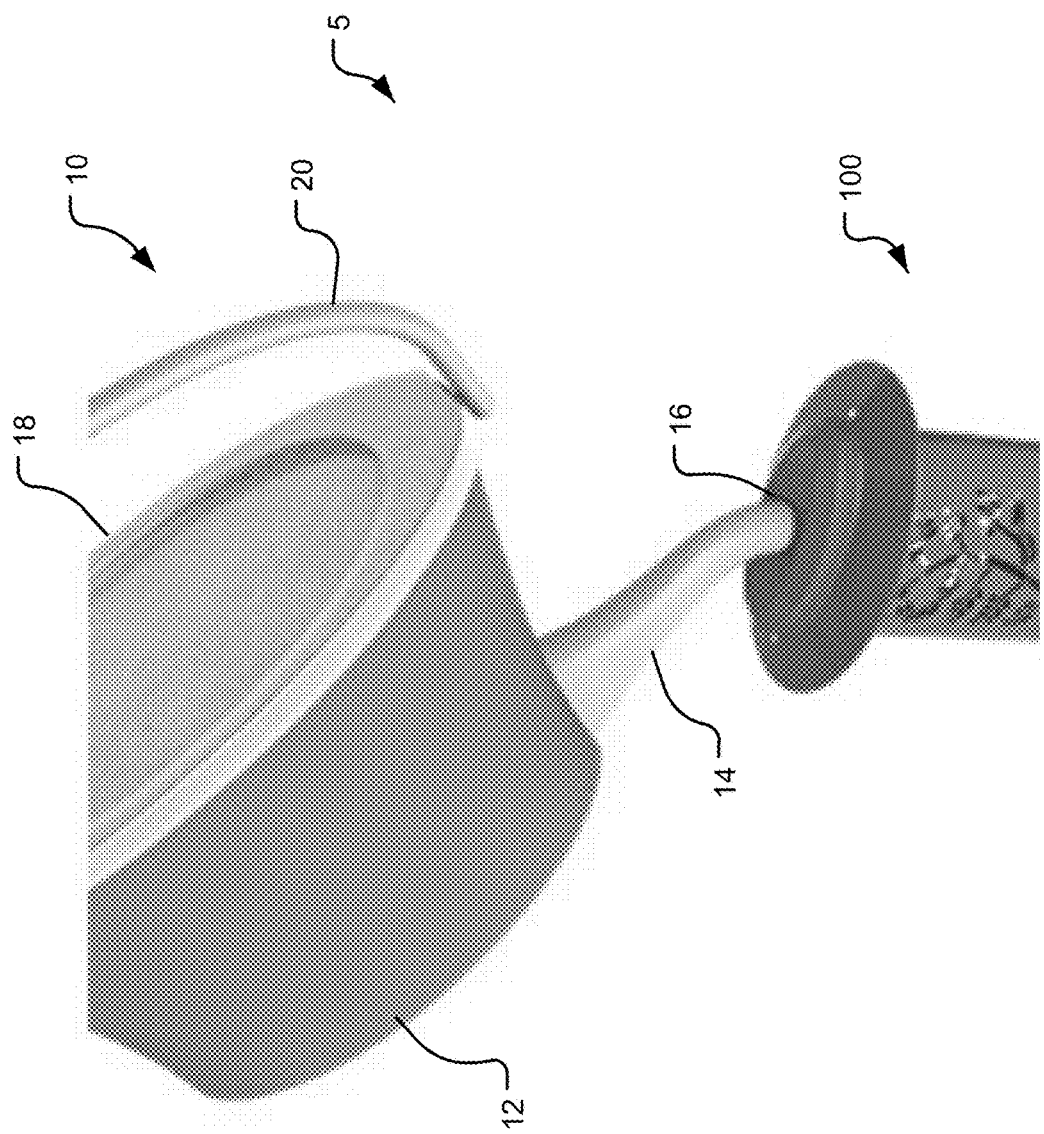
FIG. 55 shows the spout of the birdseed tote of FIG. 54 inserted into a cap assembly of an easy fill bird feeder.

Other examples of the birdseed tote 10 are shown in FIGS. 48-59. Turning first to FIGS. 48-50, in one implementation, the tote body 12 of the birdseed tote 10 may have a rounded shape and a completely removable lid 18, among other aesthetic differences. Referring next to FIG. 51, in one implementation, the tote body 51 may be rounded further with the handle 20 arcing over the lid 18 and with an edge of the tote body 12 (e.g., the proximal edge 56) extending past the lid 10, among other aesthetic differences. FIGS. 52-53 show yet another example of the birdseed tote 10 with the neck 14 extending past the lid 18, among other aesthetic differences. Referring to FIGS. 54-55, the tote body 12 may be rounded further with the handle 20 arcing over the lid 18 and with a portion of the neck 14 moveable into a recess in the tote body 12 in a retreated position, as shown in FIG. 54, and outwardly for a pouring position, as shown in FIG. 55.

Figure 56:
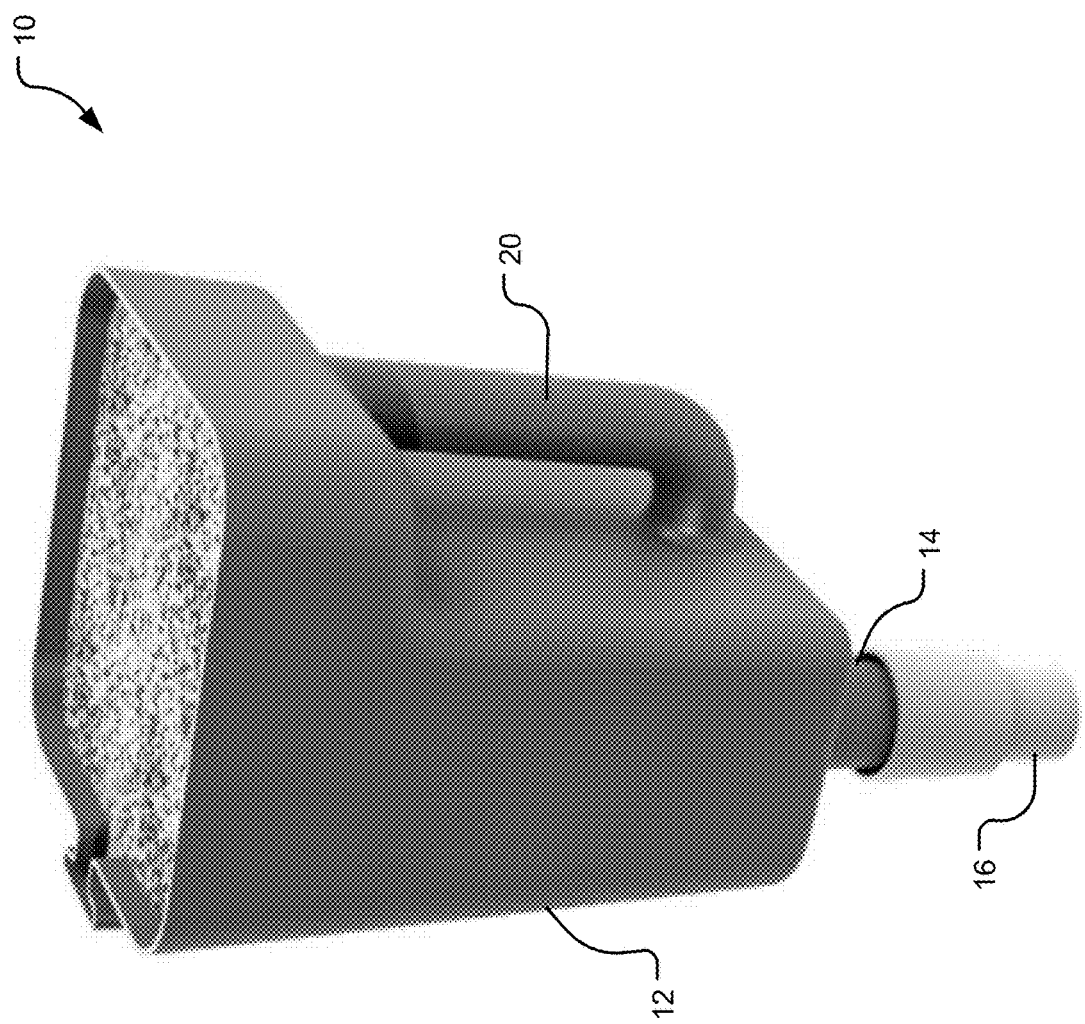
FIG. 56 illustrates a perspective view of yet another example birdseed tote.
Figure 57A:
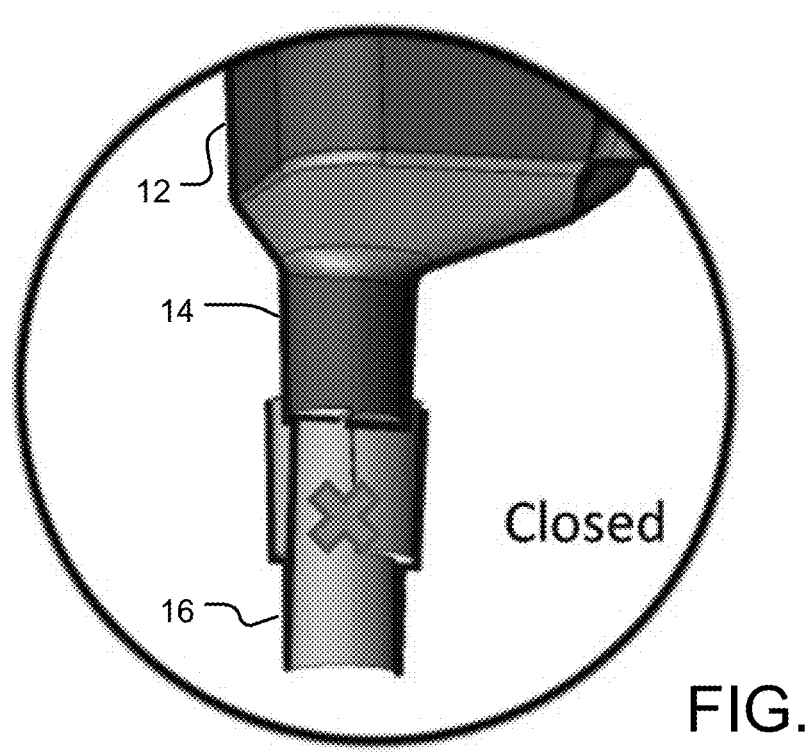
FIGS. 57A and 57B show the spout of the birdseed tote of FIG. 56 in a closed and open position, respectively.
Figure 57B:
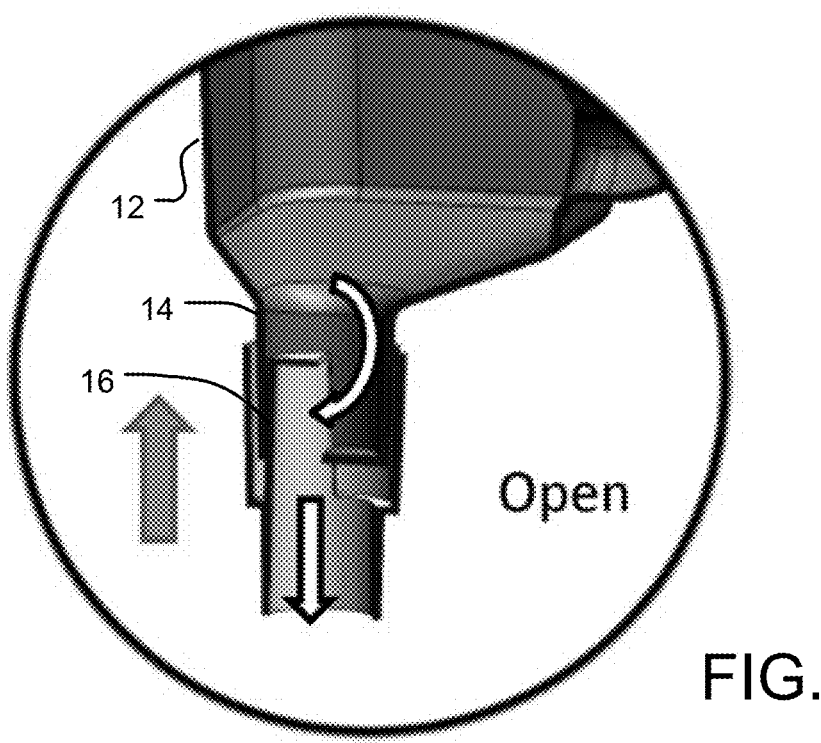
Figure 58:
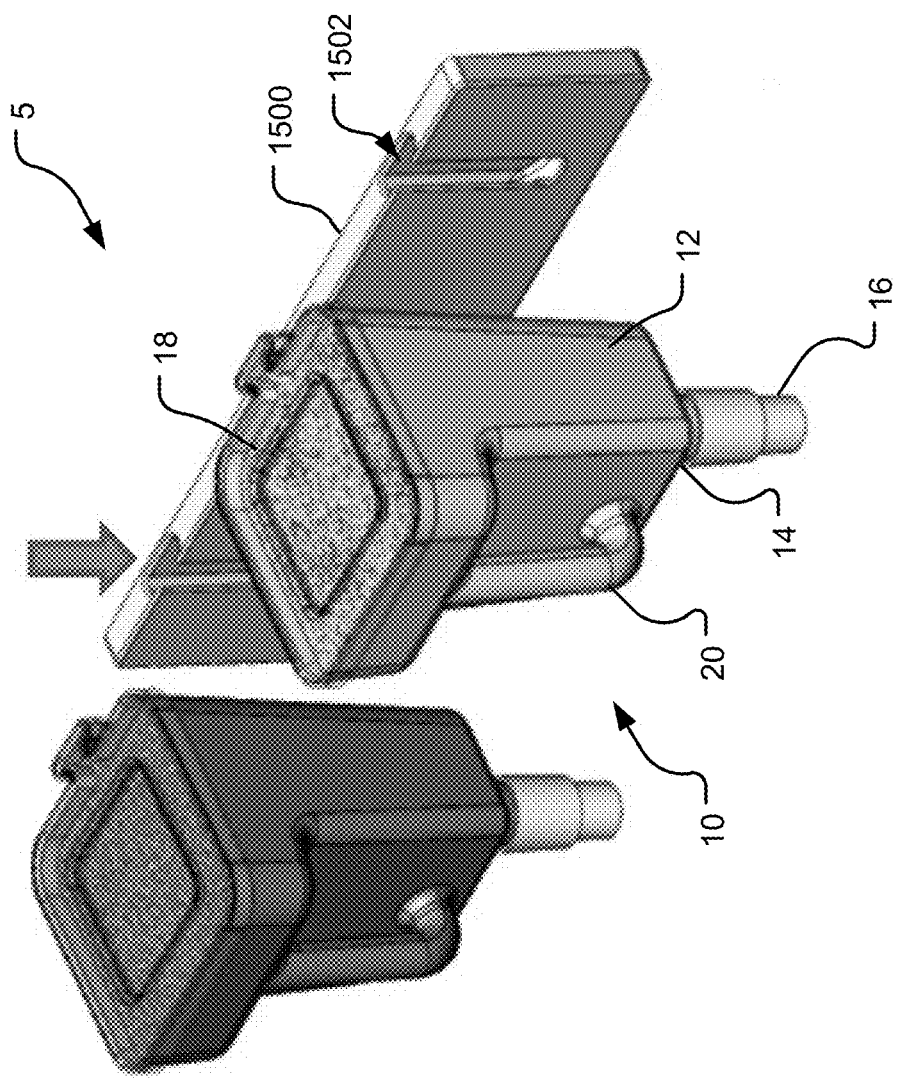
FIG. 58 shows the birdseed tote of FIG. 56 mounted on a wall hanger.
Figure 59:
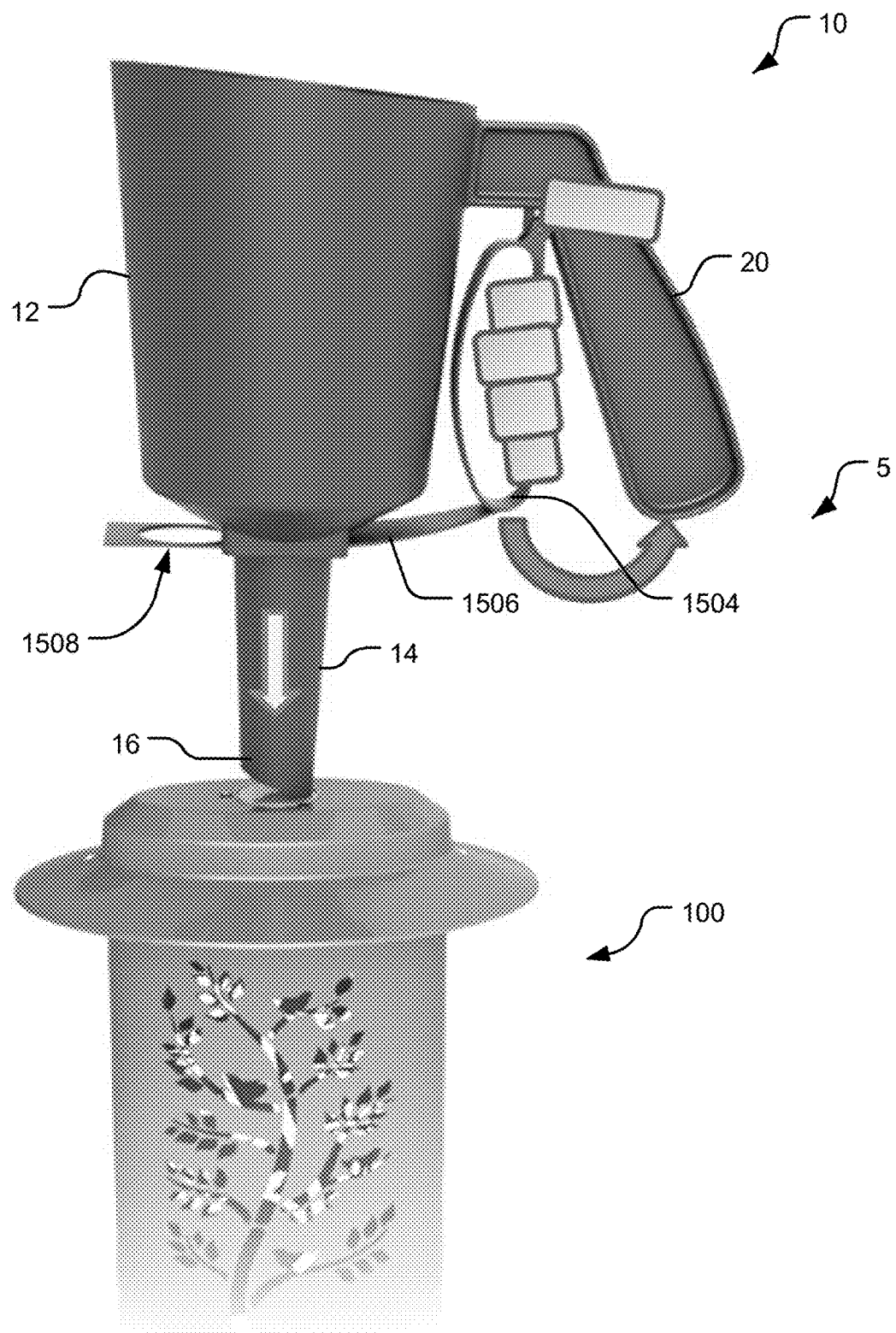
FIG. 59 illustrates a side view of another example birdseed tote prior to insertion into a cap assembly.

Referring to FIGS. 56-58, in one implementation, the birdseed tote 10 is configured for storing on a wall hanger 1500 using a mount 1502. The shape of the tote body 12 is elongated with the handle 20 disposed under a portion of the tote body 12. The spout 16 may be moved as indicated by the arrows in FIG. 57B to open the spout 16. Turning to FIG. 59, in another implementation, the tote body 12 is cylindrical in shape and the handle 20 is configured to squeeze and thus move a spout plane 1506 to orient an opening 1508 over the spout opening 80 as indicated by the arrow to release birdseed down the neck 14 through the spout 16 into the bird feeder 10.

Returning to the cap assembly 104, reference is made to FIGS. 60-64 for an example cap assembly 104 including a spring loaded lid biased towards the closed position. In one implementation, as seen in FIG. 60A, which shows an isometric view of a top portion of a bird feeder 100, the bird feeder 100 includes a lid assembly 6002 configured to releasably engage the roof 6000. The lid 6002 may be in an open or closed position and allows easy access to the reservoir 102 for refilling.

Figure 60A:
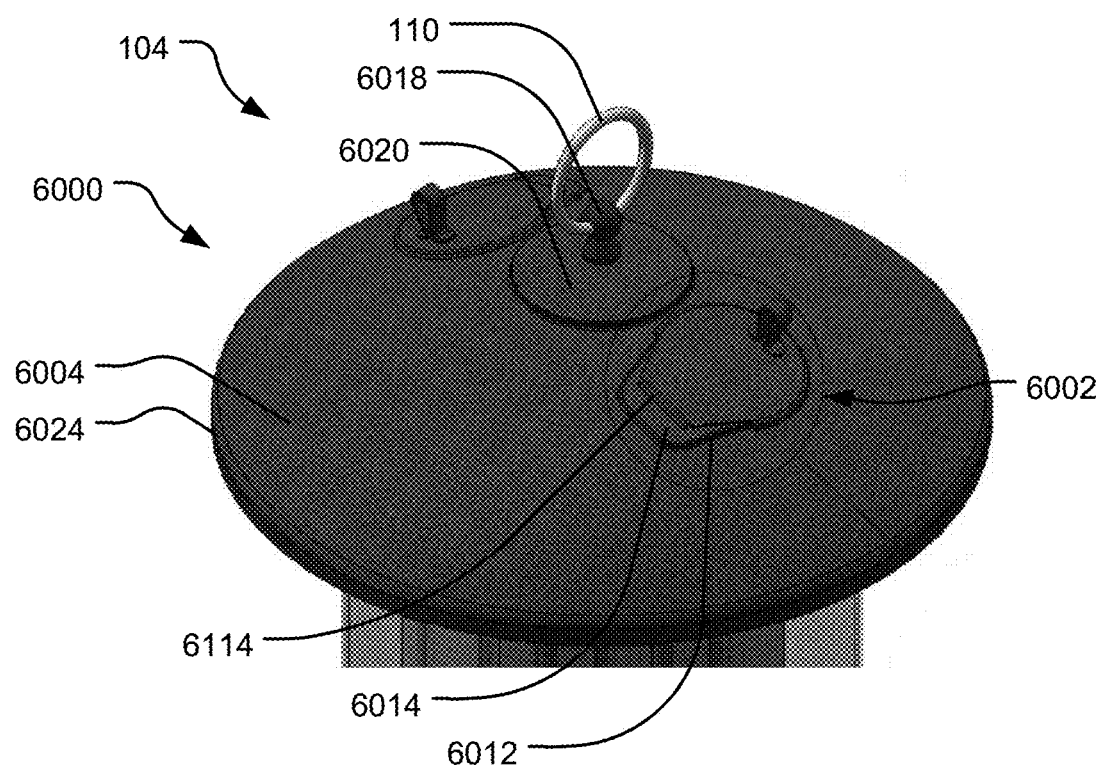
FIGS. 60A-B are a top isometric view of an example cap assembly where a lid is in an closed position and an open position, respectively, and the cap assembly includes the lid with a spring assembly biased towards the closed position.
Figure 60B:
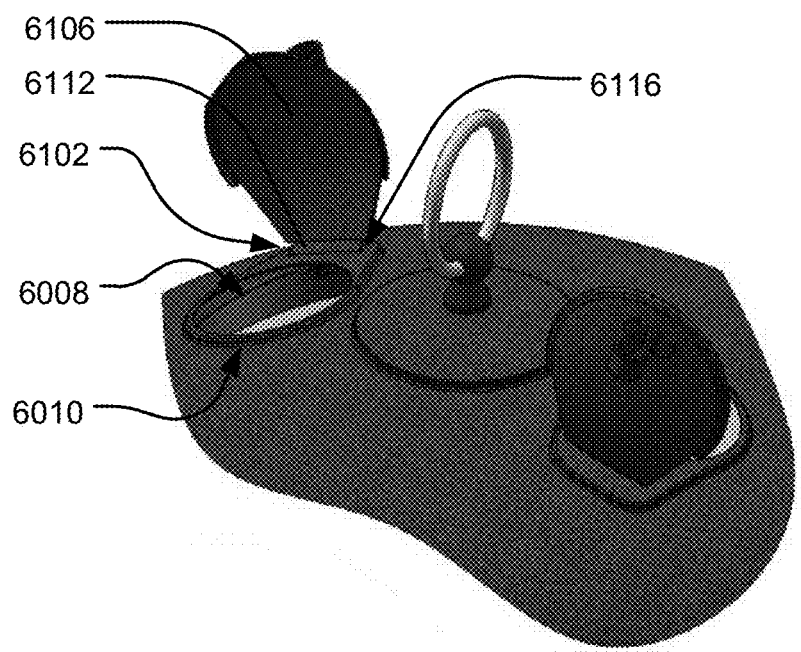
Figure 61A:
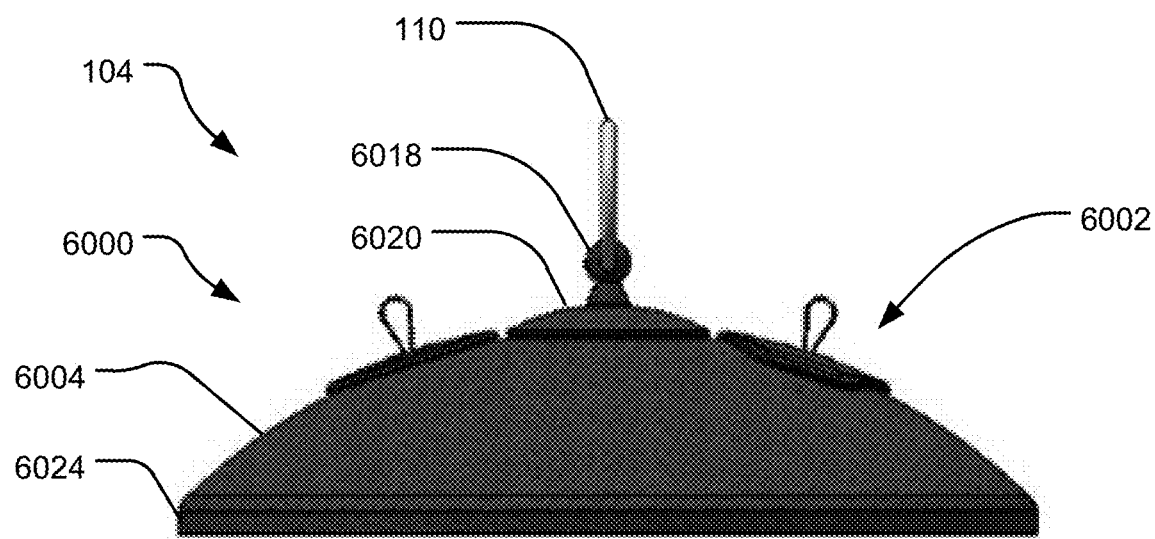
FIGS. 61A-B are a side view and a bottom isometric view, respectively, of a roof of the cap assembly shown in FIGS. 60A-B.
Figure 61B:
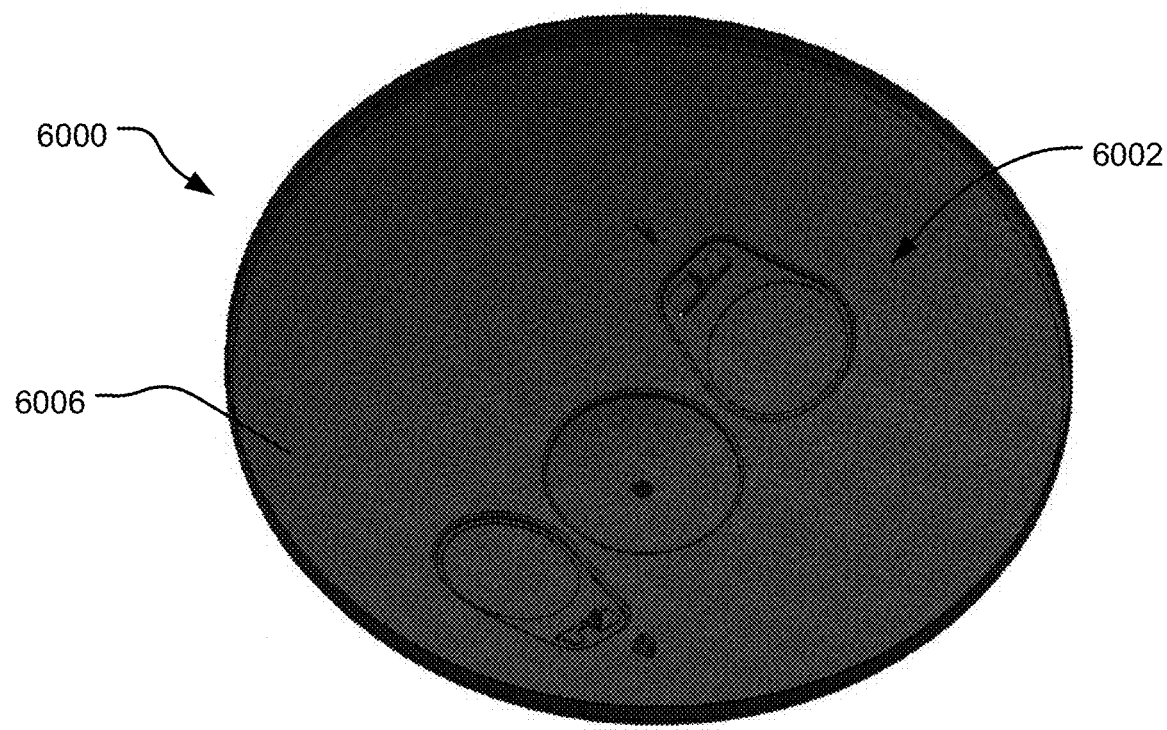

Turning to FIGS. 61A-B, which show a side view and a bottom isometric view of the cap assembly 104 connected to a bowl shaped roof 6000, respectively. The roof 6000 includes a roof outer surface 6004 extending to a roof edge 6024, shown in FIG. 61A, and a roof inner surface 6006, shown in FIG. 61B. A hanger 110 is coupled to the center of the roof outer surface 6004 via a hanger holder 6018 coupled to a holder base 6020 positioned at the center of the roof 6000. The hanger 110 allows the bird feeder 100 to be suspended in the air by attaching to, for example, a branch in a tree or a hook. In one implementation, two lids 6002 are located on opposite ends of the roof 6000 with the holder base 6020 in between the lids 6002. The lids 6002 cover a port opening 6008, shown in FIGS. 60A-B, where each porting opening 6008 includes a base 6010 having a base outer surface 6014, and a base edge 6012. The base 6010 and edge 6012 may be raised around the port opening base 6010 to prevent rain and/or snow from entering the bird feeder 100.

Figure 62A:
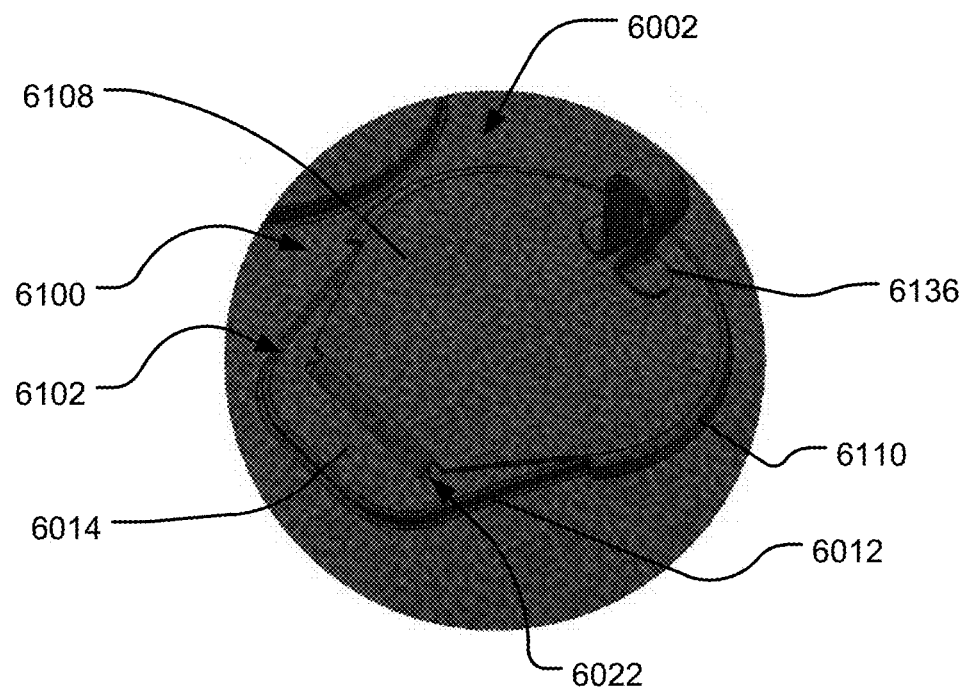
FIGS. 62A-B are detailed views of the cap assembly and an engagement section of the cap assembly, respectively.
Figure 62B:
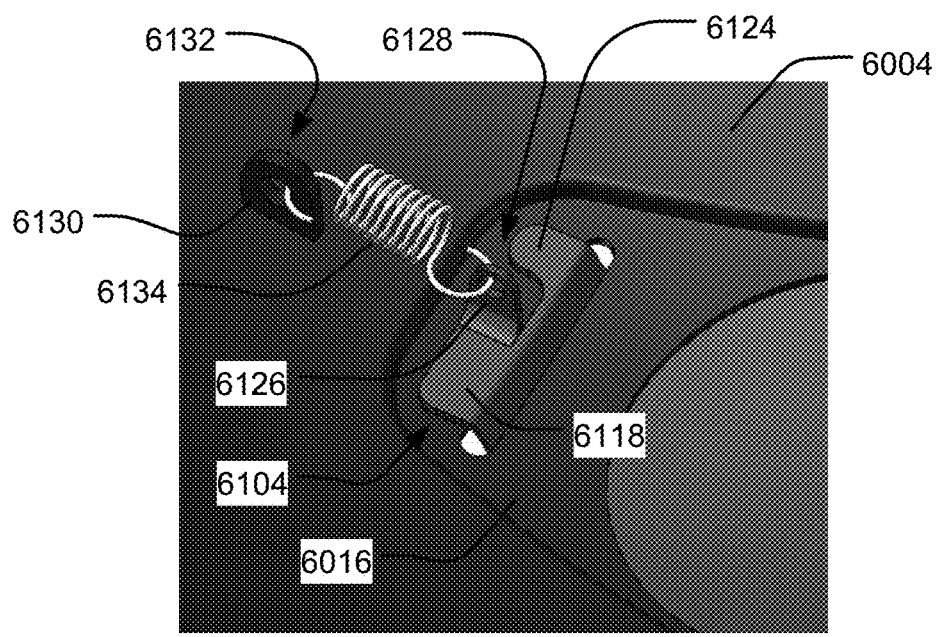

FIGS. 60B and 62A-B detail the lid's 6002 components and coupling to the roof 6000. The lid 6002 is coupled to the port opening base 6010 via a lid transition section 6102 of the lid 6002, shown in FIG. 60B. The lid 6002 further includes a lid handle 6136 positioned on a lid's outer surface 6108 of a lid section 6100 and a port engagement section 6104. The lid section 6100 is circular and further includes an inner surface 6106 and an edge 6110. When the lid 6002 is in a closed position, the edge 6110 may extend towards the roof outer surface 6004 to provide side coverage to the port opening 6008. The lid transition 6102 connects the lid section 6002 and the engagement 6104 at an angle and is positioned through a slot 6116 in the port opening base 6010.

Turning to FIG. 62B, the engagement 6104 includes an inner surface 6118 and an outer surface 6120 (not shown) wherein the outer surface 6120 is flush against a base inner surface 6016 when the lid 6002 is in a closed position. The engagement 6104 further includes a tab 6124 and a first flange 6126, wherein the first flange 6126 is perpendicular to the tab 6124 and protrudes away from the base inner surface 6016. The first flange 6126 and the tab 6124 may be cut from a single piece of material and the first flange 6126 can be bent into shape. A second flange 6130, positioned near the first flange 6126, protrudes away from the tab 6124. The first flange 6126 includes a first through-hole 6128, and the second flange 6130 includes a second through-hole 6132. A spring, band, or other flexible member 6134 couples the first flange 6126 and the second flange 6130 via the first and second through-holes 6128 and 6132, respectively.

Figure 63A:
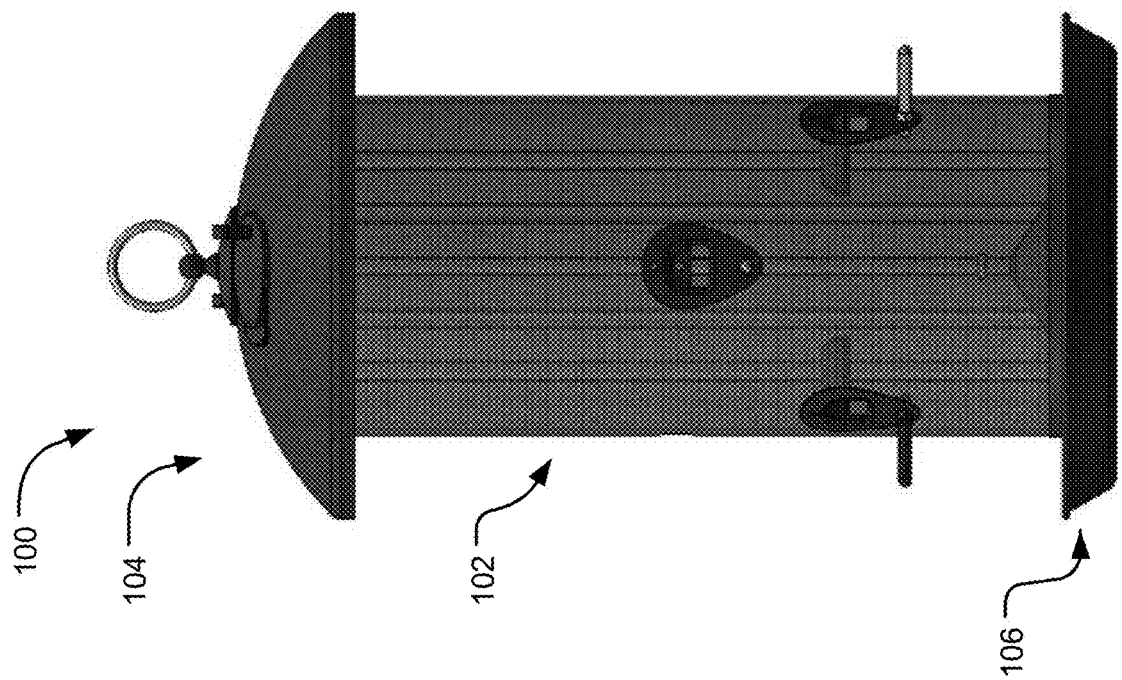
FIGS. 63A-B are a first view and a second view, respectively, of the cap assembly shown in FIGS. 60A-B on an example bird feeder.
Figure 63B:
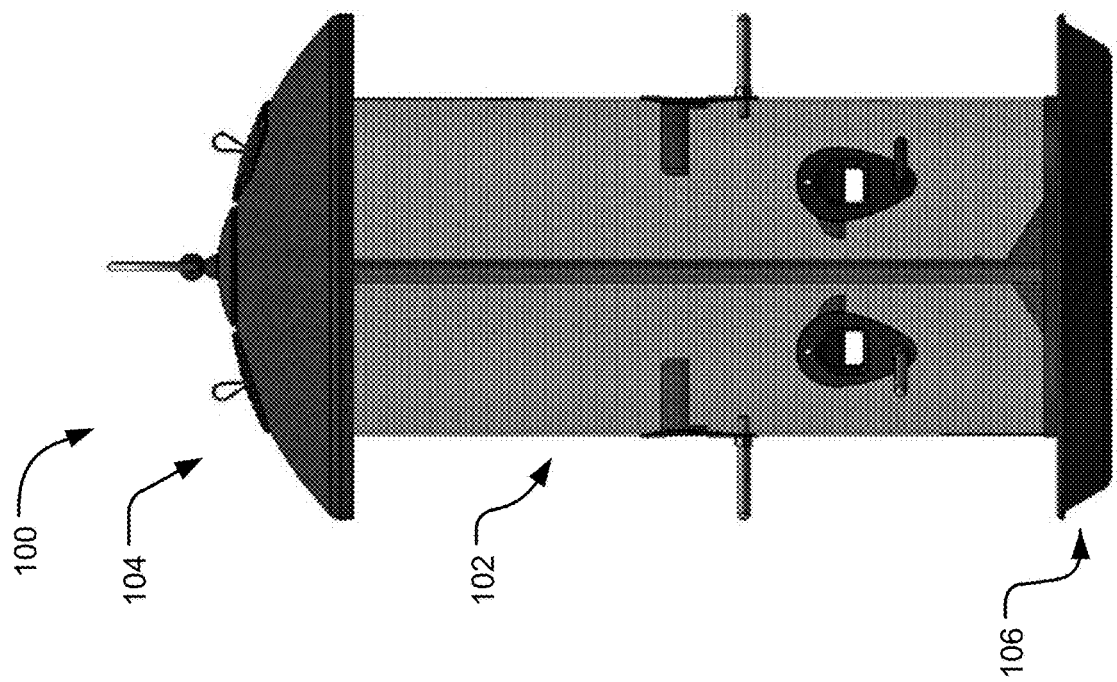

In an example embodiment, the spring 6134 is held in tension so that the lid 6002 remains biased in a closed position. When the lid 6002 is opened by lifting the lid handle 6136, a tensile force is exerted on the spring 6134 until the lid handle 6136 is released and the spring 6134 contracts, automatically closing the lid 6002. While the lid 6002 is opened, the spout 16, shown in FIG. 54, can be inserted into the port opening 6008. During this time, the lid handle 6136 can be released so that the lid 6002 is held open by the neck 14, shown in FIG. 54. When the spout 16 is removed from the port opening 6008, the spring 6134 will contract and automatically move the lid 6002 from an open position to a closed position. The first flange 6126, in addition to connecting the lid 6002 to the roof 6000, also acts as a stopper against the slot in the base 6010, and prevents the lid 6002 from disconnecting from the base 6010. FIGS. 63-64 illustrate the example cap assembly 104 including a spring loaded lid biased to the closed position on an example body 102 and base 106.

Turning to FIGS. 65-67, another example cap assembly 104 is shown including a slide cover. In one implementation, the bird feeder 100 includes a cover 6400 slidably coupled to a cap 6300. The cap assembly 104 also includes a hook 110, shown in FIG. 65A, connected to a hook holder 6406. The hook holder 6406 extends through both a cap and cover's center hole 6420, 6402, respectively, to connect the cap 6300 and cover 6400 so that a cover's inner surface 6408 is flush and slides on a cap's outer surface 6422.

FIGS. 66C and D detail the cap 6300 where the cap 6300 includes a dome portion 6302 and a disc portion 6304. The dome portion 6302 includes a dome center hole 6420, an inner surface 6424, and at least one cap opening 6426 positioned near the dome center hole 6420. In one implementation, two openings 6426 are positioned opposite each other with the center hole 6420 in between each opening 6426. Each dome opening 6426 has at least two tab receivers, a first receiver 6428 and a second receiver 6430, to accommodate a stop tab 6412, shown in FIG. 66B. The disc portion 6304 has a surface 6434 extending from the dome portion 6302 to an edge 6432. The disc surface 6434 can be smooth or contain ridges near the edge 6432.

Turning to FIG. 66A-B, the cover 6400 includes a center hole 6402, at least one cover opening 6404, and an inner 6408 and outer 6410 surface that extends to an edge 6406. Each opening 6404 has a stop tab 6412, shown in FIG. 66B, adjacent to the opening 6404 on the inner surface 6408. The stop tab 6412 has a first 6414 and second 6416 portion connected at a 90 degree angle, and perpendicularly connected to the inner surface 6408. In FIG. 66A, at least one tab handle 6418 protrudes from the outer surface 6410 and is positioned between the openings 6404.

The cover 6400 is positioned on the cap 6300 such that the stop tab 6412 extends into the dome portion's opening 6426. When the cover 6400 is closed, the stop tab 6412 is positioned in the first receiver 6428. To open the cover 6400, the cover 6400 rotates until the stop tab 6412 moves from the first receiver 6428 to the second receiver 6430 and the cover's opening 6404 aligns with the cap's opening 6426. The stop tab 6412 prevents the cover 6400 from unnecessarily rotating around the cap 6300 more than needed to open and close the cover 6400. When the cover 6400 is open, a spout 16 can be inserted into the cover's opening 6404 and the dome's opening 6426 to fill the bird feeder 100. To close the cover 6400, the cover 6400 is rotated in the opposite direction until that the stop tab 6412 travels from the second receiver 6430 to the first receiver 6428.

Figure 67A:
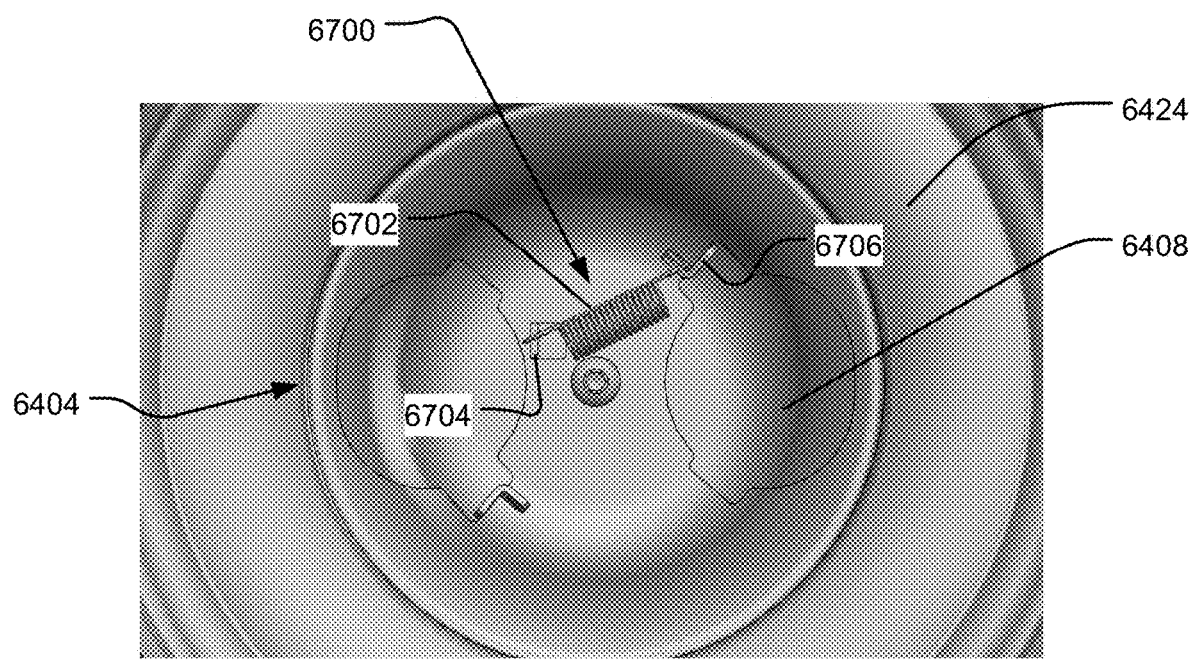
FIGS. 67A-B are a bottom view of an example cover in the open position and the closed position, respectively, highlighting a spring biased to the open and closed position.
Figure 67B:
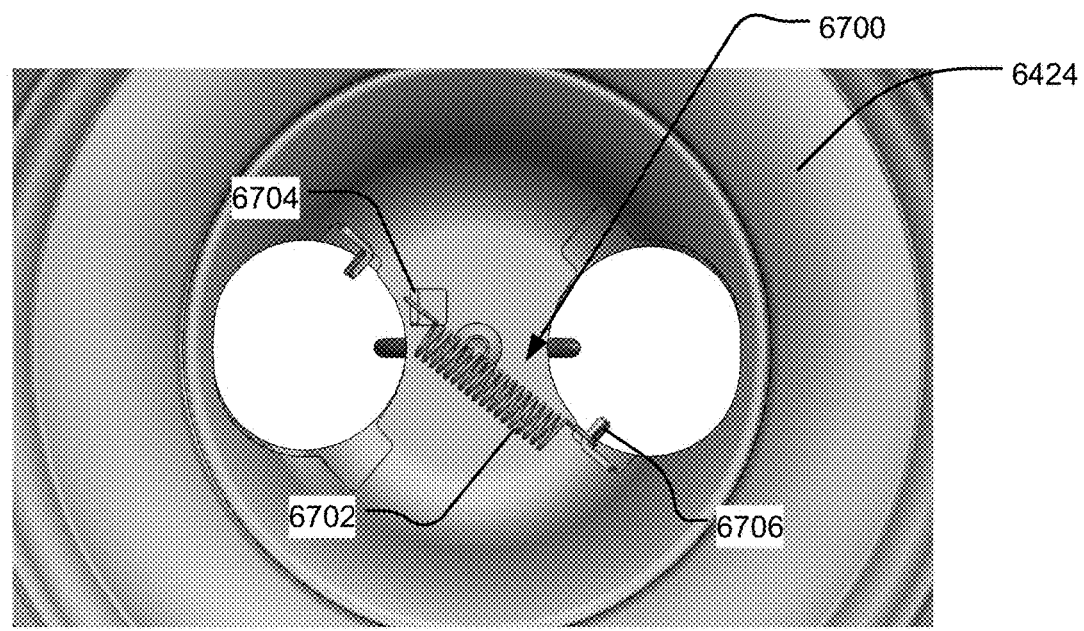
Figure 68B:
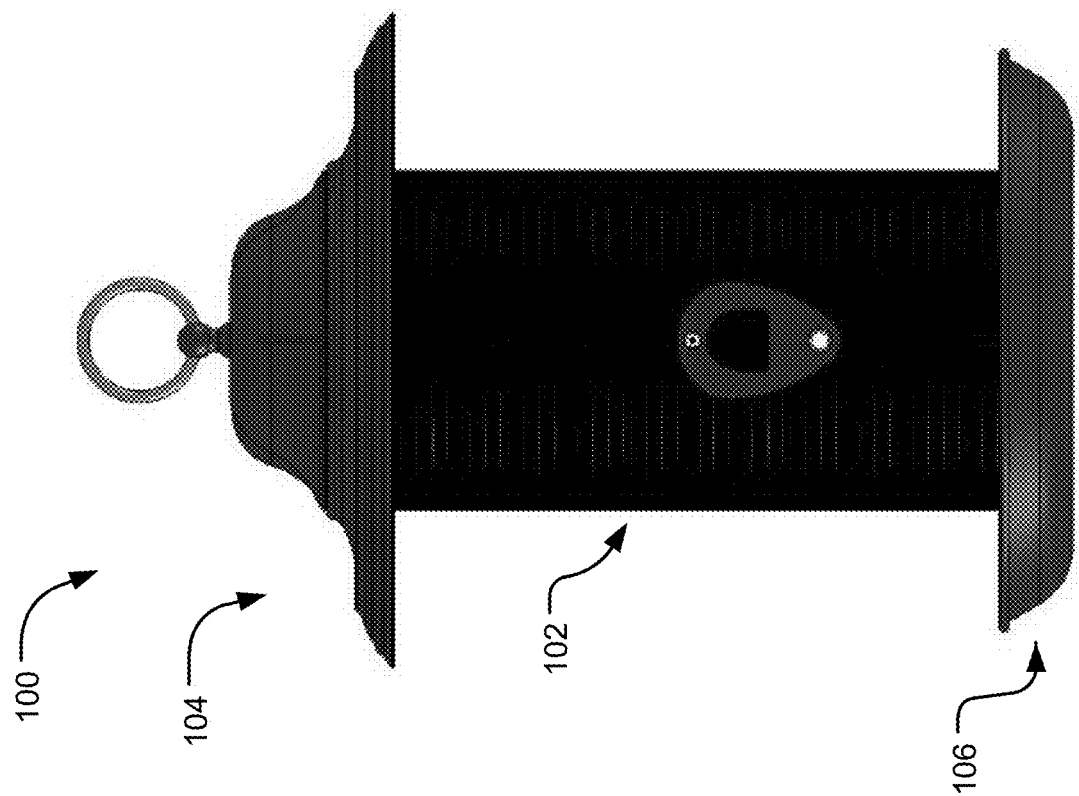
FIGS. 68A-B are a first view and a second view, respectively, of the cap assembly shown in FIGS. 65A-C on an example bird feeder.
Figure 68A:
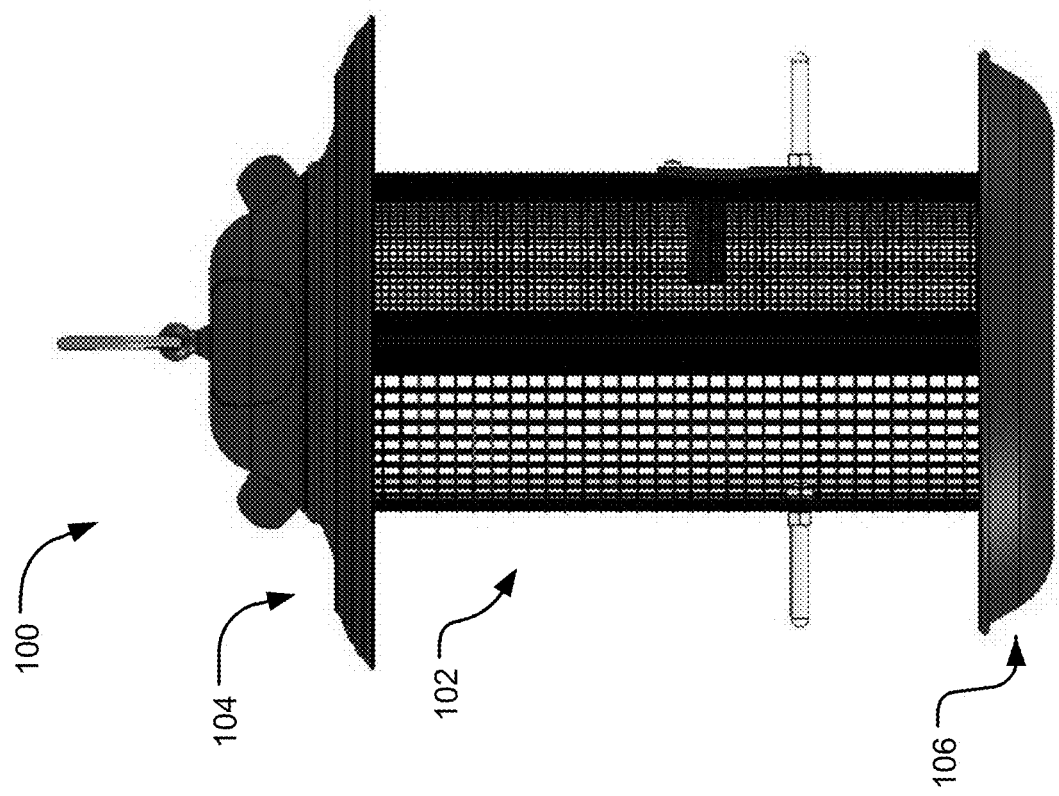

Another embodiment is shown in FIGS. 67A-B where the cover 6400 and cap 6300 include a spring 6700 biased in both the closed and open position, shown respectively. The spring 6700 couples to a spring tab 6704, positioned on the cap's inner surface 6424 near an opening 6404, and a stop tab 6706, positioned on the cover's inner surface 6408. When the cover 6400 is in the closed position, the spring 6700 holds the rotating cover 6400 closed. When the cover 6400 is opened and past center, the spring 6700 holds the rotating cover 6400 open for filling. FIGS. 68A-B illustrate the example cap assembly 104 on an example bird feeder 100.

Figures 69A, 69B:
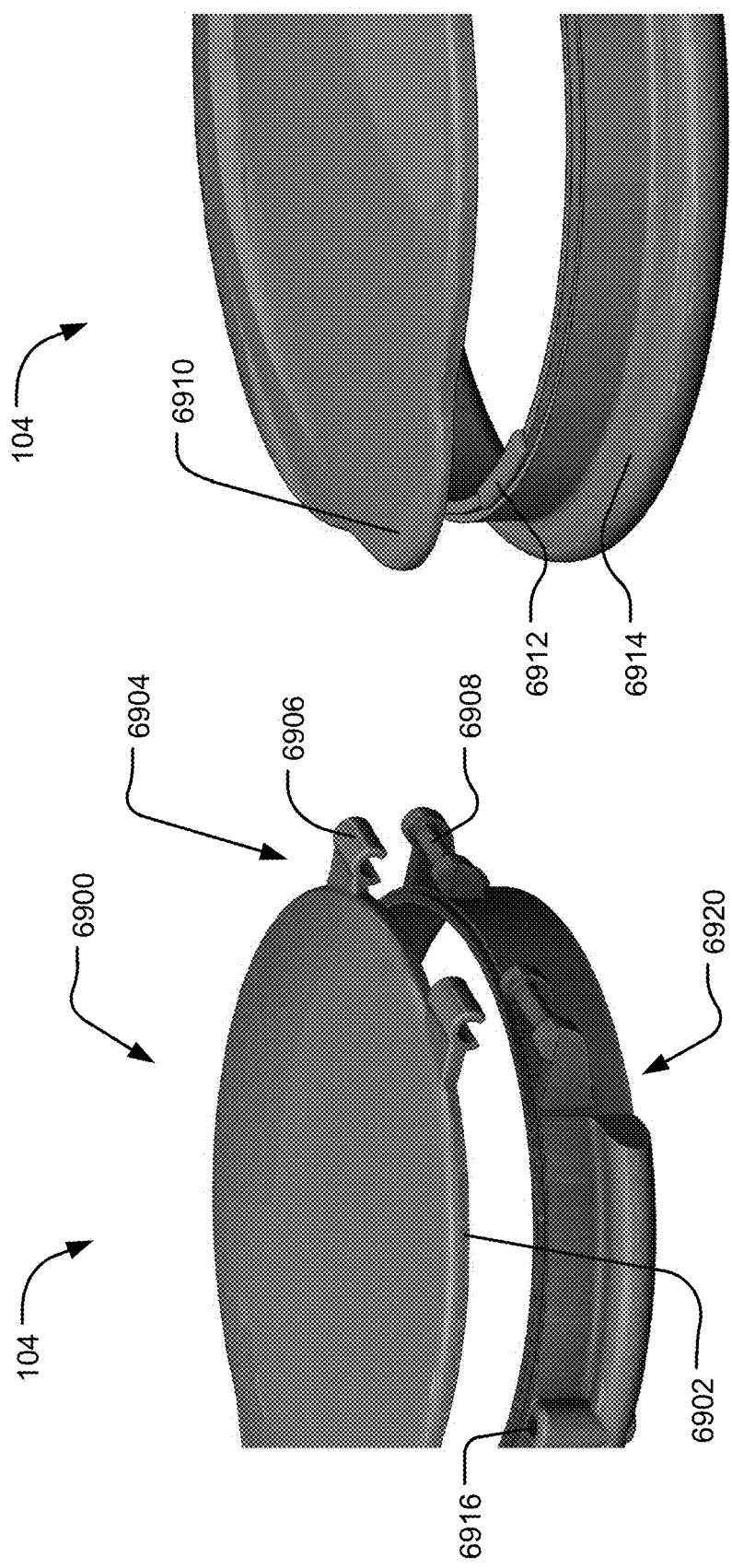
FIGS. 69A-B illustrate an example cap assembly including a lid and ring coupled via a hinge assembly, highlighting the hinge assembly and a locking mechanism, respectively.

Turning to FIGS. 69-70, another example cap assembly 104 is shown including a lid 6900 and a ring 6920 coupled by a hinge assembly 6904. The lid 6900 is generally circular with an extension 6910 at one end and at least one hinge barrel 6906 at the other end. The ring 6920 includes at least one hinge pin 6908, a ring lip 6914, a hanger opening 6916, and a lid closure 6912. In an example embodiment, two hinge barrels 6906 extend from the lid 6900 and snap onto two hinge pins 6908 positioned on the ring 6920. The hinge 6904 allows the lid 6900 to swing to an open and a closed position. When in the closed position, the lid closure 6912 snaps into a recess in the extension 6910, not shown, and gives positive closure against the elements or animals. To open the lid 6900, an upward force on the extension 6910 releases the lid 6900 from the lid closure 6912 and the lid 6900 can be swung open along the hinge 6904. To close the cap assembly 104, the lid 6900 is swung into the closed position and a downward force on the lid 6900 snaps the lid closure 6912 into the recess.

Figure 71B:
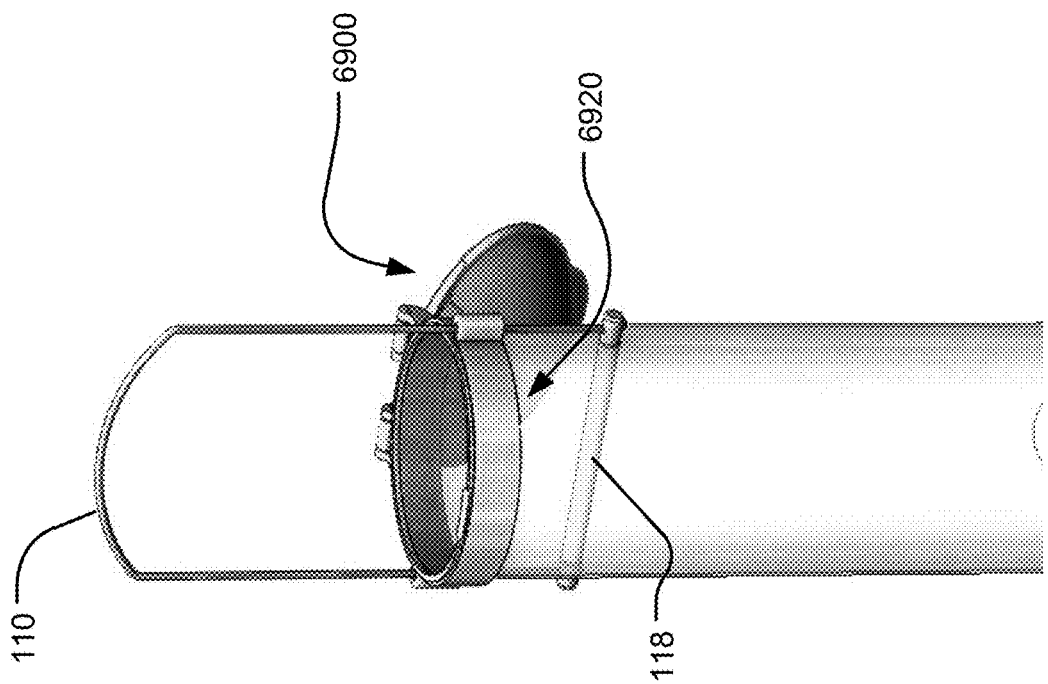
FIGS. 71A-B show another embodiment of the example cap assembly of FIGS. 69A-B in the closed position and open position, respectively.
Figure 71A:
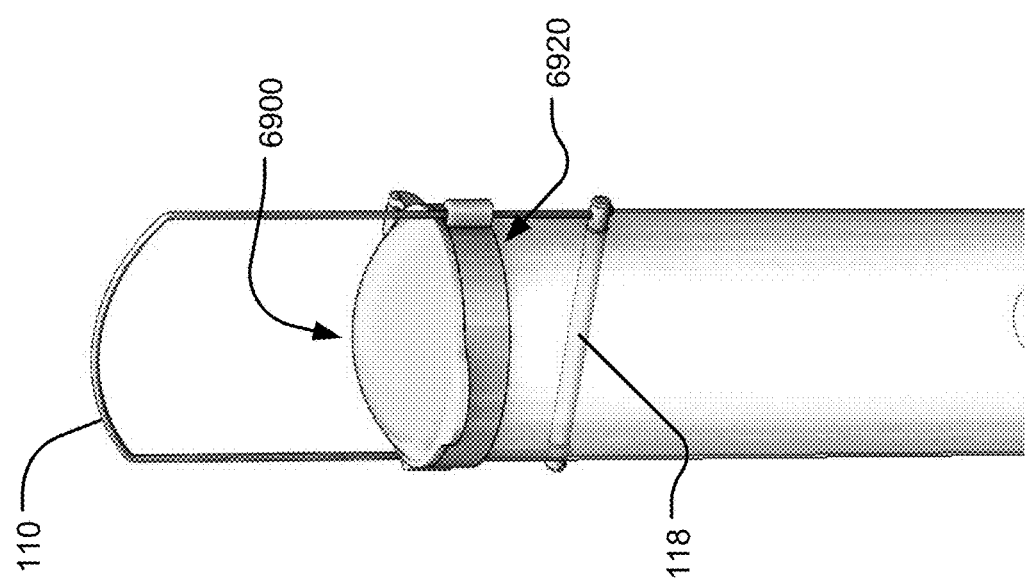

FIGS. 70A-B show the lid 6900 in a closed position and an open position, respectively. Additionally, a hanger 110 is mounted to the body 102 via two hanger receivers 118, positioned on the body 102 on opposite sides, and passes through two hanger openings 6916, positioned on opposite sides of the ring 6920. FIGS. 71A-B show another example embodiment of the lid 6700 and ring 6920 assembly where the lid 6900 is dome shaped and the ring 6920 is cylindrical shaped. Furthermore, the hanger 110 is mounted to the body 102 using a hanging rod 118 extending transversely through the body 102.

Figure 72:
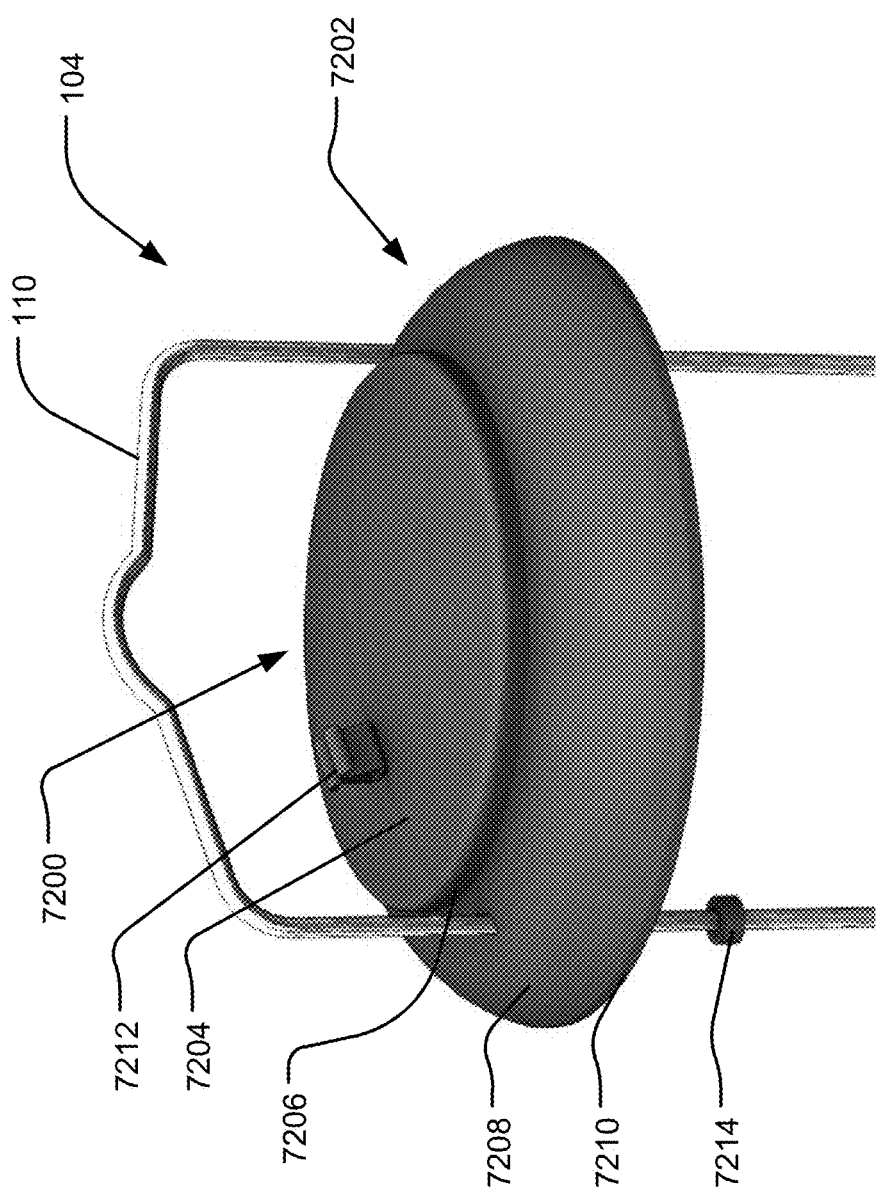
FIG. 72 illustrates an example cap assembly including a clip lid.
Figures 73A, 73B:
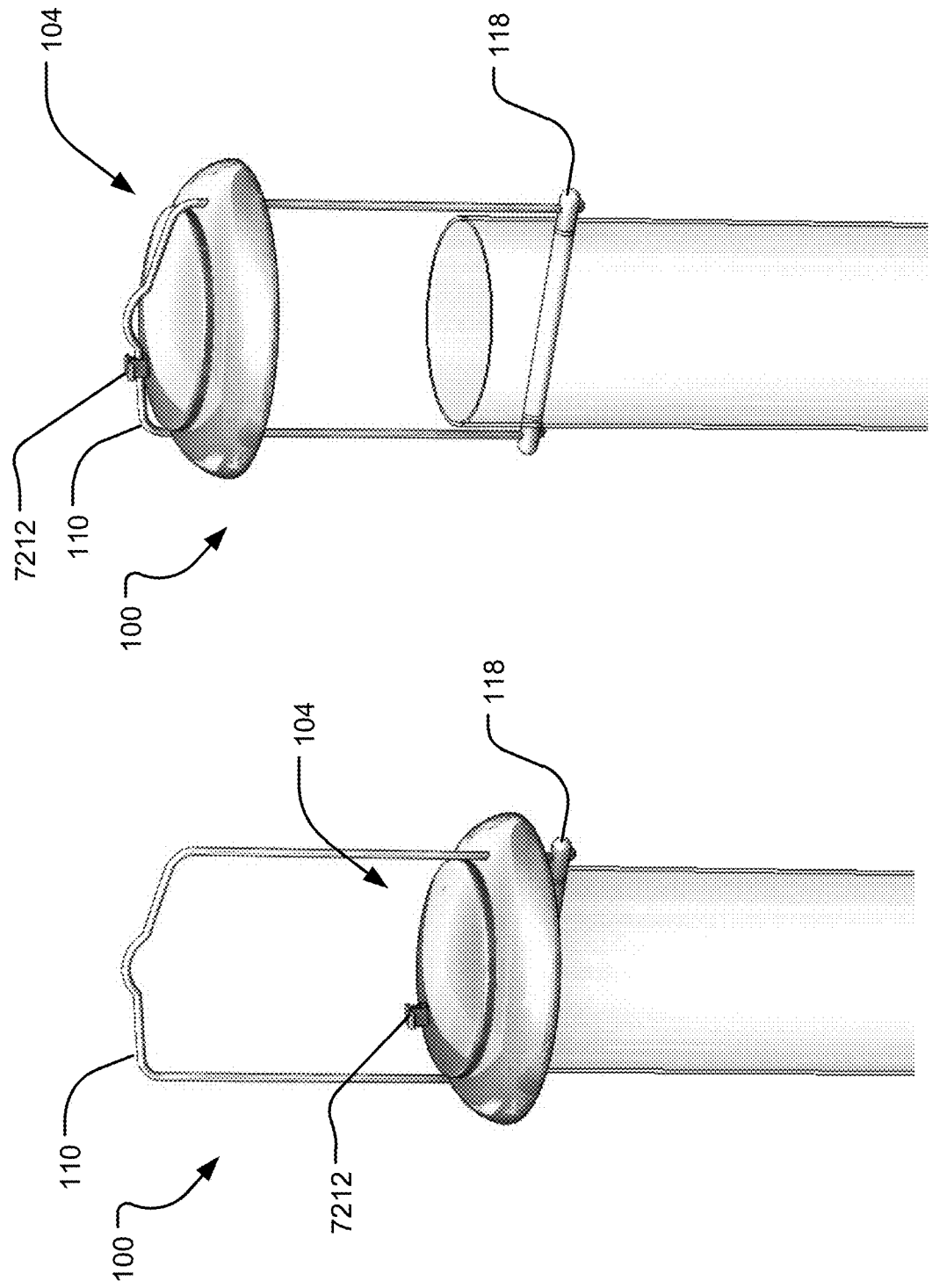
FIGS. 73A-B show the example cap assembly of FIG. 72 on an example bird feeder in the closed and open position, respectively.

Turning to FIGS. 72 and 73A-B, an example cap assembly 104 is shown with a clip lid 7200. The lid 7200 is generally dome shaped with a step 7206 partitioning the lid into an upper portion 7204 and a lower portion 7208. The clip 7212 is positioned on the upper portion 7204 adjacent to the center of the lid 7200. The lower portion 7208 extends from the step 7206 to an edge 7210. A hanger 110 is mounted to the lid 7200 at two points on the lower portion 7208. The hanger 110 may be mounted to the body 102 using a hanging rod 118 extending transversely through the body 102, shown in FIGS. 73A-B. The lid 7200 may be held open in two ways: either the clip 7212 clips the lid 7200 to the hanger 110 or a bushing on the hanger 110 may be positioned to hold the lid 7200 in an open position, shown in FIG. 72.

Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A method for easy filling a bird feeder, the method comprising:
receiving a depression of a release button on a cap assembly, the cap assembly having a cap base connected to a body at a proximal end using a mount, the body defining a reservoir of the bird feeder, the mount including a lid arm extending proximally along an inner surface of the cap base and releasably connecting a lid to the cap base at a first side in a closed position, the release button being disposed on the lid arm and extending through a releaser opening defined in the cap base, the depression of the release button displacing the lid arm inwardly into a cap opening and away from the cap base, the cap opening providing access to the reservoir;
a disconnecting the lid of the cap assembly from the first side of the cap base in response to the lid arm displacing inwardly upon the depression of the release button;
moving the lid from the closed position to an open position using a bias of a spring assembly upon the release of the lid, the lid moving from the closed position to the open position along a rotation path created by a hinge at a second side of the cap base, the lid held in the open position by the spring bias, the open position providing access to the reservoir through the cap opening; and
receiving birdseed through the cap opening into the reservoir when the lid is in the open position.

2. The method of claim 1, further comprising:
receiving an external force against the lid, the external force moving the lid from the opening position to the closed position; and
connecting the lid at the first side of the cap base by engaging the lid arm of the mount, the lid arm holding the lid in the closed position.

3. The method of claim 1, wherein the lid includes a latch that releasably connects to the lid arm in the closed position.

4. The method of claim 2, wherein the external force is created by at least a portion of a single hand.

5. The method of claim 1, wherein the cap assembly includes a roof extending outwardly transverse to a length of the body.

6. The method of claim 1, wherein the hinge includes a pin inserted through at least one lid protrusion and at least one cap base protrusion.

7. The method of claim 1, wherein the body includes one or more access ports disposed along a length of the body and providing access to the reservoir.

8. The method of claim 7, wherein one or more perches are disposed relative to the one or more access ports.

9. The method of claim 8, wherein each of the one or more perches includes a surface having a perch opening and a projection, the surface and the projection being continuous.

10. The method of claim 1, wherein the cap assembly is connected to an adjustable hanger.

11. The method of claim 1, wherein the birdseed is received through the cap opening from a spout of a birdseed tote into the reservoir.

12. The method of claim 11, wherein the birdseed tote includes a tote body having a neck shaped to direct the birdseed from a bottom of a tote interior into the reservoir through the spout when the tote body is oriented at an angle of ninety degrees or less relative to the cap opening.

13. The method of claim 12, wherein the neck extends from front ends of a pair of opposing side walls, and the neck, the pair of opposing sidewalls, a back wall connecting back ends of the pair opposing sidewalls, and a distal surface connecting the distal ends of the pair of opposing sidewalls forms the tote body.

14. The method of claim 13, wherein the tote body has a proximal edge extending along a plane, the neck including a neck surface extending along a contour from the distal surface to the spout, an axis line of the spout extending parallel to the plane of the proximal edge of the tote body, the neck surface directing the birdseed from the distal surface through an opening in the spout into the reservoir without an orientation of the plane extending past the angle of ninety degrees or less to the cap opening.

15. The method of claim 13, wherein the distal surface is placed on a lid of second birdseed tote in a storage position.

16. The method of claim 15, wherein the tote body is placed in an interior of a second tote body in a nested positon.

17. The method of claim 11, wherein the birdseed tote includes a handle.

18. The method of claim 17, wherein the depression of the release button is created by at least a portion of a first hand of a single user while the birdseed tote is held with the handle by a second hand of the single user.

19. The method of claim 1, wherein the cap base is secured to the mount using one or more side arms.

20. The method of claim 1, wherein the mount is connected to the body at the proximal end using a hanging rod.

* * * * *